United States Patent
Suzuki et al.

(10) Patent No.: US 6,459,812 B2
(45) Date of Patent: *Oct. 1, 2002

(54) PICTURE ENCODING AND/OR DECODING APPARATUS AND METHOD FOR PROVIDING SCALABILITY OF A VIDEO OBJECT WHOSE POSITION CHANGES WITH TIME AND A RECORDING MEDIUM HAVING THE SAME RECORDED THEREON

(75) Inventors: Teruhiko Suzuki, Chiba; Yoichi Yagasaki, Kanagawa, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/545,290

(22) Filed: Apr. 7, 2000

Related U.S. Application Data

(62) Division of application No. 08/924,778, filed on Sep. 5, 1997.

(30) Foreign Application Priority Data

Sep. 9, 1996 (JP) .............................................. 8-260312
Sep. 20, 1996 (JP) .............................................. 8-271512

(51) Int. Cl.⁷ ................................................. G06K 9/36
(52) U.S. Cl. ........................ 382/232; 382/251; 382/243; 382/233
(58) Field of Search ................................. 382/232, 233, 382/234, 235, 236, 237, 238, 239, 240, 241, 243; 348/422, 423, 465, 466, 467; 375/240.01, 240.02, 240.03, 240.12, 240.13, 240.15, 240.24

(56) References Cited

U.S. PATENT DOCUMENTS

| | | | | |
|---|---|---|---|---|
| 4,939,515 A | * | 7/1990 | Adelson | 341/51 |
| 5,384,665 A | * | 1/1995 | Ohkuma et al. | 360/22 |
| 5,537,409 A | * | 7/1996 | Moriyama et al. | 370/84 |
| 5,703,889 A | * | 12/1997 | Shimoda et al. | 371/55 |
| 5,852,669 A | * | 12/1998 | Eleftheriadis et al. | 382/118 |

* cited by examiner

Primary Examiner—Phuoc Tran
Assistant Examiner—Amir Alavi
(74) Attorney, Agent, or Firm—Frommer Lawrence & Haug LLP; William S. Frommer; Dennis M. Smid

(57) ABSTRACT

An apparatus and method for obtaining scalability of a video object (VO) whose position and/or size changes with time. The position of an upper layer picture and that of a lower layer picture in an absolute coordinate system are determined so that corresponding pixels in an enlarged picture and in the upper layer picture may be arranged at the same positions in the absolute coordinate system.

5 Claims, 51 Drawing Sheets

Enhancement Layer
(UPPER LAYER)

Base Layer
(LOWER LAYER)

Enhancement Layer

Base Layer

Enhancement Layer

Base Layer

Enhancement Layer

Base Layer

Prediction reference choices for P-VOPs in the object-based temporal scalability.

| ref_select_code | forward prediction reference |
|---|---|
| 00 | Most recent decoded enhancement VOP belonging to the same layer. |
| 01 | Most recent VOP in display order belonging to the reference layer. |
| 10 | Next VOP in display order belonging to the reference layer. |
| 11 | Temporally coincident VOP in the reference layer. (no motion vectors) |

FIG.26A

Prediction reference choices for B-VOPs in the case of scalability.

| ref_select_code | forward temporal reference | backward temporal reference |
|---|---|---|
| 00 | Temporally coincident VOP in the reference layer. (no motion vectors) | Most recent decoded enhacement VOP of the same layer. |
| 01 | Most recent decoded enhancement VOP of the same layer. | Most recent VOP in display order belonging to the reference layer. |
| 10 | Most recent decoded enhancement VOP of the same layer. | Next VOP in display order belonging to the reference layer. |
| 11 | Most recent VOP in display order belonging to the reference layer. | Next VOP in display order belonging to the reference layer. |

FIG.26B

Hierarchy in the proposed video syntax

Video Session Class

| Syntax | No.of bits | Mnemonie |
|---|---|---|
| Video Session(){<br>    Video_session_start_code<br>    do*{<br>        Video Object()<br>    }while(nextbits()==video_object_start_code)<br>    video_session_end_code<br>} | sc+8=32<br><br><br><br>sc+8=32 | |

*concurrent loop solution to be provided by MSDL.

FIG.33

Video Object

| Syntax | No.of bits | Mnemonie |
|---|---|---|
| Video Object(){<br>    Video_object_start_code<br>    Video_object_id<br>    do{<br>        Video Object Layer()<br>    }while(nextbits()==<br>            video_object_layer_start_code)<br>} | sc+3=27<br>5 | |

FIG.34

Video Object Layer

| Syntax | No.of bits | Mnemonie |
|---|---|---|
| Video Object Layer(){ | | |
|     video_object_layer_start_code | sc+4=28 | |
| A1 ~ video_object_layer_id | 4 | |
| A2 ~ video_object_layer_shape | 2 | |
|     if(video_object_layer_shape== "00" ){ | | |
| A7 {     video_object_layer_width | 10 | |
|     video_object_layer_height | 10 | |
|     } | | |
|     video_object_layer_quant_type | 1 | |
|     if(video_object_layer_quant_type){ | | |
|       load_intra_quant_mat | 1 | |
|       if(load_intra_quant_mat) | | |
|         intra_quant_mat[64] | 8*64 | |
|       load_nonintra_quant_mat | 1 | |
|       if(load_nonintra_quant_mat) | | |
|         nonintra_quant_mat[64] | 8*64 | |
|     } | | |
|     intra_dcpred_disable | 1 | |
|     video_object_layer_fcode_forward | 2 | |
|     video_object_layer_fcode_backward | 2 | |
|     separate_motion shape_texture | 1 | |
| A3 ~ scalability | 1 | |
|     if(scalability){ | | |
| A4 ~   ref_layer_id | 4 | |
|       ref_layer_sampling_direc | 1 | |
| A5 {   hor_sampling_factor_n | 5 | |
|       hor_sampling_factor_m | 5 | |
| A6 {   vert_sampling_factor_n | 5 | |
|       vert_sampling_factor_m | 5 | |
|       enhancement_type | 1 | |
|     } | | |
|     do{ | | |
|       video object Plane() | | |
|     }while(nextbits()== | | |
|         video_object_plane_plane_start_code) | | |
| } | | |

FIG.35

Video Object Plane

| Syntax | No.of bits | Mnemonie |
|---|---|---|
| Video Object Plane(){ | | |
|     VOP_start_code | sc+8=32 | |
|     do{ | | |
|         modulo_time_base | 1 | |
|     }while(modulo_time_base_!= "0" ) | | |
|     VOP_time_increment | 10 | |
|     VOP_prediction_type | 2 | |
|     If(video_object_layer_shape!= "0" ) { | | |
| B1 {     VOP_width | 10 | |
|         VOP_height | 10 | |
| B2 — VOP_horizontal_mc_spatial_ref | 10 | |
|         marker_bit | 1 | |
| B3 — VOP_vertical_mc_spatial_ref | 10 | |
|         if(scalability && enhancement_type) | | |
|             background_composition | 1 | |
|     } | | |
|     if(VOP_prediction_type== "10" ) | | |
|         VOP_dbquant | 2 | |
|     else | | |
|         VOP_quant | 5 | |
|     if(!scalability){ | | |
|         if(!separate_motion_shape_texture) | | |
|             combined_motion_shape_texture_coding() | | |
|         else{ | | |
|             do.{ | | |
|                 first_MMR_code | | |
|             }while(count of macroblocksl | 1-2 | |
|                 =total number of macroblocks) | | |
|             motion_coding() | | |
|             shade_coding() | | |
|             texture_coding() | | |
|         } | | |
|     } | | |
|     else{ | | |
|         if(background_composition){ | | |
|             load_backward_shape | 1 | |
|             if(load_backward_shape){ | | |
|                 backward_shape_coding() | | |
|             load_forward_shape | 1 | |
|             if(load_forward_shape) | | |
|                 forward_shape_coding() | | |
|         } | | |
|     } | | |
| B4 — ref_select_code | | |
|     if(VOP_prediction_type== "01" | 2 | |
|         II VOP_prediction_type== "10" ) { | | |
|         forward_temporal_ref | 10 | |
|         if(VOP_prediction_type_== "10" ){ | | |
|             marker_bit | 1 | |
|             background_temporal_ref | 10 | |
|         } | | |
|     } | | |
|     combined_motion_shape_texture_coding() | | |
|     } | | |
| } | | |

FIG.36

Video Object Plane

| Syntax | No.of bits | Mnemonic |
|---|---|---|
| Video Object Plane(){ | | |
|     VOP_start_code | sc+8=32 | |
|     do{ | | |
|         modulo_time_base | 1 | |
|     }while(modulo_time_base != "0" ) | | |
|     VOP_time_increment | 10 | |
|     VOP_prediction_type | 2 | |
|     if(video_object_layer_shape != "00" ) { | | |
| C1 —— load_VOP_size | 1 | |
|         if(load_VOP_size){ | | |
| C2 {     VOP_width | 10 | |
|         VOP_height | 10 | |
|         } | | |
|     marker_bit | 1 | |
| C4 {   diff_size_horizontal | VLC | |
|      diff_size_vertical | VLC | |
| C3 {   diff_VOP_horizontal_ref | VLC | |
|      diff_VOP_vertical_ref | VLC | |
|     if(scalability_&&_enhancement_type) | | |
|         background_composition | 1 | |
|     } | | |
|     if(VOP_prediction_type== "10" ) | | |
|         VOP_dbquant | 2 | |
|     else | | |
|         VOP_quant | 5 | |
|     if(!scalability){ | | |
|         if(!separate_motion_shape_texture) | | |
| combined_motion_shape_texture_coding() | | |
|         else{ | | |
|         do | | |
|           first_MMR_code | 1-2 | |
|     }while(count_of_macroblocks !=total number_of_macroblocks) | | |
|         motion_coding() | | |
|         shape_coding() | | |
|         texture_coding() | | |
|     } | | |
| } | | |
| else{ | | |
|     if(background_composition){ | | |
|         load_backward_shape | 1 | |
|         if(load_backward_shape){ | | |
|           backward_shape_coding() | 1 | |
|         load_forward_shape | | |
|         if(load_forward_shape) | | |
|         } | | |
|     } | | |
| C5 —— ref_select_code | 2 | |
|     if(VOP_prediction_type== "01" || VOP_prediction_type== "10" ) { | | |
|         forward_temporal_ref | 10 | |
|         if(VOP_prediction_type_== "10" ){ | | |
|           marker_bit | 1 | |
|           background_temporal_ref | 10 | |
|         } | | |
|     } | | |
|     combined_motion_shape_texture_coding() | | |
| } | | |

FIG.37

| diff_size_horizontal, diff_size_vertical | diff_VOP_horizontal_ref, diff_VOP_vertical_ref | Code |
|---|---|---|
| 0 | 0 | 00 |
| 1 | +-1 | 01 |
| 2 | 2 to 3, -3 to -2 | 10 |
| 3 | 4 to 7, -7 to -4 | 110 |
| 4 | 8 to 15, -15 to -8 | 1110 |
| 5 | 16 to 31, -31 to -16 | 11110 |
| 6 | 32 to 63, -63 to -32 | 111110 |
| 7 | 64 to 127, -127 to -64 | 1111110 |
| 8 | 128 to 255, -255 to -128 | 11111110 |
| 9 | 256 to 511, -511 to -256 | 111111110 |
| 10 | 512 to 1023, -1023 to -512 | 1111111110 |

FIG.38

| diff_VOP_horizontal_ref, diff_VOP_vertical_ref | diff_size_horizontal, diff_size_vertical | Code |
|---|---|---|
| -1023 to -512 | 10 | 0000000000 to 0111111111 |
| -511 to -256 | 9 | 000000000 to 011111111 |
| -255 to -128 | 8 | 00000000 to 01111111 |
| -127 to -64 | 7 | 0000000 to 0111111 |
| -63 to -32 | 6 | 000000 to 011111 |
| -31 to -16 | 5 | 00000 to 01111 |
| -15 to -8 | 4 | 0000 to 0111 |
| -7 to -4 | 3 | 000 to 011 |
| -3 to -2 | 2 | 00 to 01 |
| -1 | 1 | 0 |
| 0 | 0 | |
| 1 | 1 | 1 |
| 2 to 3 | 2 | 10 to 11 |
| 4 to 7 | 3 | 100 to 111 |
| 8 to 15 | 4 | 1000 to 1111 |
| 16 to 31 | 5 | 10000 to 11111 |
| 32 to 63 | 6 | 100000 to 111111 |
| 64 to 127 | 7 | 1000000 to 1111111 |
| 128 to 255 | 8 | 10000000 to 11111111 |
| 256 to 511 | 9 | 100000000 to 111111111 |
| 512 to 1023 | 10 | 1000000000 to 1111111111 |

FIG.39

| first_MMR_code | | | | | | | | |
|---|---|---|---|---|---|---|---|---|
| COD | MCBPC | CBPY | DQUANT | MVD | MVD$_2$ | MVD$_3$ | MVD$_4$ | |
| CR | a()_color | VLC_binary | PLB/ULB | CODA | CBPA | Alpha.Block Data | | Block Data |

FIG. 40A

Structure of macroblock layer in I- and P-VOPs

| first_MMR_code | | | | | | | | |
|---|---|---|---|---|---|---|---|---|
| MODB | MBTYPE | CBPB | DQUANT | COD | MODBA | MVD$_1$ | MVD$_b$ | MVDB | CR |
| a()_color | VLC_binary | PLB/ULBN | | | | CBPBA | A.Block Data | | Block Data |

FIG. 40B

Structure of macroblock layer in B VOPs

VLC table for MODB

| Index | CBPB | MBTYPE | Number of bits | code |
|---|---|---|---|---|
| 0 |  |  | 1 | 0 |
| 1 |  | X | 2 | 10 |
| 2 | X | X | 2 | 11 |

MODB TABLE A

FIG.41A

| Index | CBPB | MBTYPE | Number of bits | code |
|---|---|---|---|---|
| 0 |  | X | 1 | 0 |
| 1 | X | X | 2 | 10 |

MODB TABLE B

FIG.41B

Note: "X" means that item is present in the macroblock

MBTYPES and included data elements in coded macroblocks in B-VOPs

| Index | MBTYPE | DQUANT | MVDf | MVDb | MVDB | Number of bits | code |
|---|---|---|---|---|---|---|---|
| 0 | Direct (H.263 B) | | | | X | 1 | 1 |
| 1 | Interpolate MC+Q | X | X | X | | 2 | 01 |
| 2 | Backward MC+Q | X | | X | | 3 | 001 |
| 3 | Forward MC+Q | X | X | | | 4 | 0001 |

MBTYPE TABLE A

FIG. 43A

| Index | MBTYPE | DQUANT | MVDf | MVDb | Number of bits | code |
|---|---|---|---|---|---|---|
| 0 | Interpolate MC+Q | X | X | X | 1 | 1 |
| 1 | Backward MC+Q | X | | X | 2 | 01 |
| 2 | Forward MC+Q | X | X | | 3 | 001 |

MBTYPE TABLE B

FIG. 43B

Note: "X" means that item is present in the macroblock

PICTURE ENCODING AND/OR DECODING APPARATUS AND METHOD FOR PROVIDING SCALABILITY OF A VIDEO OBJECT WHOSE POSITION CHANGES WITH TIME AND A RECORDING MEDIUM HAVING THE SAME RECORDED THEREON

This Application is a Division of 08/924,778 filed Sep. 5, 1997.

BACKGROUND OF THE INVENTION

The present invention relates to a picture encoding and decoding technique, a picture processing technique, a recording technique, and a recording medium and, more particularly, to such techniques and recording medium for use in recording moving picture data onto a recording medium, such as a magneto-optical disc or a magnetic tape, reproducing the recorded data for display on a display system, or transmitting the moving picture data over a transmission channel from a transmitter to a receiver and receiving and displaying the transmitted data by the receiver or editing the received data for recording, as in a teleconferencing system, video telephone system, broadcast equipment, or in a multi-media database retrieving system.

In a system for transmitting moving picture data to a remote place, as in a teleconferencing system or video telephone system, picture data may be encoded (compressed) by exploiting or utilizing line correlation and inter-frame correlation. A high-efficiency encoding system for moving pictures has been proposed by the Moving Picture Experts Group (MPEG). Such system has been proposed as a standard draft after discussions in ISO-1EC/JTC1/SC2/WG11, and is a hybrid system combined from the motion compensation predictive coding and discrete cosine transform (DCT).

In MPEG, several profiles and levels are defined for coping with various types of applications and functions. The most basic is the main profile main level (MOVING PICTURE ML (Main Profile@ at main Level)).

FIG. 1 illustrates a MP@ ML encoding unit in an MPEG system. In such encoding unit, picture data to be encoded is supplied to a frame memory 31 for transient storage therein. A motion vector detector 32 reads out picture data stored in the fame memory 31 in terms of a 16×16 pixel macro-block basis so as to detect its motion vector. The motion vector detector 32 processes picture data of each frame as an I-picture, a P-picture, or as a B-picture. Each of the pictures of the sequentially entered frames is processed as one of the I-, P- or B-pictures as a pre-set manner, such as in a sequence of I, B, P, B, P, . . . , B, P. That is, the motion vector detector 32 refers to a pre-set reference frame in a series of pictures stored in the frame memory 31 and detects the motion vector of a macro-block, that is, a small block of 16 pixels by 16 lines of the frame being encoded by pattern matching (block matching) between the macro-block and the reference frame for detecting the motion vector of the macro-block.

In MPEG, there are four picture prediction modes, that is, an intra-coding (intra-frame coding), a forward predictive coding, a backward predictive coding, and a bidirectional predictive-coding. An I-picture is an intra-coded picture, a P-picture is an intra-coded or forward predictive coded or backward predictive coded picture, and a B-picture is an intra-coded, a forward predictive coded, or a bidirectional predictive-coded picture.

Returning to FIG. 1, the motion vector detector 32 performs forward prediction on a P-picture to detect its motion vector. The motion vector detector 32 compares prediction error produced by performing forward prediction to, for example, the variance of the macro-block being encoded (macro-block of the P-picture). If the variance of the macro-block is smaller than the prediction error, the intra-coding mode is set as the prediction mode and outputted to a variable length coding (VLC) unit 36 and to a motion compensator 42. On the other hand, if the prediction error generated by the forward prediction coding is smaller, the motion vector detector 32 sets the forward predictive coding mode as the prediction mode and outputs the set mode to the VLC unit 36 and the motion compensator 42 along with the detected motion vector. Additionally, the motion vector detector 32 performs forward prediction, backward prediction, and bi-directional prediction for a B-picture to detect the respective motion vectors. The motion vector detector 32 detects the smallest prediction error of forward prediction, backward prediction, and bidirectional prediction (referred to herein as minimum prediction error) and compares the minimum prediction error), for example, the variance of the macro-block being encoded (macro-block of the B-picture). If, as a result of such comparison, the variance of the macro-block is smaller than the minimum prediction error, the motion vector detector 32 sets the intra-coding mode as the prediction mode, and outputs the set mode to the VLC unit 36 and the motion compensator 42. If, on the other hand, the minimum prediction error is smaller, the motion vector detector 32 sets the prediction mode for which the minimum prediction error has been obtained, and outputs the prediction mode thus set to the VLC unit 36 and the motion compensator 42 along with the associated motion vector.

Upon receiving the prediction mode and the motion vector from the motion vector detector 32, the motion compensator 42 may read out encoded and already locally decoded picture data stored in the frame memory 41 in accordance with the prediction mode and the motion vector and may supply the read-out data as a prediction picture to arithmetic units 33 and 40. The arithmetic unit 33 also receives the same macro-block as the picture data read out by the motion vector detector 32 from the frame memory 31 and calculates the difference between the macro-block and the prediction picture from the motion compensator 42. Such difference value is supplies to a discrete cosine transform (DCT) unit 34.

If only the prediction mode is received from the motion vector detector 32, that is, if the prediction mode is the intra-coding mode, the motion compensator 42 may not output a prediction picture. In such situation, the arithmetic unit 33 may not perform the above-described processing, but instead may directly output the macro-block read out from the frame memory 31 to the DCT unit 34. Also, in such situation, the arithmetic unit 40 may perform in a similar manner.

The DCT unit 34 performs DCT processing on the output signal from the arithmetic unit 33 so as to obtain DCT coefficients which are supplied to a quantizer 35. The quantizer 35 sets a quantization step (quantization scale) in accordance with the data storage quantity in a buffer 37 (data volume stored in the buffer 37) received as a buffer feedback and quantizes the DCT coefficients from the DCT unit 34 using the quantization step. The quantized DCT coefficients (sometimes referred to herein as quantization coefficients) are supplied to the VLC unit 36 along with the set quantization step.

The VLC unit 36 converts the quantization coefficients supplied from the quantizer 35 into a variable length code, such a Huffman code, in accordance with the quantization step supplied from the quantizer 35. The resulting converted quantization coefficients are outputted to the buffer 37. The VLC unit 36 also variable length encodes the quantization step from the quantizer 35, prediction mode from the motion vector detector 32, and the motion vector from the motion vector detector 32, and outputs the encoded data to the buffer 37. It should be noted that the prediction mode is a mode specifying which of the intra-coding, forward predictive coding, backward predictive coding, or bidirectionally predictive coding has been set.

The buffer 37 transiently stores data from the VLC unit 36 and smooths out the data volume so as to enable smoothed data to be outputted therefrom and supplied to a transmission channel or to be recorded on a recording medium or the like. The buffer 37 may also supply the stored data volume to the quantizer 35 which sets the quantization step in accordance therewith. As such, in the case of impending overflow of the buffer 37, the quantizer 35 increases the quantization step size so as to decrease the data volume of the quantization coefficients. Conversely, in the case of impending underflow of the buffer 37, the quantizer 35 decreases the quantization step size so as to increase the data volume of the quantization coefficients. As is to be appreciated, this procedure may prevent overflow and underflow of the buffer 37.

The quantization coefficients and the quantization step outputted by the quantizer 35 are supplied not only to the VLC unit 36, but also to a dequantizer 38 which dequantizes the quantization coefficients in accordance with the quantization step so as to convert the same to DCT coefficients. Such DCT coefficients are supplied to an IDCT (inverse DCT) unit 39 which performs inverse DCT on the DCT coefficients. The obtained inverse DCTed coefficients are supplied to the arithmetic unit 40.

The arithmetic unit 40 receives the inverse DCT coefficients from the IDCT unit 39 and data from the motion compensator 42 which are the same as the prediction picture sent to the arithmetic unit 33. The arithmetic unit 40 sums the signal (prediction residuals) from the IDCT unit 39 to the prediction picture from the motion compensator 42 to locally decode the original picture. However, if the prediction mode indicates intra-coding, the output of the IDCT unit 39 may be fed directly to the frame memory 41. The decoded picture (locally decoded picture) obtained by the arithmetic unit 40 is sent to and stored in the frame memory 41 so as to be used later as a reference picture for an inter-coded picture, forward predictive coded picture, backward predictive code picture, or a bidirectional predictive code picture.

The decoded picture obtained from the arithmetic unit 40 is the same as that which may be obtained from a receiver or decoding unit (not shown in FIG. 1).

FIG. 2 illustrates a MP@ML decoder in an MPEG system for decoding encoded data such as that outputted by the encoder of FIG. 1. In such decoder, encoded data transmitted via a transmission path may be received by a receiver (not shown) or encoded data recorded on a recording medium may be reproduced by a reproducing device (not shown) and supplied to a buffer 101 and stored thereat. An IVLC unit (inverse VLC unit) 102 reads out encoded data stored in the buffer 101 and variable length decodes the same so as to separate the encoded data into a motion vector, prediction mode, quantization step and quantization coefficients. Of these, the motion vector and the prediction mode are supplied to a motion compensator 107, while the quantization step and quantization coefficients are supplied to a dequantizer 103. The dequantizer 103 dequantizes the quantization coefficients in accordance with the quantization step so as to obtain DCT coefficients which are supplied to an IDCT (inverse DCT) unit 104. The IDCT unit 104 performs an inverse DCT operation on the received DCT coefficients and supplies the resulting signal to an arithmetic unit 105. In addition to the output of the IDCT unit 104, the arithmetic unit 105 also receives an output from a motion compensator 107. That is, the motion compensator 107 reads out a previously decoded picture stored in a frame memory 106 in accordance with the prediction mode and the motion vector from the IVLC unit 102 in a manner similar to that of the motion compensator 42 of FIG. 1 and supplies the read-out decoded picture as a prediction picture to the arithmetic unit 105. The arithmetic unit 105 sums the signal from the IDCT unit 104 (prediction residuals) to the prediction picture from the motion compensator 107 so as to decode the original picture. If the output of the IDCT unit 104 is intra-coded, such output may be directly supplied to and stored in the frame memory 106. The decoded picture stored in the frame memory 106 may be used as a reference picture for subsequently decoded pictures, and also may be read out and supplied to a display (not shown) so as to be displayed thereon. However, if the decoded picture is a B-picture, such B-picture is not stored in the frame memories 41 (FIG. 1) or 106 (FIG. 2) in the encoding unit or decoder, since a B-picture is not used as a reference picture in MPEG1 and MPEG2.

In MPEG, a variety of profiles and levels as well as a variety of tools are defined in addition to the above-described MP@ML. An example of a MPEG tool is scalability. More specifically, MPEG adopts a scalable encoding system for coping with different picture sizes or different frame sizes. In spatial scalability, if only a lower-layer bitstream is decoded, for example, only a picture with a small picture size is obtained, whereas, if both lower-layer and upper-layer bitstreams are decoded, a picture with a large picture size is obtained.

FIG. 3 illustrates an encoding unit for providing spatial scalability. In spatial scalability, the lower and upper layers are associated with picture signals of a small picture size and those with a large picture size, respectively. The upper-layer encoding unit 201 may receive an upper-layer picture for encoding, whereas, the lower-layer encoding unit 202 may receive a picture resulting from a thinning out process for reducing the number of pixels (hence a picture lowered in resolution for diminishing its size) as a lower-layer picture. The lower-layer encoding unit 202 predictively encodes a lower-layer picture in a manner similar to that of FIG. 1 so as to form and output a lower-layer bitstream. The lower-layer encoding unit 202 also generates a picture corresponding to the locally decoded lower-layer picture enlarged to the same size as the upper-layer picture size (occasionally referred to herein as an enlarged picture). This enlarged picture is supplied to the upper-layer encoding unit 201. The upper-layer encoding unit 201 predictively encodes an upper-layer picture in a manner similar to that of FIG. 1 so as to form and output an upper-layer bitstream. The upper layer encoding unit 201 also uses the enlarged picture received from the lower-layer encoding unit 202 as a reference picture for executing predictive coding. The upper layer bitstream and the lower layer bitstream are multiplexed to form encoded data which is outputted.

FIG. 4 illustrates an example of the lower layer encoding unit 202 of FIG. 3. Such lower layer encoding unit 202 is similarly constructed to the encoder of FIG. 1 except for an upsampling unit 211. Accordingly, in FIG. 4, parts or components corresponding to those shown in FIG. 1 are depicted by the same reference numerals. The upsampling unit 211 upsamples (interpolates) a locally decoded lower-layer picture outputted by the arithmetic unit 40 so as to enlarge the picture to the same size as the upper layer picture size and supplies the resulting enlarged picture to the upper layer encoding unit 201.

FIG. 5 illustrates an example of the upper layer encoding unit 201 of FIG. 3. Such upper layer encoding unit 201 is similarly constructed to the encoder of FIG. 1 except for weighing addition units 221, 222 and an arithmetic unit 223. Accordingly, in FIG. 5, parts. or components corresponding to those of FIG. 1 are denoted by the same reference numerals. The weighing addition unit 221 multiplies a prediction picture outputted by the motion compensator 42 by a weight W and outputs the resulting signal to the arithmetic unit 223. The weighing addition unit 222 multiplies the enlarged picture supplied from the lower layer encoding unit 202 with a weight (1−W) and supplies the resulting product to the arithmetic unit 223. The arithmetic unit 223 sums the received outputs from the weight addition circuits 221, 222 and outputs the resulting sum to the arithmetic units 33, 40 as a predicted picture. The weighing W used in the weighing addition unit 221 is pre-set, as is the weighing (1−W) used in the weighing addition unit 222. The weighing W is supplied to the VLC unit 36 for variable length encoding. The upper layer encoding unit 201 performs processing similar to that of FIG. 1.

Thus the upper layer encoding unit 201 performs predictive encoding using not only the upper layer picture, but also the enlarged picture from the lower layer encoding unit 202, that is, a lower layer picture, as a reference picture.

FIG. 6 illustrates an example of a decoder for implementing spatial scalability. Output encoded data from the encoder of FIG. 3 is separated into an upper layer bitstream and a lower layer bitstream which are supplied to an upper layer decoding unit 231 and to a lower layer decoding unit 232, respectively. The lower layer decoding unit 232 decodes the lower layer bitstream as in FIG. 2 and outputs the resulting decoded picture of the lower layer. In addition, the lower layer decoding unit 232 enlarges the lower layer decoded picture to the same size as the upper layer picture to generate an enlarged picture and supplies the same to the upper layer decoding unit 231. The upper layer decoding unit 231 similarly decodes the upper layer bitstream, as in FIG. 2. However, the upper layer decoding unit 231 decodes the bitstream using the enlarged picture from the lower layer decoding unit 232 as a reference picture.

FIG. 7 illustrates an example of the lower layer decoding unit 232. The lower layer decoding unit 232 is similarly constructed to the decoder of FIG. 2 except for an upsampling unit 241. Accordingly, in FIG. 7, parts or components corresponding to those of FIG. 2 are depicted by the same reference numerals. The upsampling unit 241 upsamples (interpolates) the decoded lower layer picture outputted by the arithmetic unit 105 SO as to enlarge the lower layer picture to the same size as the upper layer picture size and outputs the enlarged picture to the upper layer decoder 231.

FIG. 8 illustrates an example of the upper layer decoding unit 231 of FIG. 6. The upper layer decoding unit 231 is similarly constructed to the encoder of FIG. 2 except for weighing addition units 251, 252 and an arithmetic unit 253. Accordingly, in FIG. 7, parts. or components corresponding to those of FIG. 2 are depicted by the same reference numerals. In addition to performing the processing explained with reference to FIG. 2, the IVLC unit 102 extracts the weighing W from the encoded data and outputs the extracted weighing W to the weighing addition units 251, 252. The weighing addition unit 251 multiplies the prediction picture outputted by the motion compensator 107 by the weighing W and outputs the resulting product to the arithmetic unit 253. The arithmetic unit 253 also receives an output from the weighing addition unit 252. Such output is obtained by multiplying the enlarged picture supplied from the lower layer decoding unit 232 by the weighing (1−W). The arithmetic unit 253 sums the outputs of the weighing summing units 251, 252 and supplies the summed output as a prediction picture to the arithmetic unit 105. Therefore, the arithmetic unit 253 uses the upper layer picture and the enlarged picture from the lower layer encoding unit 232, that is, the lower layer picture, as reference pictures, for decoding. Such processing is performed on both luminance signals and chroma signals. The motion vector for the chroma signals may be one-half as large as the motion vector for the luminance signals.

In addition to the above-described MPEG system, a variety of high-efficiency encoding systems have been standardized for moving pictures. In ITU-T, for example, systems such as H.261 or H.263 have been prescribed mainly as encoding systems for communication. Similar to the MPEG system, these H.261 and H.263 systems basically involve a combination of motion compensation prediction encoding and DCT encoding. Specifically, the H.261 and H.263 systems may be basically similar in structure to the encoder or the decoder of the MPEG system, although differences in the structure thereof or in the details such as header information may exist.

In a picture synthesis system for constituting a picture by synthesizing plural pictures, a so-called chroma key technique may be used. This technique photographs an object in front of a background of a specified uniform color, such as blue, extracts an area other than the blue therefrom, and synthesizes the extracted area to another picture. The signal specifying the extracted area is termed a key signal.

FIG. 9 illustrates a method for synthesizing a picture where F1 is a background picture and F2 is a foreground picture. The picture F2 is obtained by photographing an object, herein a person, and extracting an area other than this color. The chroma signal K1 specifies the extracted area. In the picture synthesis system, the background picture F1 and the foreground picture F2 are synthesized in accordance with the key signal K1 to generate a synthesized picture F3. This synthesized picture is encoded, such as by a MPEG technique, and transmitted.

If the synthesized picture F3 is encoded and transmitted as described above, only the encoded data on the synthesized picture F3 is transmitted, so that the information such as the key signal K1 may be lost. As such, picture re-editing or re-synthesis for keeping the foreground F2 intact and changing only the background F1 becomes difficult to perform on the receiving side.

Consider a method in which the pictures F1, F2 and the key signals K1 are separately encoded and the resulting respective bitstreams are multiplexed as shown, for example, in FIG. 10. In such case, the receiving side demultiplexes the multiplexed data to decode the respective bitstreams and produce the pictures F1, F2 or the key signal K1. The decoded results of the pictures F1, F2 or the key signal K1 may be synthesized so as to generate the synthesized picture F3. In such case, the receiving side may perform picture re-editing or re-synthesis such that the foreground F2 is kept intact and only the background F1 is changed.

Therefore, the synthesized picture F3 is made up of the pictures F1 and F2. In a similar manner, any picture may be thought of as being made up of plural pictures or objects. If units that go to make up a picture are termed video objects (VOs), an operation for standardizing a VO based encoding system is underway in ISO-IEC/JTC1/SC29/WG11 as MPEG 4. However, at present, a method for efficiently encoding a VO or encoding key signals has not yet been established and is in a pending state. In any event, although MPEG 4 prescribes the function of scalability, there has not been proposed a specified technique for realization of scalability for a VO in which the position and size thereof change with time. As an example, if the VO is a person approaching from a distant place, the position and the size of the VO change with time. Therefore, if a picture of a lower layer is used as a reference picture in predictive encoding of the upper layer picture, it may be necessary to clarify the relative position between the picture of the upper layer and the lower layer picture used as a reference picture. On the other hand, in using VO-based scalability, the condition for a skip macro-block of the lower layer is not necessarily directly applicable to that for a skip macro-block of the lower layer.

OBJECTS AND SUMMARY OF THE INVENTION

It is therefore an object of the present invention to provide a technique which enables VO-based encoding to be easily achieved.

In accordance with an aspect of the present invention, a picture encoding device is provided which includes enlarging/contracting means for enlarging or contracting a second picture based on the difference in resolution between first and second pictures (such as a resolution converter 24 shown in FIG. 15), first picture encoding means for predictive coding the first picture using an output of the enlarging/contracting means as a reference picture (such as an upper layer encoding unit 23 shown in FIG. 15), second picture encoding means for encoding the second picture (such as a lower layer encoding unit 25), position setting means for setting the positions of the first picture and the second picture in a pre-set absolute coordinate system and outputting first or second position information on the position of the first or second picture, respectively (such as a picture layering unit 21 shown in FIG. 15), and multiplexing means for multiplexing outputs of the first picture encoding means, second picture encoding means, and the position setting means (such as a multiplexer 26 shown in FIG. 15). The first picture encoding means recognizes the position of the first picture based on the first position information and converts the second position information in response to an enlarging ratio or a contracting ratio by which the enlarging/contracting means has enlarged or contracted the second picture. The first picture encoding means also recognizes the position corresponding to the results of conversion as the position of the reference picture in order to perform predictive coding.

In accordance with another aspect of the present invention, a picture encoding device for encoding is provided which includes enlarging/contracting means for enlarging or contracting a second picture based on the difference in resolution between first and second pictures (such as the resolution converter 24 shown in FIG. 15), first picture encoding means for predictive coding the first picture using an output of the enlarging/contracting means as a reference picture (such as the upper layer encoding unit 23 shown in FIG. 15), second picture encoding means for encoding the second picture (such as the lower layer encoding unit 25), position setting means for setting the positions of the first picture and the second picture in a pre-set absolute coordinate system and outputting first or second position information on the position of the first or second picture, respectively (such as the picture layering unit 21 shown in FIG. 15), and multiplexing means for multiplexing outputs of the first picture encoding means, second picture encoding means, and the position setting means (such as the multiplexer 26 shown in FIG. 15). The first picture encoding means is caused to recognize the position of the first picture based on the first position information and to convert the second position information in response to an enlarging ratio or a contracting ratio by which the enlarging/contracting means has enlarged or contracted the second picture. The first picture encoding means recognizes the position corresponding to the results of conversion as the position of the reference picture in order to perform predictive coding.

In accordance with the above picture encoding device and a picture encoding method, the enlarging/contracting means enlarges or contracts the second picture based on the difference in resolution between the first and second pictures, while the first picture encoding means predictively encodes the first picture using an output of the enlarging/contracting means as a reference picture. The position setting means sets the positions of the first picture and the second picture in a pre-set absolute coordinate system and outputs the first position information or the second position information on the position of the first or second picture, respectively. The first picture encoding means recognizes the position of the first picture, based on the first position information, and converts the second position information responsive to an enlarging ratio or a contracting ratio by which the enlarging/contracting means has enlarged or contracted the second picture. The first picture encoding means recognizes the position corresponding to the results of conversion as the position of the reference picture in order to perform predictive coding.

In accordance with another aspect of the present invention, a picture decoding device is provided which includes second picture decoding means for decoding a second picture (such as a lower layer decoding unit 95), enlarging/contracting means for enlarging/contracting the second picture decoded by the second picture decoding means based on the difference in resolution between first and second pictures (such as a resolution converter 94 shown in FIG. 29), and first picture decoding means for decoding the first picture using an output of the enlarging/contracting means as a reference picture (such as an upper layer decoding unit 93 shown in FIG. 29). The encoded data includes first or second position information on the position of the first and second picture, respectively, in a pre-set absolute coordinate system. The first picture decoding means recognizes the position of the first picture based on the first position information and converts the second position information in response to an enlarging ratio or a contracting ratio by which the enlarging/contracting means has enlarged or contracted the second picture. The first picture decoding means also recognizes the position corresponding to the results of conversion as the position of the reference picture in order to decode the first picture.

The above picture decoding device may include a display for displaying decoding results of the first picture decoding means (such as a monitor 74 shown in FIG. 27).

In accordance with another aspect of the present invention, a picture decoding device is provided which includes second picture decoding means for decoding a second picture (such as a lower layer decoding unit 95 shown in FIG. 29), enlarging/contracting means for enlarging/contracting the second picture decoded by the second picture decoding means based on the difference in resolution between first and second pictures (such as a resolution converter 94 shown in FIG. 29), and first picture decoding means for decoding the first picture using an output of the enlarging/contracting means as a reference picture (such as an upper layer decoding unit 93). The encoded data includes first and second position information on the position of the first and the second picture, respectively, in a pre-set absolute coordinate system. The first picture decoding means is caused to recognize the position of the first picture based on the first position information and to convert the second position information in response to an enlarging ratio or a contracting ratio by which the enlarging/contracting means has enlarged or contracted the second picture. The first picture encoding means recognizes the position corresponding to the results of conversion as the position of the reference picture in order to decode the first picture.

In accordance with the above picture decoding device and a picture decoding method, the enlarging/contracting means enlarges or contracts the second picture decoded by the second picture decoding means based on the difference in resolution between the first and second pictures. The first picture decoding means decodes the first picture using an output of the enlarging/contracting means as a reference picture. If the encoded data includes the first position information or the second position information on the position of the first picture and on the position of the second picture, respectively, in a pre-set absolute coordinate system, the first picture decoding means recognizes the position of the first picture, based on the first position information, and converts the second position information responsive to an enlarging ratio or a contracting ratio by which the enlarging/contracting means has enlarged or contracted the second picture. The first picture decoding means recognizes the position corresponding to the results of conversion as the position of the reference picture, in order to decode the first picture.

In accordance with another aspect of the present invention, a recording medium is provided which has recorded thereon encoded data including first data obtained on predictive encoding a first picture using, as a reference picture, the enlarged or contracted results obtained on enlarging or contracting a second picture based on the difference in resolution between the first and second pictures, second data obtained on encoding the second picture, and first position information or second position information obtained on setting the positions of the first and second pictures in a pre-set absolute coordinate system. The first data is obtained on recognizing the position of the first picture based on the first position information, converting the second position information in response to the enlarging ratio or contracting ratio by which the second picture has been enlarged or contracted, and on recognizing the position corresponding to the results of conversion as the position of the reference picture in order to perform predictive coding.

In accordance with another aspect of the present invention, a method for recording encoded data is provided wherein, the encoded data includes first data obtained on predictive encoding a first picture using, as a reference picture, the enlarged or contracted results obtained on enlarging or contracting a second picture based on the difference in resolution between the first and second pictures, second data obtained on encoding the second picture, and first position information or second position information obtained on setting the positions of the first and second pictures in a pre-set absolute coordinate system. The first data is obtained on recognizing the position of the first picture based on the first position information, converting the second position information in response to the enlarging ratio or contracting ratio by which the second picture has been enlarged or contracted and on recognizing the position corresponding to the results of conversion as the position of the reference picture in order to perform predictive coding.

In accordance with another aspects of the present invention, a picture encoding device is provided which includes enlarging/contracting means for enlarging or contracting a second picture based on the difference in resolution between first and second pictures (such as the resolution converter 24 shown in FIG. 15), first picture encoding means for predictive coding the first picture using an output of the enlarging/contracting means as a reference picture (such as the upper layer encoding unit 23 shown in FIG. 15), second picture encoding means for encoding the second picture (such as the lower layer encoding unit 25 shown in FIG. 15), position setting means for setting the positions of the first picture and the second picture in a pre-set absolute coordinate system and outputting the first position information or the second position information on the position of the first or second picture, respectively (such as a picture layering unit 21 shown in FIG. 15), and multiplexing means for multiplexing outputs of the first picture encoding means, second picture encoding means, and the position setting means (such as the multiplexer 26 shown in FIG. 15). The position setting means sets the positions of the first and second pictures so that the position of the reference picture in a pre-set absolute coordinate system will be coincident with a pre-set position. The first picture encoding means recognizes the position of the first picture based on the first position information and also recognizes the pre-set position as the position of the reference picture in order to perform predictive coding.

In accordance with another aspect of the present invention, a picture encoding device for performing picture encoding is provided which includes enlarging/contracting means for enlarging or contracting a second picture based on the difference in resolution between first and second pictures (such as the resolution converter 24 shown in FIG. 15), first picture encoding means for predictive coding of the first picture using an output of the enlarging/contracting means as a reference picture (such as the upper layer encoding unit 23 shown in FIG. 15), second picture encoding means for encoding the second picture (such as the lower layer encoding unit 25 shown in FIG. 15), position setting means for setting the positions of the first picture and the second picture in a pre-set absolute coordinate system and outputting first position information or second position information on the position of the first or second picture, respectively (such as a picture layering unit 21 shown in FIG. 15), and multiplexing means for multiplexing outputs of the first picture encoding means, second picture encoding means, and the position setting means (such as the multiplexer 26 shown in FIG. 15). The position setting means causes the positions of the first and second pictures to be set so that the position of the reference picture in a pre-set absolute coordinate system will be coincident with the pre-set position. The first picture encoding means may recognize the position of the first picture as the position of the reference picture based on the first position information and to recognize the pre-set position as the position of the reference picture in order to perform predictive coding.

In accordance with the above picture encoding device and picture encoding method, the enlarging/contracting means enlarges or contracts the second picture based on the difference in resolution between the first and second pictures, while the first picture encoding means predictively encodes the first picture using an output of the enlarging/contracting means as a reference picture. The position setting means sets the positions of the first picture and the second picture in a pre-set absolute coordinate system and outputs the first position information or the second position information on the position of the first or second picture, respectively. The position setting means sets the positions of the first and second pictures so that the position of the reference picture in the pre-set absolute coordinate system will be coincident with a pre-set position. The first picture encoding means recognizes the position of the first picture based on the first position information and recognizes the pre-set position as the position of the reference picture in order to perform predictive coding.

In accordance with another aspect of the present invention, a picture decoding device for decoding encoded data is provided which includes second picture decoding means for decoding a second picture (such as an upper layer decoding unit 93 shown in FIG. 29), enlarging/contracting means for enlarging/contracting the second picture decoded by the second picture decoding means based on the difference in resolution between the first and second pictures (such as the resolution converter 94 shown in FIG. 29), and first picture decoding means for decoding the first picture using an output of the enlarging/contracting means as a reference picture (such as a lower layer decoding unit 95 shown in FIG. 29). The encoded data includes first position information or second position information on the position of the first picture or the position of the second picture, respectively, in a pre-set absolute coordinate system, in which the position of the reference picture in the pre-set absolute coordinate system has been set so as to be coincident with a pre-set position. The first picture decoding means recognizes the position of the first picture based on the first position information and recognizes the pre-position as the position of the reference picture in order to decode the first picture.

The above picture decoding device may include a display for displaying decoding results of the first picture decoding means (such as the monitor 74 shown in FIG. 27).

In accordance with another aspect of the present invention, a picture decoding device is provided which includes second picture decoding means for decoding a second picture (such as the upper layer decoding unit 93 shown in FIG. 29), enlarging/contracting means for enlarging/contracting the second picture decoded by the second picture decoding means based on the difference in resolution between first and second pictures (such as the resolution converter 94 shown in FIG. 29), and first picture decoding means for decoding the first picture using an output of the enlarging/contracting means as a reference picture (such as the lower layer decoder unit 95 shown in FIG. 29). The encoded data includes first position information or second position information on the position of the first picture or the position of the second picture in a pre-set absolute coordinate system in which the position of the reference picture in the pre-set coordinate system has been set so as to coincide with a pre-set position. The first picture decoding means is caused to recognize the position of the first picture based on the first position information and to recognize the pre-set position as the position of the reference picture in order to decode the first picture.

In accordance with the above picture decoding device and picture decoding method, the enlarging/contracting means enlarges or contracts the second picture decoded by the second picture decoding means based on the difference in resolution between the first and second pictures. If the encoded data includes the first position information or the second position information on the position of the first picture or on the position of the second picture, respectively, in a pre-set absolute coordinate system, in which the position of the reference picture in the pre-set absolute coordinate system has been set so as to be coincident with a pre-set position, the first picture decoding means recognizes the position of the first picture, based on the first position information, and recognizes the pre-position as the position of the reference picture, in order to decode the first picture.

In accordance with another aspect of the present invention, a recording medium is provided which has recorded thereon encoded data including first data obtained on predictive encoding a first picture using, as a reference picture, enlarged or contracted results obtained on enlarging or contracting a second picture based on the difference in resolution between the first and second pictures, second data obtained on encoding the second picture, and first position information or second position information obtained on setting the positions of the first and second pictures in a pre-set absolute coordinate system. The first position information and the second information having been set so that the position of the reference picture in the pre-set coordinate system will be coincident with a pre-set position.

In accordance with another aspect of the present invention, a recording method is provided for recording encoding data in which the encoded data includes first data obtained on predictive encoding a first picture using, as a reference picture, enlarged or contracted results obtained on enlarging or contracting a second picture based on the difference in resolution between the first and second pictures, second data obtained on encoding the second picture, and first position information or second position information obtained on setting the positions of the first and second pictures in a pre-set absolute coordinate system. The first position information and the second position information having been set so that the position of the reference picture in the pre-set absolute coordinate system will be coincident with a pre-set position.

In accordance with another aspect of the present invention, a picture encoding device is provided which includes first predictive coding means for predictive coding a picture (such as the lower layer encoding unit 25 shown in FIG. 15), local decoding means for locally decoding the results of predictive coding by the first predictive coding means (such as the lower layer encoding unit 25), second predictive coding means for predictive coding the picture using a locally decoded picture outputted by the local decoding means as a reference picture (such as the upper layer encoding unit 23 shown in FIG. 15), and multiplexing means for multiplexing the results of predictive coding by the first and second predictive coding means with only the motion vector used by the first predictive coding means in performing predictive coding (such as the multiplexer 26 shown in FIG. 15).

In accordance with another aspect of the present invention, a picture encoding method is provided which includes predictive coding a picture for outputting first encoded data, locally decoding the first encoded data, predictive coding the picture using a locally decoded picture obtained as a result of local decoding to output second encoded data, and multiplexing the first encoded data and the second encoded data only with the motion vector used for obtaining the first encoded data.

In accordance with the above picture encoding device and picture encoding method, a picture is predictively encoded to output first encoded data, the first encoded data is locally decoded and the picture is predictively encoded using, as a reference picture, a locally decoded picture obtained on local decoding to output second encoded data. The first and second encoded data are multiplexed using only the motion vector used for obtaining the first encoded data.

In accordance with another aspect of the present invention, a picture decoding device for decoding encoded data is provided which includes separating means for separating first and second data from the encoded data (such as a demultiplexer 91 shown in FIG. 29), first decoding means for decoding the first data (such as the lower layer decoding unit 95 shown in FIG. 29), and second decoding means for decoding the second data using an output of the first decoding means as a reference picture (such as the upper layer decoding unit 93 shown in FIG. 29). The encoded data includes only the motion vector used in predictive coding the first data. The second decoding means decodes the second data in accordance with the motion vector used in predictive coding the first data.

In accordance with another aspect of the present invention, a picture decoding device for decoding encoded data is provided which includes separating means for separating first and second data from the encoded data (such as the demultiplexer 91 shown in FIG. 29), first decoding means for decoding the first data (such as the lower layer decoding unit 95 shown in FIG. 29), and second decoding means for decoding the second data using an output of the first decoding means as a reference picture (such as the upper layer decoding unit 93 shown in FIG. 29). If the encoded data includes only the motion vector used in predictive coding the first data, the second decoding means is caused to decode the second data in accordance with the motion vector used in predictive coding the first data.

In accordance with the above picture decoding device and picture decoding method, the first decoding means decodes the first data and the second decoding means decodes the second data using an output of the first decoding means as a reference picture. If the encoded data includes only the motion vector used in predictive coding the first data; the second decoding means decodes the second data in accordance with the motion vector used in predictive coding the first data.

In accordance with another aspect of the present invention, a recording medium is provided which has recorded thereon encoded data which is obtained on predictive coding a picture for outputting first encoded data, locally decoding the first encoded data, predictive coding the picture using a locally decoded picture obtained as a result of local decoding to output second encoded data, and multiplexing the first encoded data and the second encoded data only with the motion vector used for obtaining the first encoded data.

In accordance with another aspect of the present invention, a method for recording encoded data is provided in which the encoded data is obtained on predictive coding a picture and outputting first encoded data, locally decoding the first encoded data, predictive coding the picture using a locally decoded picture obtained as a result of local decoding to output second encoded data, and multiplexing the first encoded data and the second encoded data only with the motion vector used for obtaining the first encoded data.

In accordance with another aspect of the present invention, a picture encoding device is provided wherein whether or not a macro-block is a skip macro-block is determined based on reference picture information specifying a reference picture used in encoding a macro-block of a B-picture by one of forward predictive coding, backward predictive coding or bidirectionally predictive coding.

In accordance with another aspect of the present invention, a picture encoding method is provided wherein whether or not a macro-block is a skip macro-block is determined based on reference picture information specifying a reference picture used in encoding a macro-block of a B-picture by one of forward predictive coding, backward predictive coding or bidirectionally predictive coding.

In accordance with another aspect of the present invention, a picture decoding device is provided wherein whether or not a macro-block is a skip macro-block is determined based on reference picture information specifying a reference picture used in encoding a macro-block of a B-picture by one of the forward predictive coding, backward predictive coding, or bidirectionally predictive coding.

In accordance with another aspect of the present invention, a picture decoding method is provided wherein whether or not a macro-block is a skip macro-block is determined based on reference picture information specifying a reference picture used in encoding a macro-block of a B-picture by one of the forward predictive coding, backward predictive coding, or bidirectionally predictive coding.

In accordance with another aspect of the present invention, a recording medium having recorded thereon encoded data is provided wherein a macro-block is a skip macro-block based on reference picture information specifying a reference picture used in encoding a macro-block of a B-picture by one of forward predictive coding, backward predictive coding, or bidirectionally predictive coding.

In accordance with another aspect of the present invention, a recording method f o r recording encoded data is provided in which a macro-block is a skip macro-block based on reference picture information specifying a reference picture used in encoding a macro-block of a B-picture by one of forward predictive coding, backward predictive coding or bidirectionally predictive coding.

In accordance with another aspect of the present invention, a picture processing device is provided in which a pre-set table used for variable length encoding or variable length decoding is modified in keeping with changes in size of a picture.

In accordance with another aspect of the present invention, a picture processing method is provided in which it is judged whether or not a picture is changed in size and a pre-set table used for variable length encoding or variable length decoding is modified in keeping with changes in size of the picture.

In accordance with another aspect of the present invention, a picture processing device is provided in which a pre-set table used for variable length encoding or variable length decoding is modified according to whether or not a picture of a layer different from and a timing same as a layer of a picture being encoded has been used as a reference picture.

In accordance with another aspect of the present invention, a picture processing method is provided in which a pre-set table used for variable length encoding or variable length decoding is modified according to whether or not a picture of a layer different from and a timing same as a layer of a picture being encoded has been used as a reference picture.

In accordance with another aspect of the present invention, a picture encoding device is provided in which a pre-set quantization step is quantized only if all of the results of quantization of pixel values in a pre-set block of a picture are not all of the same value.

The picture encoding device above for at least quantizing a picture by a pre-set quantization step includes multiplexing means for multiplexing the results of quantization of the picture and the pre-set quantization step (such as VLC unit 11 shown in FIGS. 22 and 23).

In accordance with another aspect of the present invention, a picture encoding method is provided in which a pre-set quantization step is quantized only if all of the results of quantization of pixel values in a pre-set block of a picture are not all of the same value.

In accordance with another aspect of the present invention, a picture decoding device for decoding encoded data is provided in which the encoded data contains a pre-set quantization step only if all of the results of quantization of pixel values in a pre-set block of a picture are not all of the same value.

In accordance with another aspect of the present invention, a picture decoding method for decoding encoding data is provided in which the encoded data contains a pre-set quantization step only if all of the results of quantization of pixel values in a pre-set block of a picture are not all of the same value.

In accordance with another aspect of the present invention, a recording medium having encoded data recorded thereon is provided in which the encoded data contains a pre-set quantization step only if all of the results of quantization of pixel values in a pre-set block of a picture are not all of the same value.

In accordance with another aspect of the present invention, a recording method for recording encoded data is provided in which the encoded data contains a pre-set quantization step only if all of the results of quantization of pixel values in a pre-set block of a picture are not all of the same value.

BRIEF DESCRIPTION OF THE DRAWINGS

FIGS. 26A and 26B illustrate referential select code (ref_select_code);

FIG. 33 illustrates VS syntax;

FIG. 34 illustrates VO syntax;

FIG. 35 illustrates VOL syntax;

FIG. 36 illustrates VOP syntax;

FIG. 37 illustrates VOP syntax;

FIG. 38 shows variable length code of diff_size_horizontal and diff_size_vertical;

FIG. 39 shows variable length code of diff_VOP_horizontal_ref and diff_VOP_vertical_ref;

FIGS. 40A and 40B illustrate macro-block syntax;

FIGS. 41A and 41B illustrate MODV variable length code;

FIGS. 43A and 43B show variable length code of MBTYPE;

DESCRIPTION OF THE PREFERRED EMBODIMENTS

Figure 12:
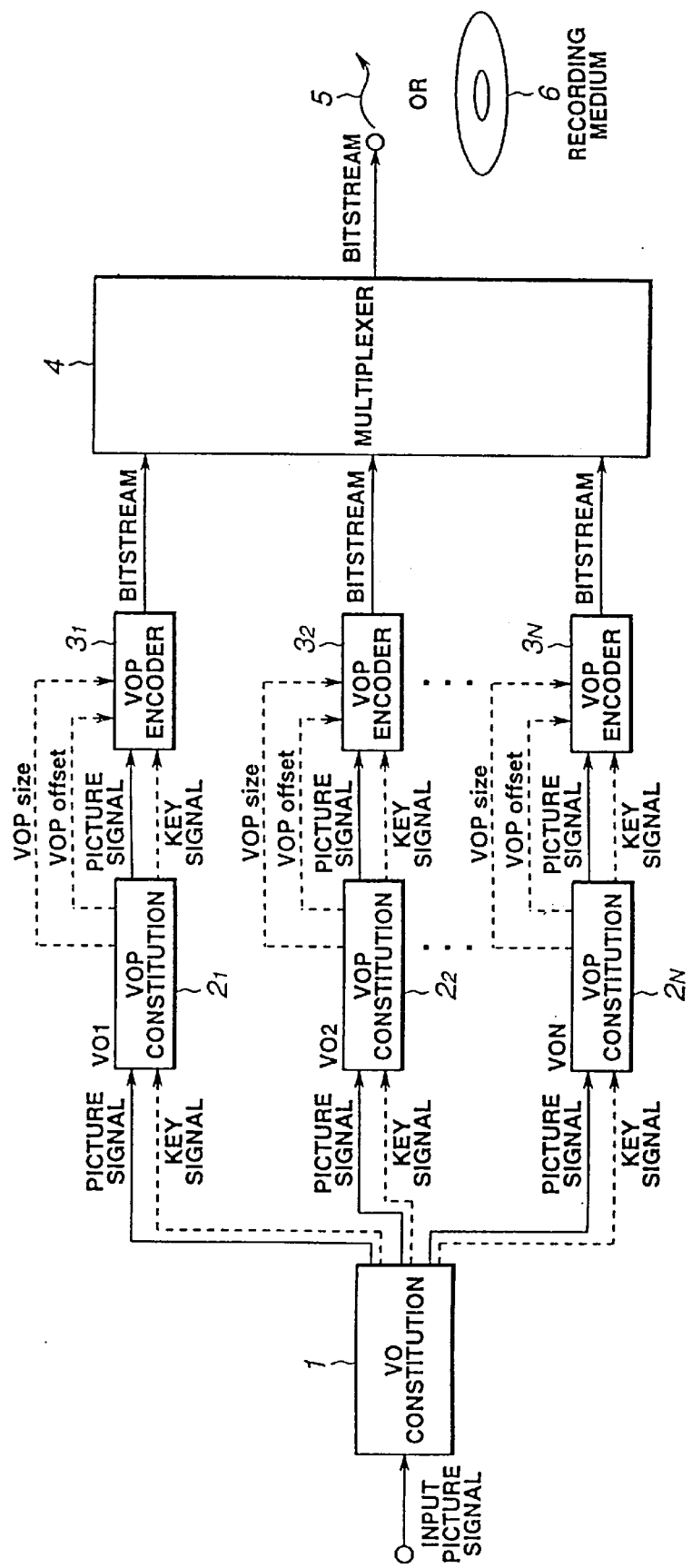
FIG. 12 is a diagram of an encoder according to an embodiment of the present invention.

FIG. 12 illustrates an encoder according to an embodiment of the present invention. In such encoder, picture data for encoding are entered to a VO (video object) constructing unit 1 which extracts an object of a picture supplied thereto to construct a VO. The VO constructing unit 1 may generate a key signal for each VO and may output the generated key signal along with the associated VO signal to VOP (video object plane) constructing units $2_1$ to $2_N$. That is, if N number of VOs (VO1 to VO#N) are constructed in the VO constructing unit 1, such N VOs are outputted to the VOP constructing units $2_1$ to $2_N$ along with associated key signals. More specifically, the picture data for encoding may include the background F1, foreground F2, and a key signal K1. Further, assume that a synthesized picture can be generated therefrom by use of a chroma key. In this situation, the VO constructing unit 1 may output the foreground F2 as VO1 and the key signal K1 as the key signal for the VO1 to the VOP constructing unit $2_1$; and the VO constructing unit 1 may output the background F1 as VO2 to the VOP constructing unit $2_2$. As for the background, a key signal may not be required and, as such, is not generated and outputted.

If the picture data for encoding contains no key signal, as for example if the picture data for encoding is a previously synthesized picture, the picture is divided in accordance with a pre-set algorithm for extracting one or more areas and for generating a key signal associated with the extracted area. The VO constructing unit 1 sets a sequence of the extracted area to VO, which sequence is outputted along with the generated key signal to the associated VOP constructing unit 2n, where n=1, 2, . . . , N.

The VOP constructing unit 2n constructs a VO plane (VOP) from the output of the VO constructing unit 1 such that the number of horizontal pixels and vertical pixels will each be equal to a predetermined multiple, such as that of 16. If a VOP is constructed, the VOP constructing unit $2_n$ outputs the VOP along with a key signal for extracting picture data of an object portion contained in the VOP, such as luminance or chroma signals, to a VOP encoding unit $3_n$ (where n=1, 2, . . . n). This key signal is supplied from the VO constructing unit 1, as described above. The VOP constructing unit $2_n$ detects size data (VOP size) which represents the size (such as the longitudinal length and the transverse length) of a VOP, and offset data (VOP offset) which represents the position of the VOP in the frame (for example, coordinates with the left uppermost point of the frame as a point of origin) and also supplies such data to the VOP encoding unit $3_n$.

The VOP encoding unit $3_n$ encodes an output of the VOP constructing unit $2_n$ in accordance with a predetermined standard, such as a MPEG or H.263 standard, and outputs the resulting bitstream to a multiplexing unit 4. The multiplexing unit 4 multiplexes the bitstreams from the VOP encoding units $3_1$ to $3_N$ and transmits the resulting multiplexed data as a ground wave or via a satellite network, CATV network or similar transmission path 5, or records the multiplexed data in a recording medium 6 (such as a magnetic disc, magneto-optical disc, an optical disc, a magnetic tape or the like).

VO and VOP will now be further explained.

VO may be a sequence of respective objects making up a synthesized picture in case there is a sequence of pictures for synthesis, while VOP is a VO at a given time point. That is, if there is a synthesized picture F3 synthesized from pictures F1 and F2, the pictures F1 or F2 arrayed chronologically are each a VO, while the pictures F1 or F2 at a given time point are each a VOP. Therefore, a VO may be a set of VOPs of the same object at different time points.

If the picture F1 is the background and the picture F2 is the foreground, the synthesized picture F3 is obtained by synthesizing pictures F1 and F2 using a key signal for extracting the picture F2. In this situation, the VOP of the picture F2 includes not only picture data constituting the picture F2 (luminance and chroma signals) but also the associated key signals.

Figure 13:
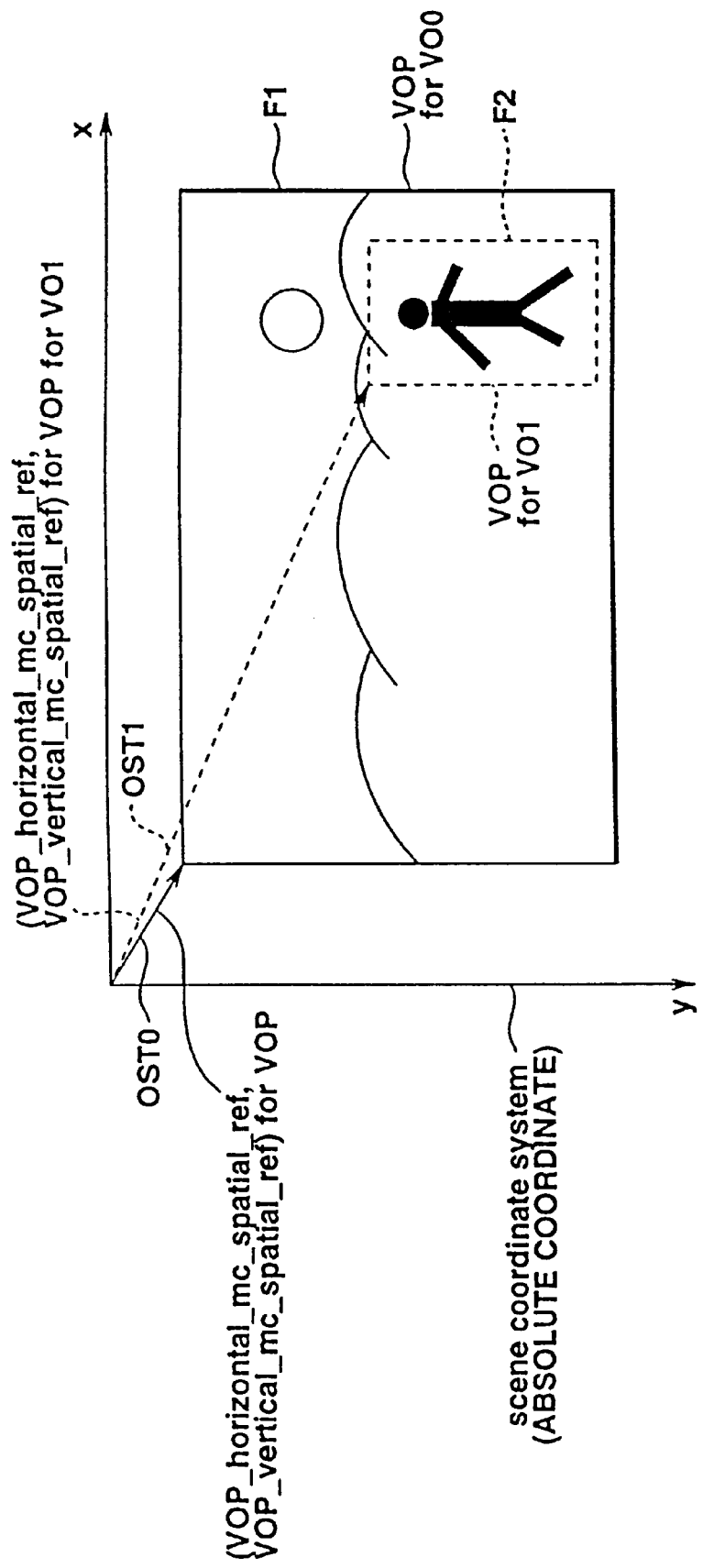
FIG. 13 is a diagram to which reference will be made in explaining how the VO position and size are changed with time.

Although the sequence of picture frames (screen frame) may not be changed in size or position, the VO may be changed in size and/or position. That is, the VOPs making up the same VO may be changed with time in size and/or position. For example, FIG. 13 shows a synthesized picture made up of a picture F1 as the background and a picture F2 as the foreground. The picture F1 is a photographed landscape in which a sequence of the entire picture represents a VO (termed VO0) and the picture F2 is a walking person as photographed in which a sequence of a minimum rectangle encircling the person represents a VO (termed VO1). In this example, VO0 (which is a landscape) basically does not changed in position or size, as is a usual picture or screen frame. On the other hand, VO1 (which is a picture of a person) changes in size or position as he or she moves towards the front or back of the drawing. Therefore, although FIG. 13 shows VO0 and VO1 at the same time point, the position and size of the two may not necessarily be the same. As a result, the VOP encoding unit $3_n$ (FIG. 12) provides in its output bitstream not only data of the encoded VOP but also information pertaining to the positions (coordinates) and size of the VOP in a pre-set absolute coordinate system. FIG. 13 illustrates a vector OSTO which specifies the position of VO0 (VOP) at a given time point and a vector OST1 which specifies the position of VO1 (VOP) at the same time point.

Figure 14:
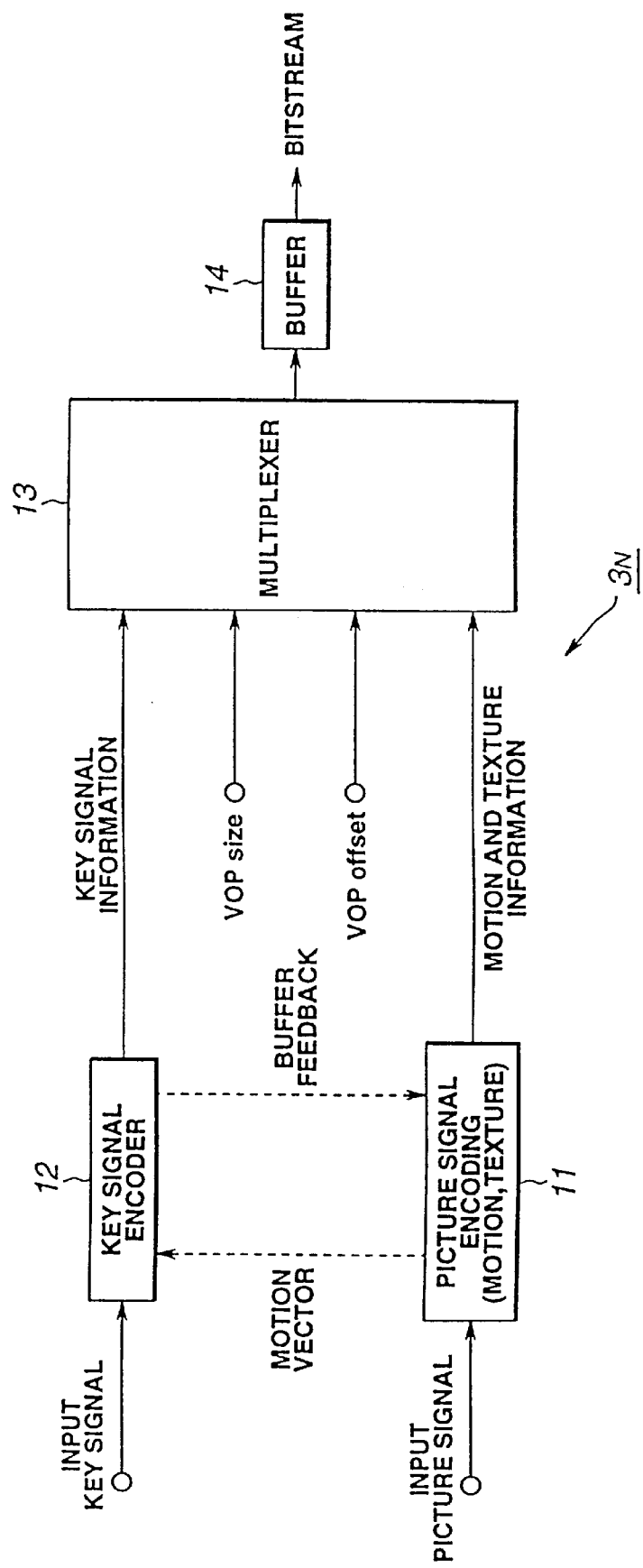
FIG. 14 is a diagram of an illustrative structure of VOP encoding units $3_1$ to $3_N$ of FIG. 12.

FIG. 14 illustrates a basic structure of the VOP encoding unit $3_n$ of FIG. 12. As shown in FIG. 14, the picture signal (picture data) from the VOP constructing unit $2_n$ (luminance signals and chroma signals making up a VOP) is supplied to a picture signal encoding unit 11, which may be similarly constructed to the above encoder of FIG. 1, wherein the VOP is encoded in accordance with a system conforming to the MPEG or H.263 standard. Motion and texture information, obtained on encoding the VOP by the picture signal encoding unit 11, is supplied to a multiplexer 13. As further shown in FIG. 14, the key signal from the VOP constructing unit $2_n$ is supplied to a key signal encoding unit 12 where it is encoded by, for example, differential pulse code modulation (DPCM). The key signal information obtained from the encoding by the key signal encoding unit 12 is also supplied to the multiplexer 13. In addition to the outputs of the picture signal encoding unit 11 and the key signal encoding unit 12, the multiplexer 13 also requires size data (VOP size) and offset data (VOP offset) from the VOP constructing unit $2_n$. The multiplexer 13 multiplexes the received data and outputs multiplexed data to a buffer 14 which transiently stores such output data and smooths the data volume so as to output smoothed data.

The key signal encoding unit 12 may perform not only DPCM but also motion compensation of the key signal in accordance with a motion vector detected by, for example, predictive coding carried out by the picture signal encoding unit 11 in order to calculate a difference from the key signal temporally before or after the motion compensation for encoding the key signal. Further, the data volume of the encoding result of the key signal in the key signal encoding unit 12 (buffer feedback) can be supplied to the picture signal encoding unit 11. A quantization step may be determined in the picture signal encoding unit 11 from such received data volume.

Figure 15:
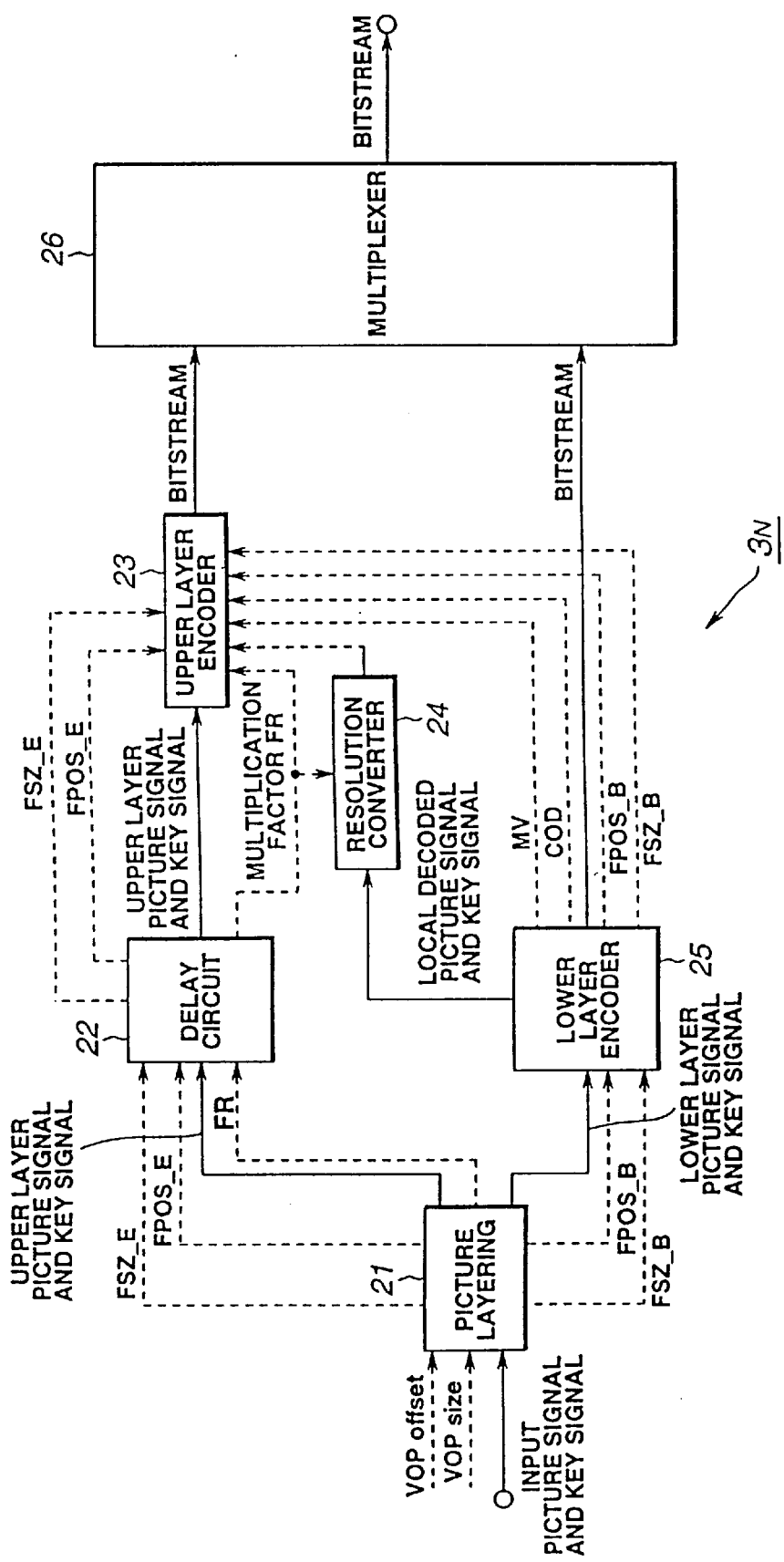
FIG. 15 is a diagram of another illustrative structure of VOP encoding units 31 to 3N of FIG. 12.

FIG. 15 illustrates a structure of the VOP encoding unit $3_n$ of FIG. 12 which is configured for realization of scalability. As shown in FIG. 15, the VOP picture data from the VOP constructing unit $2_n$, its key signal, size data (VOP size), and offset data (VOP offset) are all supplied to a picture layering unit 21 which generates picture data of plural layers, that is, layers the VOPs. More specifically, in encoding the spatial scalability, the picture layering unit 21 may output the picture data and the key signal supplied thereto directly as picture data and key signals of an upper layer (upper order hierarchy) while thinning out pixels constituting the picture data and the key signals for lowering resolution in order to output the resulting picture data and the key signals of a lower layer (lower hierarchical order). The input VOP may also be lower layer data, while its resolution may be raised (its number of pixels may be increased) so as to be upper layer data.

A further description of the above-mentioned scalability operation will be provided. In this description, only two layers are utilized and described, although the number of layers may be three or more.

In the case of encoding of temporal scalability, the picture layering unit 21 may output the picture signals and the key signals alternately as upper layer data or lower layer data depending on time points. If the VOPs making up a VO are entered in the sequence of VOP0, VOP1, VOP2, VOP3, . . . , to the picture layering unit 21, the latter outputs the VOPs VOP0, VOP2, VOP4, VOP6, . . . , as lower layer data, while outputting VOPs VOP1, VOP3, VOP5, VOP7, . . . , as upper layer data. In temporal scalability, simply the thinned-out VOPs may be lower layer data and upper layer data, while picture data are not enlarged nor contracted, that is, resolution conversion is not performed, although such resolution conversion can be performed.

In the case of using encoding SNR (signal to noise ratio) scalability, input picture signals and key signals are directly outputted as upper layer data or lower layer data. That is, in this case, the input picture signals and key signals of the upper and lower layers may be the same data.

The following three types of spatial scalability may occur in the case of encoding on a VOP basis.

Figure 16A:
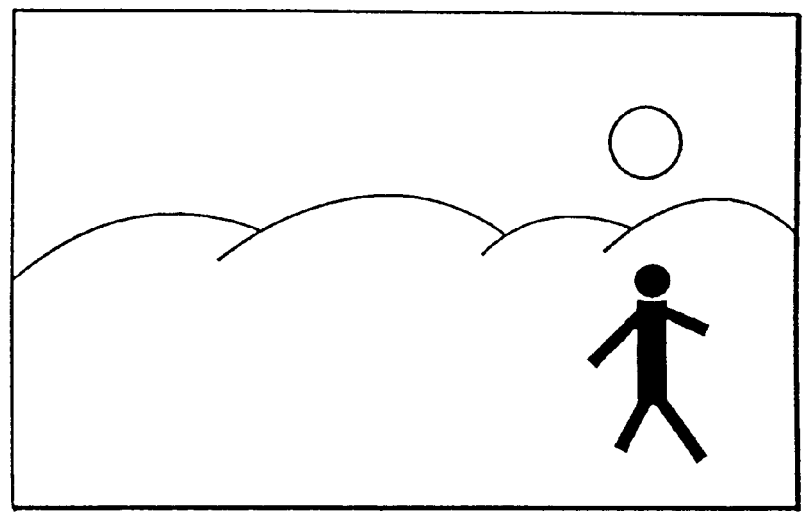
FIGS. 16A and 16B are diagrams to which reference will be made in explaining spatial scalability.
Figure 16B:
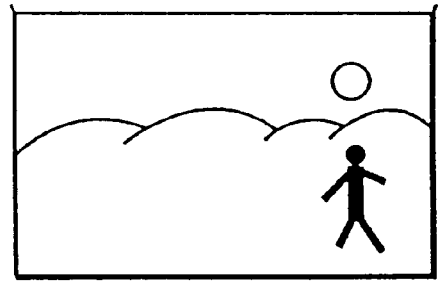

If a synthesized picture made up of the pictures F1 and F2 shown in FIG. 13 is supplied as VOP, the first spatial scalability is to turn the input VOP in its entirety into an upper layer (enhancement layer) as shown in FIG. 16A, while turning the VOP contracted in its entirety to a lower layer (base layer) as shown in FIG. 16B.

Figure 17A:
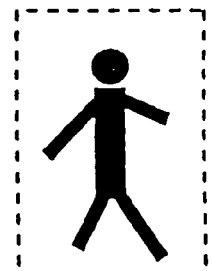
FIGS. 17A and 17B are diagrams to which reference will be made in explaining spatial scalability.
Figure 17B:
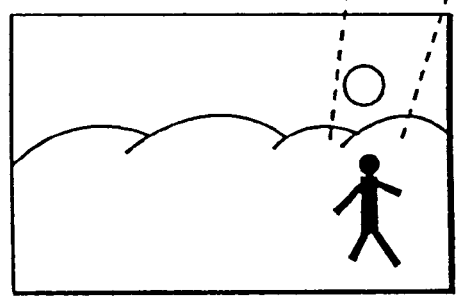

The second spatial scalability is to extract an object constituting a portion of the input VOP corresponding to a picture F2 and to turn it into an upper layer as shown in FIG. 17A, while turning the VOP in its entirety into a lower layer (base layer) as shown in FIG. 17B. This extraction may be performed in the VOP constructing unit 2, so that an object extracted in this manner may be thought of as a VOP.

Figure 18A:
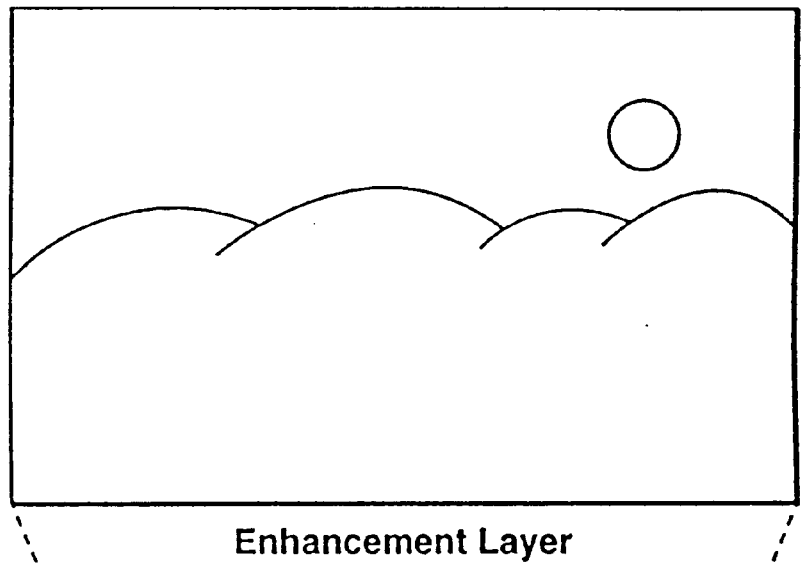
FIGS. 18A and 18B are diagrams to which reference will be made in explaining spatial scalability.
Figure 18B:
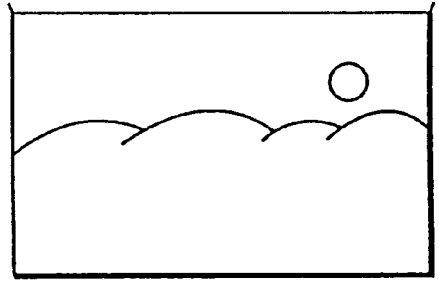
Figures 19A, 19B:
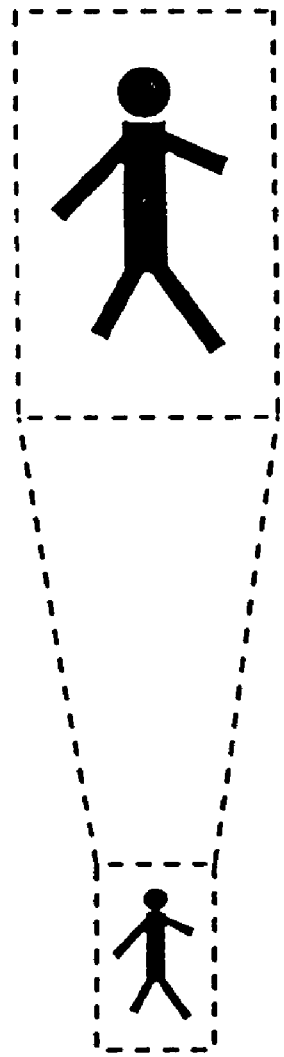
FIGS. 19A and 19B are diagrams to which reference will be made in explaining spatial scalability.

The third spatial scalability is to extract objects (VOPs) constituting the input VOP so as to generate an upper layer and a lower layer on a VOP basis, as shown in FIGS. 18A, 18B, 19A, and 19B. In FIGS. 18A and 18B, the upper and lower layers are generated from the background (picture F1) constituting the VOP of FIG. 13; while in FIGS. 19A and 19B, the upper and lower layers are generated from the foreground (picture F2) constituting the VOP of FIG. 13.

A desired type of spatial scalability may be selected or pre-determined from among the above-described three types, such that the picture layering unit 21 layers the VOPs for enabling the encoding by the pre-set scalability.

From the size data and offset data of the VOPs supplied to the picture layering unit, 21 (sometimes referred to herein as initial size data and initial offset data, respectively), the picture layering unit 21 calculates (sets) offset data and size data specifying the position and size in a pre-set absolute coordinate system of the generated lower layer and upper layer VOPs, respectively.

The manner of setting the offset data (position information) and the size data of the upper and lower layers is explained with reference to the above-mentioned second scalability (FIGS. 17A and 17B). In this case, offset data FPOS_B of the lower layer is set so that, if picture data of the lower layer is enlarged (interpolated) based on the resolution and difference in resolution from the upper layer, that is if the picture of the lower layer is enlarged with an enlarging ratio (multiplying factor FR), the offset data in the absolute coordinate system of the enlarged picture will be coincident with the initial offset data. The enlarging ratio is a reciprocal of the contraction ratio by which the upper layer picture is contracted to generate a picture of the lower layer. Similarly, size data FSZ_B of the lower layer is set so that the size data of the enlarged picture obtained on enlarging the picture of the lower layer by the multiplying factor FR will be coincident with the initial size data. On the other hand, offset data FPOS_E of the upper layer is set to a value of a coordinate such as, for example, that of the upper left apex of a 16-tupled minimum rectangle (VOP) surrounding an object extracted from the input VOP, as found based on the initial offset data, as shown in FIG. 20B. Additionally, size data FSZ_E of the upper layer may be set to the transverse length and the longitudinal length of a 16-tupled minimum rectangle (VOP) surrounding an object extracted from the input VOP.

Figure 20A:
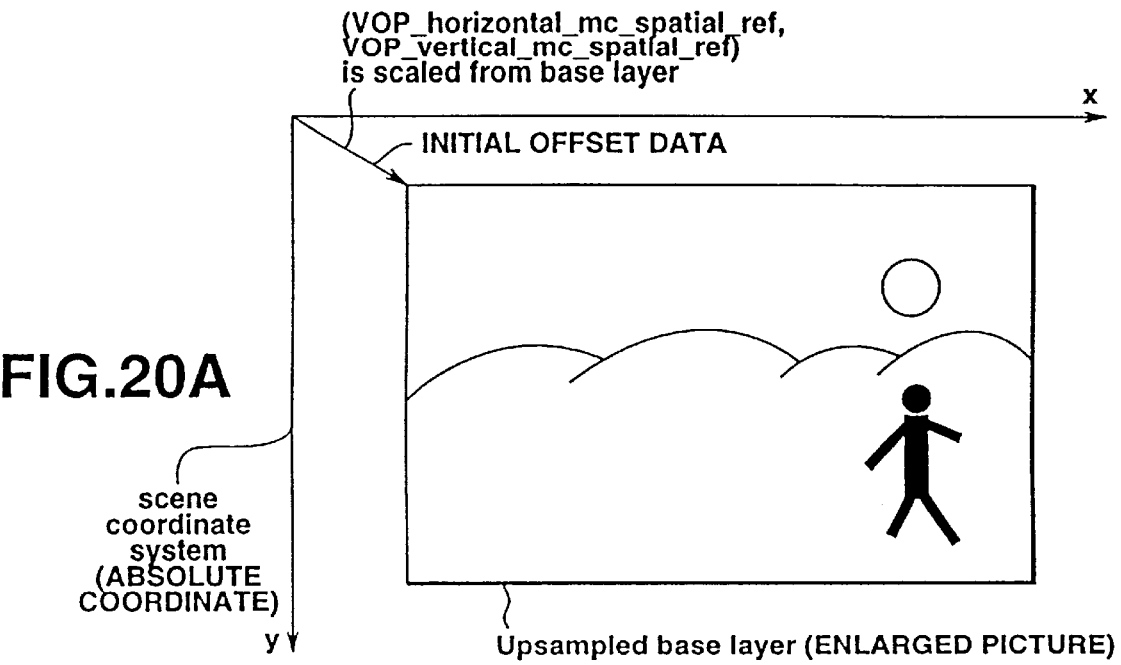
FIGS. 20A and 20B are diagrams to which reference will be made in explaining a method for determining VOP size data and offset data.
Figure 20B:
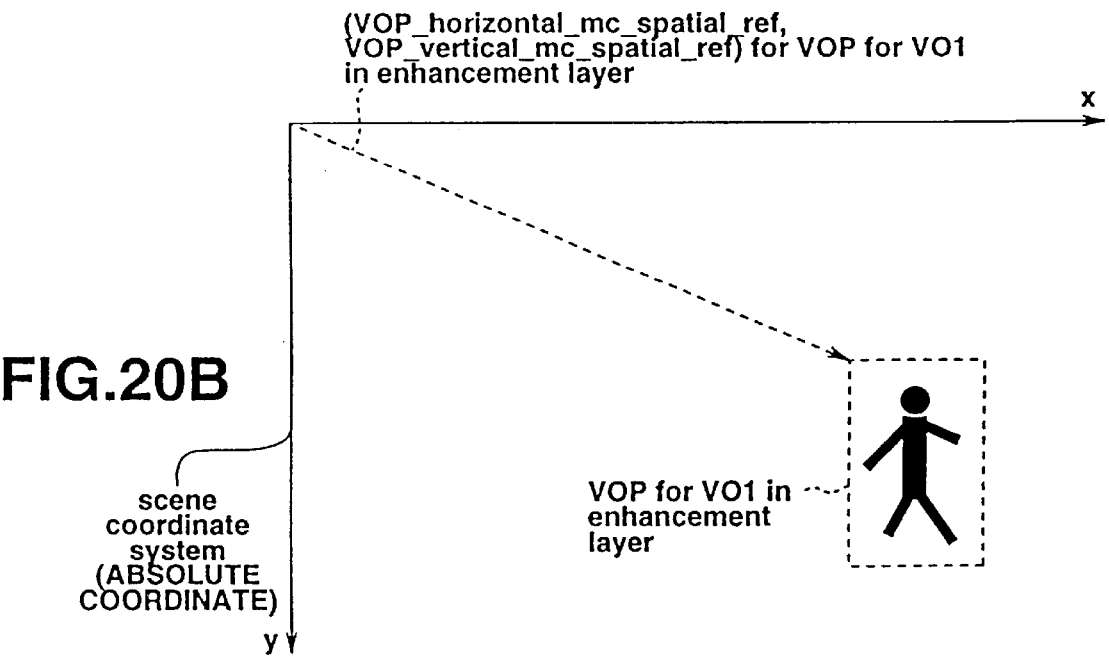

Therefore, if the offset data FPOS_B and the size data FSZ_B of the lower layer are converted in accordance with the multiplying factor FR, a picture frame of a size corresponding to the converted size data FSZ_B may be thought of at a position corresponding to the converted offset data FPOS_B in the absolute coordinate system, an enlarged picture obtained on multiplying the lower layer picture data by FR may be arranged as shown in FIG. 20A and the picture of the upper layer may be similarly arranged in accordance with the offset data FPOS_E and size data FSZ_E of the upper layer in the absolute coordinate system (FIG. 20B), in which associated pixels of the enlarged picture and of the upper layer picture are in a one-for-one relationship. That is, in this case, the person in the upper layer picture is at the same position as the person in the enlarged picture, as shown in FIGS. 20A and 20B.

In using the first and third types of scalability, the offset data FPOS_B or FPOS_E and size data FZS_B and FZS_E are determined so that associated pixels of the lower layer enlarged picture and the upper layer enlarged picture will be arranged at the same positions in the absolute coordinate system.

Figure 21A:
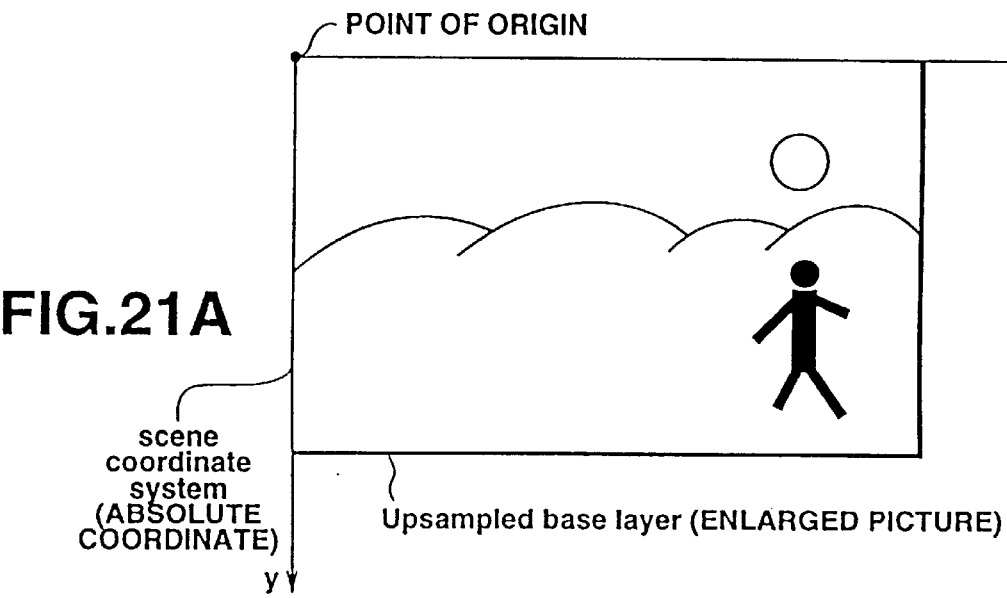
FIGS. 21A and 21B are diagrams to which reference will be made in explaining a method for determining VOP size data and offset data.
Figure 21B:
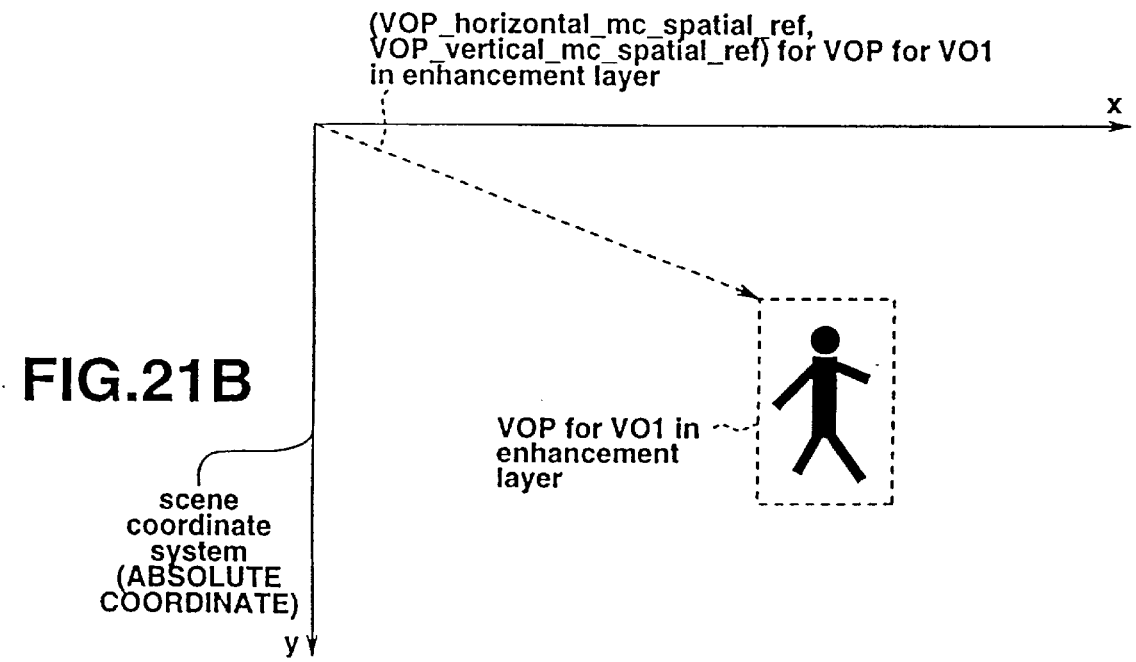

The offset data FPOS_B, FPOS_E and size data FZS_B, FZS_E may be determined as follows. That is, the offset data FPOS_B of the lower layer may be determined so that the offset data of the enlarged picture of the lower layer will be coincident with a pre-set position in the absolute coordinate system such as the point of origin, as shown in FIG. 21A. On the other hand, the offset data FPOS_E of the upper layer is set to a value of a coordinate, such as the upper left apex of a 16-tupled minimum rectangle (VOP) surrounding an object extracted from the input VOP as found based on the initial offset data, less the initial offset data, as shown for example in FIG. 21B. In FIGS. 21A and 21B, the size data FSZ_B of the lower layer and the size data FZS_E of the upper layer may be set in a manner similar to that explained with reference to FIGS. 20A and 20B.

When the offset data FPOS_B and FPOS_E are set as described above, associated pixels making up the enlarged picture of the lower layer and the picture of the upper layer are arrayed at the associated positions in the absolute coordinate system.

Returning to FIG. 15, picture data, key signals, offset data FPOS_E, and size data FSZ_E of the upper layer generated in the picture layering unit 21 are supplied to a delay circuit 22 so as to be delayed thereat by an amount corresponding to a processing time in a lower layer encoding unit 25 as later explained. Output signals from the delay circuit 22 are supplied to the upper layer encoding unit 23. The picture data, key signals, offset data FPOS_B, and size data FSZ_B of the lower layer are supplied to a lower layer encoding unit 25. The multiplying factor FR is supplied via the delay circuit 22 to the upper layer encoding unit 23 and to a resolution converter 24.

The lower layer encoding unit 25 encodes the picture data (second picture) and key signals of the lower layer. Offset data FPOS_B and size data FSZ_B are contained in the resulting encoded data (bitstream) which is supplied to a multiplexer 26. The lower layer encoding unit 25 locally decodes the encoded data and outputs the resulting locally decoded picture data of the lower layer to the resolution convertor 24. The resolution converter 24 enlarges or contracts the picture data of the lower layer received from the lower layer encoding unit 25 in accordance with the multiplying factor FR so as to revert the same to the original size. The resulting picture, which may be an enlarged picture, is outputted to the upper layer encoding unit 23.

The upper layer encoding unit 23 encodes picture data (first picture) and key signals of the upper layer. Offset data FPOS_E and size data FSZ_E are contained in the resulting encoded data (bitstream) which is supplied to the multiplexer 26. The upper layer encoding unit 23 encodes the picture data using the enlarged picture supplied from the resolution converter 24.

The lower layer encoding unit 25 and the upper layer encoding unit 23 are supplied with size data FSZ_B, offset data FPOS_B, a motion vector MV, and a flag COD. The upper layer encoding unit 23 refers to or utilizes such data or information as appropriate or needed during processing, as will be more fully hereinafter described.

The multiplexer 26 multiplexes the outputs from the upper layer encoding unit 23 and the lower layer encoding unit 25 and supplies therefrom the resulting multiplexed signal.

Figure 1:
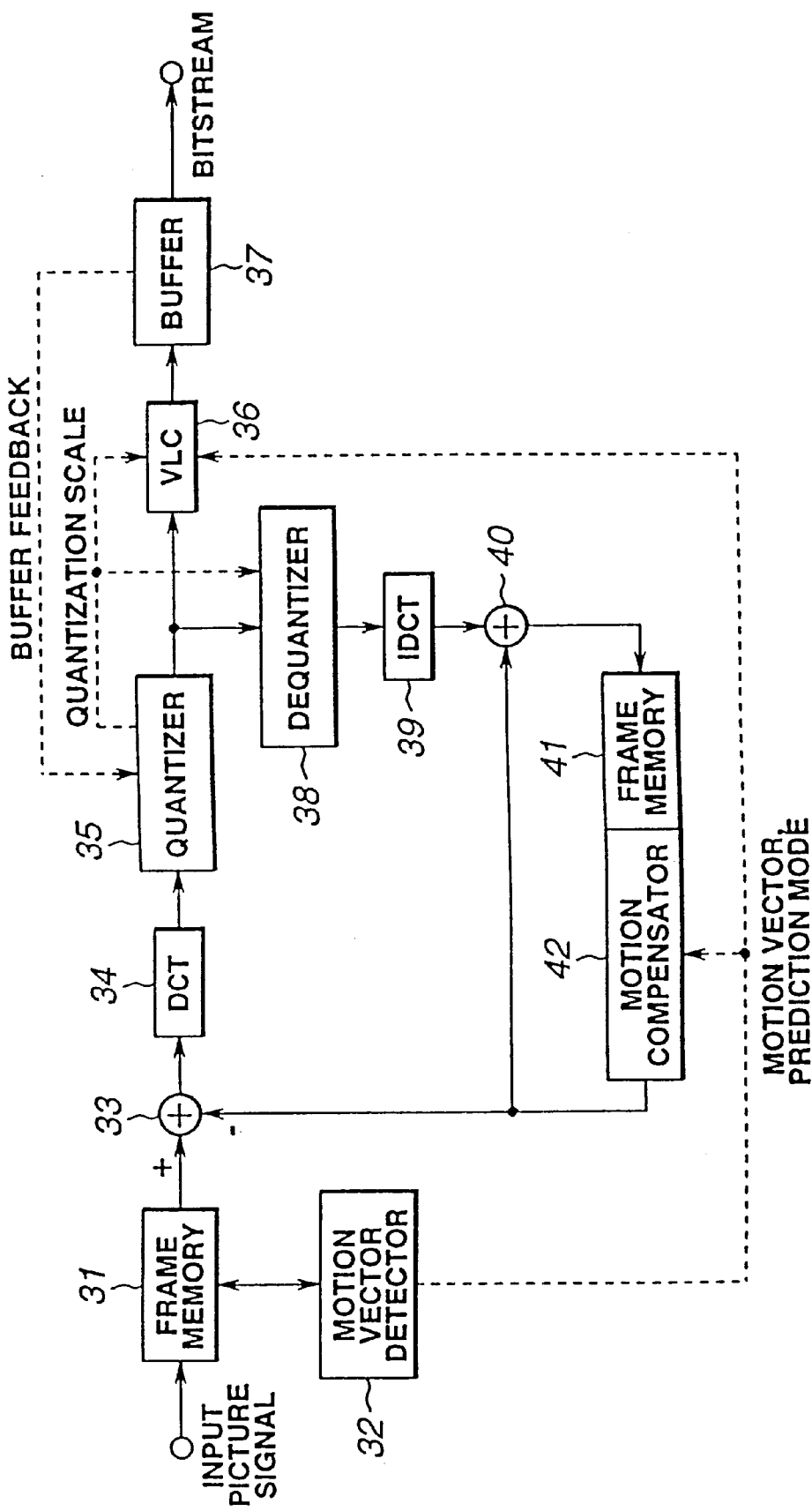
FIG. 1 is a diagram of a conventional encoder.
Figure 22:
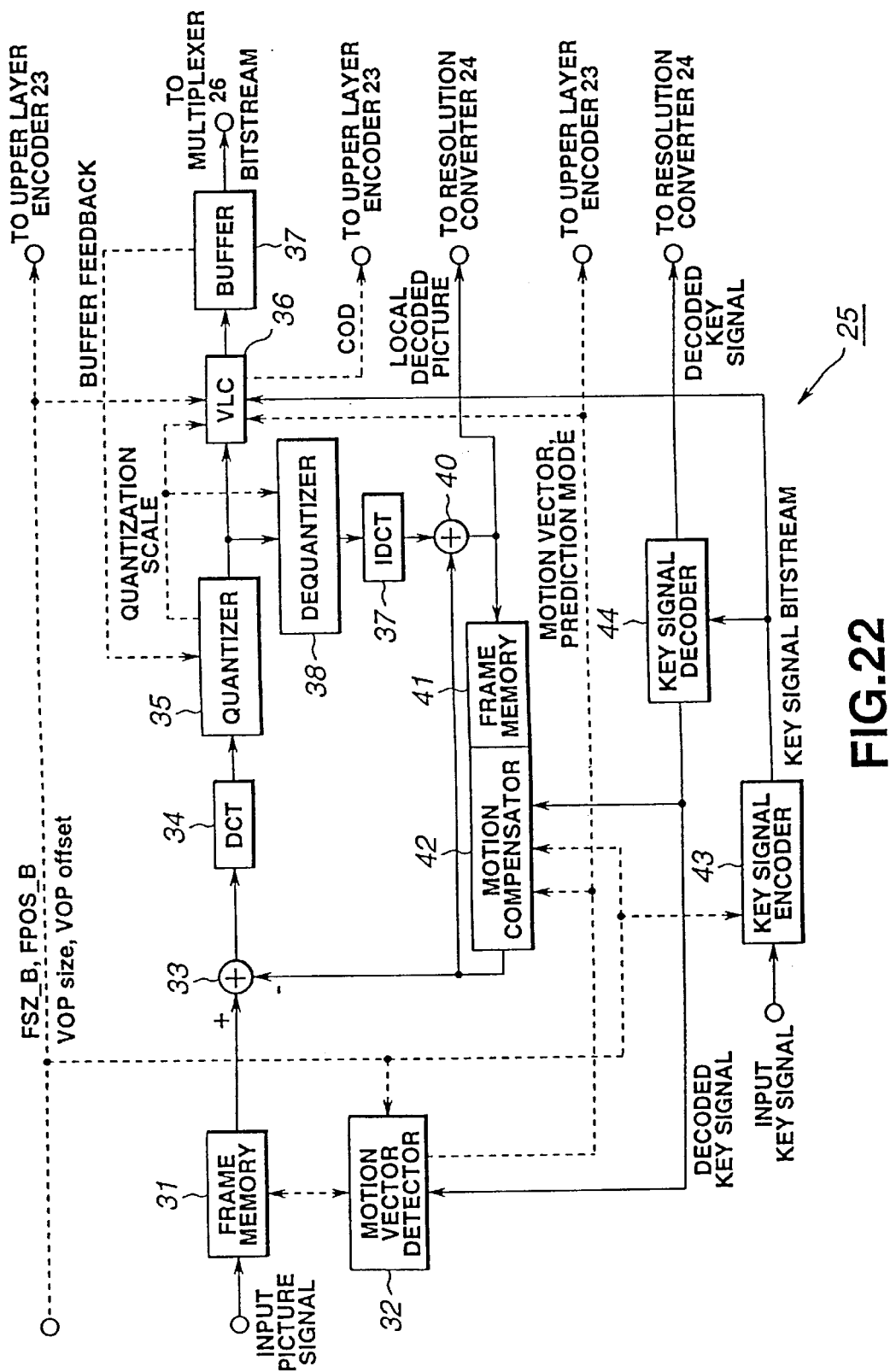
FIG. 22 is a diagram of a lower layer encoding unit 25 of FIG. 15.

FIG. 22 illustrates an example of the lower layer encoding unit 25. In FIG. 22, parts or components corresponding to those in FIG. 1 are depicted by the same reference numerals. That is, the lower layer encoding unit 25 is similarly constructed to the encoder of FIG. 1 except for newly provided key signal encoding unit 43 and key signal decoding unit 44.

In the lower layer encoding unit 25 of FIG. 22, picture data from the layering unit 21 (FIG. 15), that is, VOPs of the lower layer, are supplied to and stored in a frame memory 31. A motion vector may then be detected on a macro-block basis in a motion vector detector 32. Such motion vector detector 32 receives the offset data FPOS_B and the size data FSZ_B of the lower-layer VOP, and detects the motion vector of the macro-block based on such data. Since the size and the position of the VOP change with time (frame), in detecting the motion vector, a coordinate system should be set as a reference for detection and the motion detected in the coordinate system. To this end, the above-mentioned absolute coordinate system may be used as a reference coordinate system for the motion vector detector 32 and the VOP for encoding and the VOP as the reference picture may be arranged in the absolute coordinate system for detecting the motion vector.

The motion vector detector 32 receives a decoded key signal from the key signal decoding unit 44 obtained by encoding the key signal of the lower layer and decoding the result of encoding. The motion vector detector 32 extracts a object from the VOP by utilizing the decoded key signal so as to detect the motion vector. The decoded key signal is used in place of the original key signal (key signal before encoding) for extracting the object because a decoded key signal is used on the receiving side.

Meanwhile, the detected motion vector (MV) is supplied along with the prediction mode not only to the VLC unit 36 and the motion compensator 42 but also to the upper layer encoding unit 23 (FIG. 15).

For motion compensation, the motion should be detected in the reference coordinate system in a manner similar to that described above. Thus, size data FSZ_B and offset data FPOS_B are supplied to the motion compensator 42, which also receives a decoded key signal from the key signal decoding unit 44 for the same reason as set forth in connection with the motion vector detector 32.

The VOP, the motion vector of which has been detected, is quantized as in FIG. 1 the resulting quantized data is supplied to the VLC unit 36. This VLC unit receives not only the quantized data, quantization step, motion vector and the prediction mode, but also the offset data FPOS_B and size data FSZ_B from the picture layering unit 21 (FIG. 15) so that this data may also be quantized. The VLC unit 36 also receives the encoded key signals from the key signal encoding unit 43 (bitstream of the key signal) so that the encoded key signals are also encoded with variable length encoding. That is, the key signal encoding unit 43 encodes the key signals from the picture layering unit 21 as explained with reference to FIG. 14. The encoded key signals are outputted to the VLC unit 36 and the key signal decoding unit 44. The key signal decoding unit 44 decodes the encoded key signals outputs the decoded key signal to the motion vector detector 32, the motion compensator 42, and the resolution converter 24 (FIG. 15).

The key signal encoding unit 43 is supplied not only with the key signals of the lower layer but also with the size data FSZ_B and offset data FPOS_B, so that, similarly to the motion vector detector 32, the key signal encoding unit 43 recognizes the position and the range of the key signals in the absolute coordinate system based on such data.

The VOP, the motion vector of which has been detected, is encoded as described above and locally decoded as in FIG. 1 for storage in a frame memory 41. The decoded picture may be used as a reference picture in a manner as described above and outputted to the resolution converter 24.

In distinction from the MPEG1 and 2, MPEG 4 may also use a B-picture as a reference picture, so that the B-picture is also locally decoded and stored in the frame memory 41. However, at the present time, the B-picture may be used as a reference picture only for the upper layer.

The VLC unit 36 checks the macro-blocks of the I-, P- and B-pictures as to whether or not these macro-blocks should be turned into skip macro-blocks, and sets flags COD and MODB in accordance with the results thereof. The flags COD and MODB are similarly variable length encoded for transmission. The flag COD is also supplied to the upper layer encoding unit 23.

Figure 23:
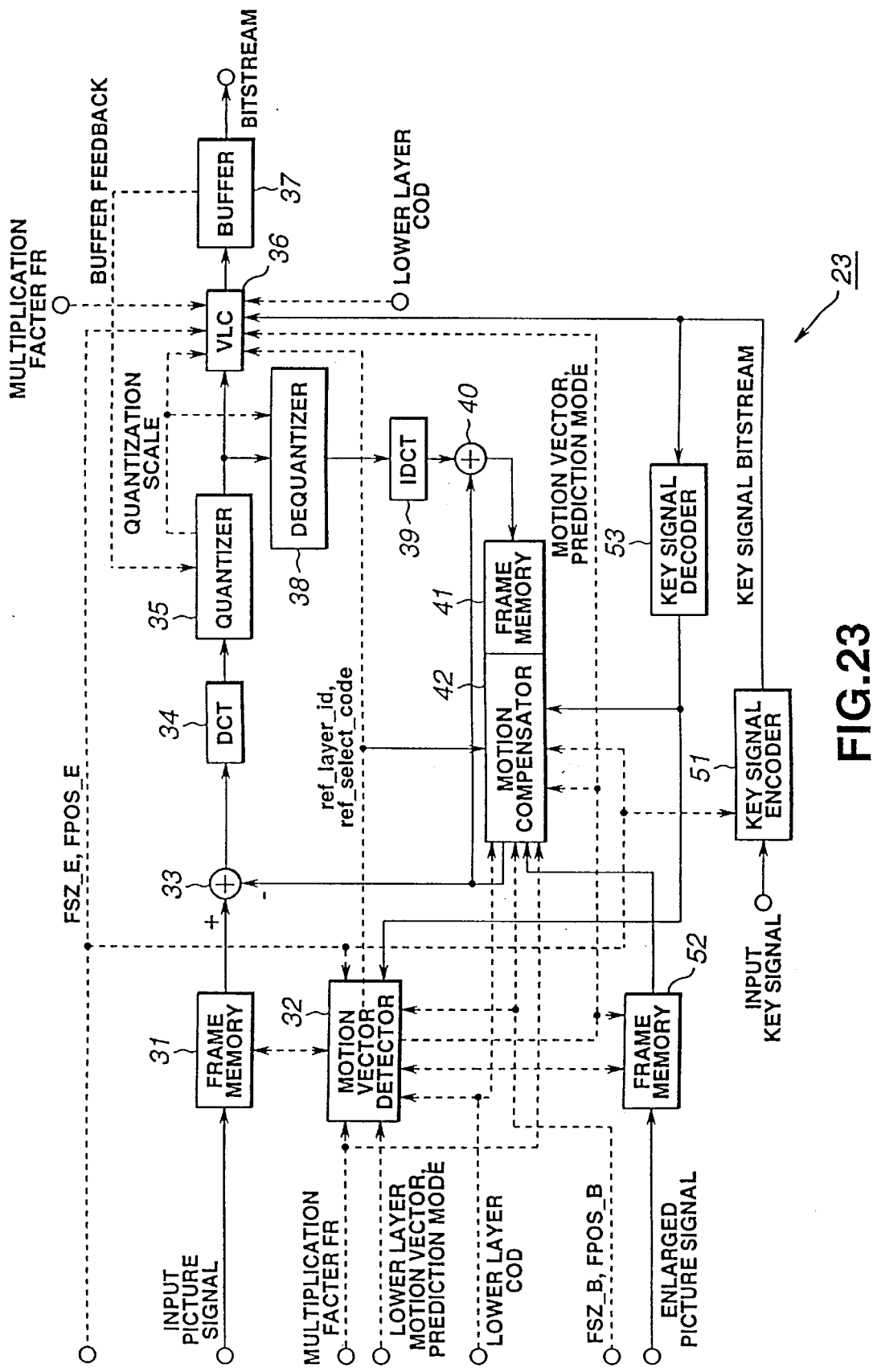
FIG. 23 is a diagram of a lower layer encoding unit 23 of FIG. 15.

FIG. 23 illustrates a structure of the upper layer encoding unit 23 of FIG. 15. In FIG. 23, parts or components corresponding to those shown in FIGS. 1 and 22 are depicted by the same reference numerals. That is, the upper layer encoding unit 23 is similarly constructed to the lower layer encoding unit 25 of FIG. 22 or to the encoder of FIG. 1 except for having a key signal encoding unit 51, a frame memory 52, and a key signal decoding unit 53 as new units.

In the upper layer encoding unit 23 of FIG. 15, picture data from the picture layering unit 21 (FIG. 15), that is the VOP of the upper layer, are supplied to the frame memory 31, as in FIG. 1, for detecting the motion vector on a macro-block basis in the motion vector detector 32. The motion vector detector 32 receives the VOP of the upper layer, size data FSZ_E, and offset data FPOS_E, in addition to the upper layer VOP, in a manner similar to that in FIG. 22, and receives the decoded key from the key signal decoder 53. The motion vector detector 32 recognizes the arraying position of the VOP of the upper layer in the absolute coordinate system based on the size data FSZ_E and the offset data PPOS_E, as in the above case, and extracts the object contained in the VOP based on the decoded key signals so as to detect the motion vector on a macro-block basis.

The motion vector detector 32 in the upper layer encoding unit 23 and in the lower layer encoding unit 25 processes the VOP in a pre-set sequence as explained with reference to FIG. 1. This sequence may be set as follows.

Figures 24A, 24B:
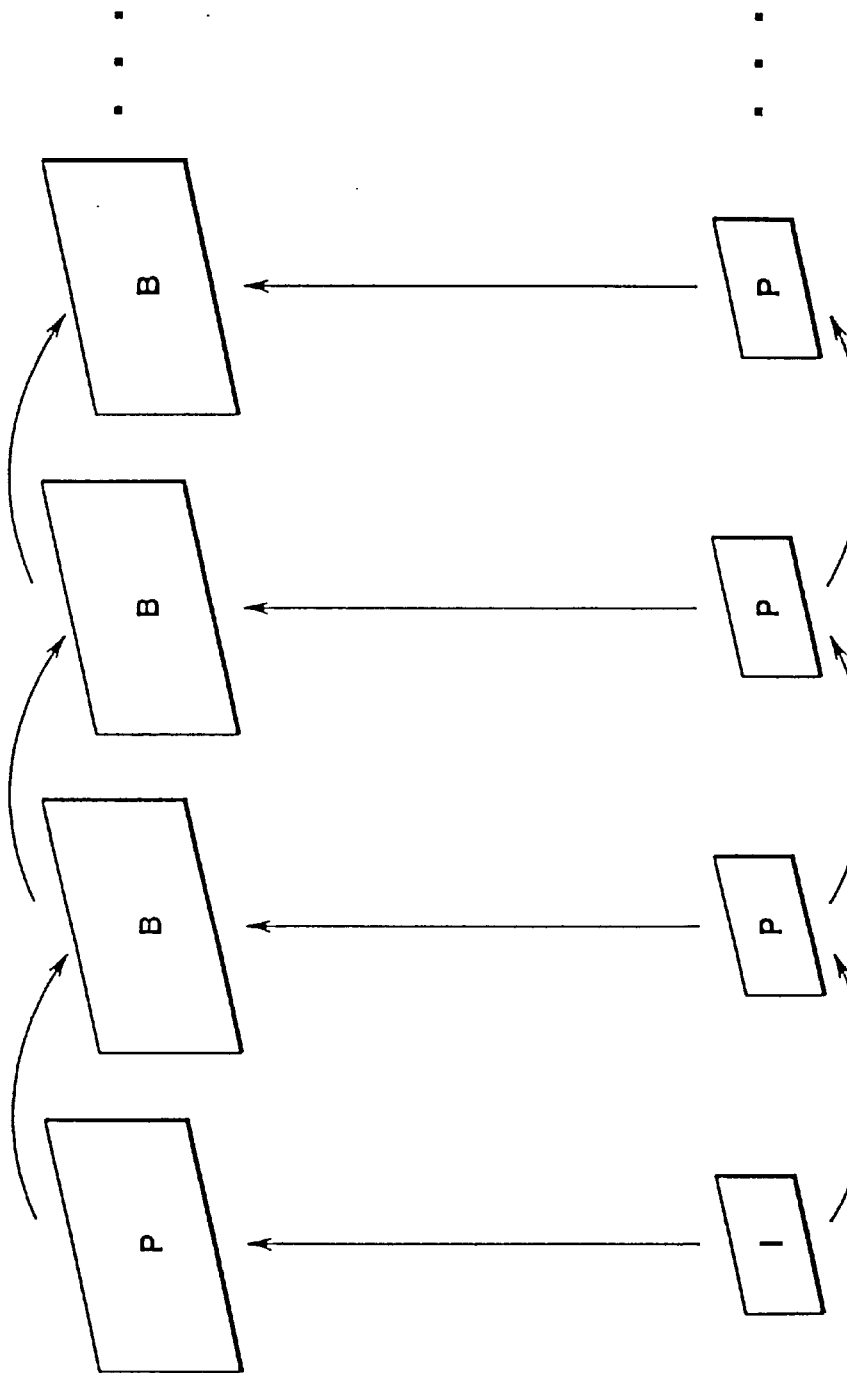
FIGS. 24A and 24B are diagrams to which reference will be made in explaining spatial scalability.

In the case of spatial scalability, the upper or lower layer VOP may be processed in the sequence of P, B, B, B, . . . , or I, P, P, P, . . . , as shown in FIGS. 24A or 24B, respectively. In the upper layer, the P-picture as the first VOP of the upper layer is encoded in this case using the VOP of the lower layer at the same time point, herein an I-picture, as a reference picture. The B-pictures, which are the second and following VOPs of the upper layer, are encoded using the directly previous VOP of the upper layer and the VOP of the lower layer at the same time point as the reference pictures. Similarly to the P-pictures of the lower layer, the B-pictures of the upper layer are used as reference pictures in encoding the other VOPs. The lower layer is encoded as in the case of MPEG1 or 2 or in H.263.

The SNR scalability may be consider as being equivalent to the spatial scalability wherein the multiplying factor FR is equal to unity, whereupon it may be treated in a manner similar to that of the spatial scalability described above.

Figures 25A, 25B:
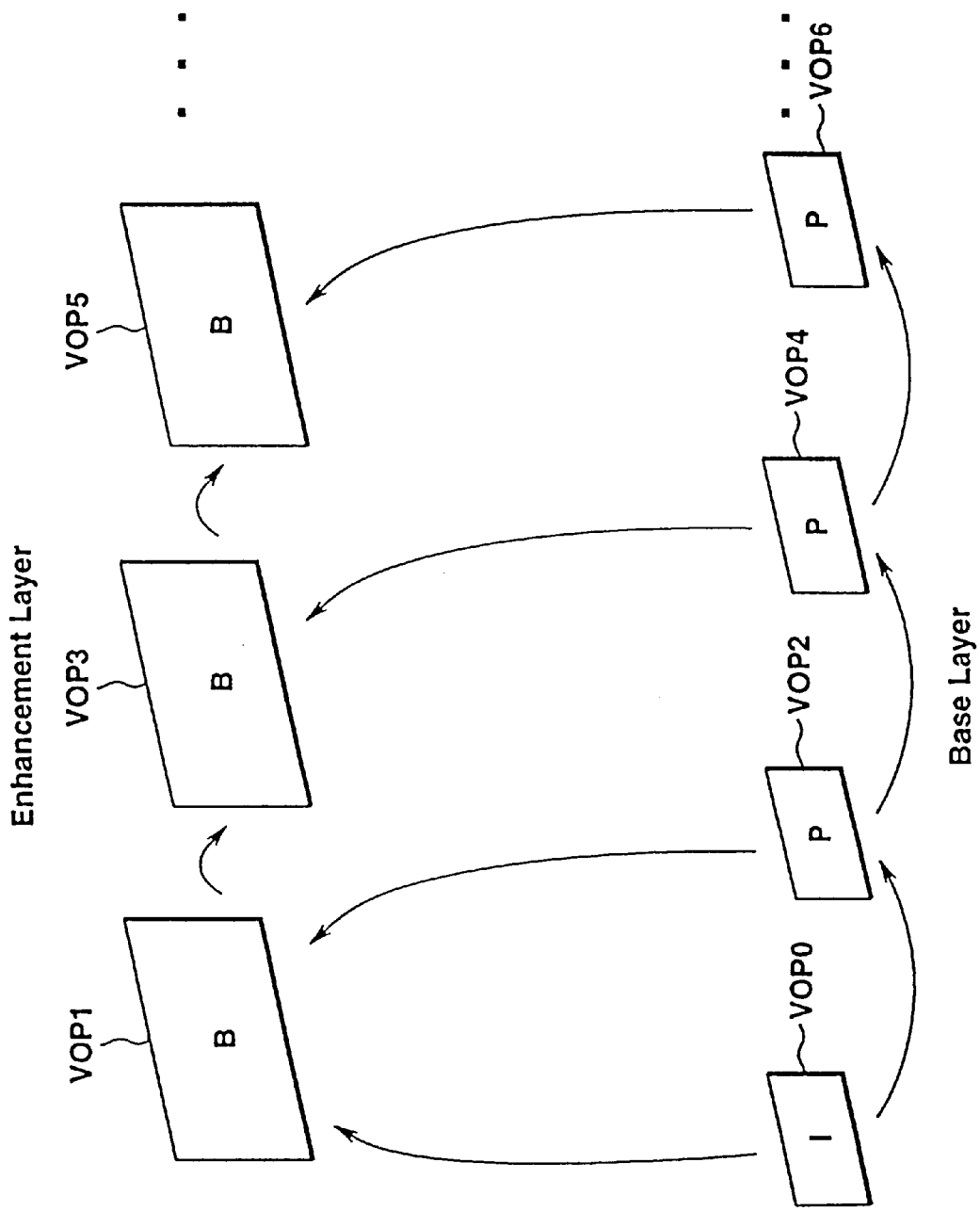
FIGS. 25A and 25B are diagrams to which reference will be made in explaining spatial scalability.

In the case of using temporal scalability, that is, if the VO is made up of VOP0, VOP1, VOP2, VOP3, . . . with VOP1, VOP3, VOP5, VOP7, . . . being upper layers (FIG. 25A) and VOP0, VOP2, VOP4, VOP6, . . . being lower layers, (FIG. 25B), the VOPs of the upper and lower layers may be processed in the sequence of B, B, B, . . . or I, P, P, as shown in FIGS. 25A and 25B. In this case, the first VOP1 (B-picture) of the upper layer may be encoded using VOP0 (I-picture) and VOP2 (P-picture) of the lower layer as reference pictures. The second VOP3 (B-picture) of the upper layer may be encoded using the upper layer VOP1 just encoded as a B-picture and VOP4 (P-picture) of the lower layer which is the picture at the next timing (frame) to the VOP3 as reference pictures. Similarly to VOP3, the third VOP5 of the upper layer (B-picture) may be encoded using VOP3 of the upper layer just encoded as the B-picture and also VOP6 (P-picture) of the lower layer which is the picture (frame) next in timing to the VOP5.

As described above, the VOP of the other layer, herein the lower layer (scalable layer) may be used as a reference picture for encoding. That is, if, for predictive coding an upper layer VOP, a VOP of the other layer is used as a reference picture (that is, a VOP of the lower layer is used as a reference picture for predictive encoding of a VOP of the upper layer), the motion vector detector 32 of the upper layer encoding unit 23 (FIG. 23) sets and outputs a flag specifying such use. For example, the flag (ref_layer_id) may specify a layer to which the VOP used as a reference picture belongs if there are three or more layers. Additionally, the motion vector detector 32 of the upper layer encoding unit 23 is adapted for setting and outputting a flag ref_select_code (reference picture information) in accordance with a flag ref_layer_id for the VOP. The flag ref_select_code specifies which layer VOP can be used as a reference picture in executing forward predictive coding or backward predictive coding.

FIGS. 26A and 26B specify values for a flag ref_select_code for a P- and B-picture.

As shown in FIG. 26A, if, for example, a P-picture of an upper layer (enhancement layer) is encoded using as a reference picture a VOP decoded (locally decoded) directly previously and which belongs to the same layer as the P-picture of the upper layer, the flag ref_select_code is set to '00'. Also, if a P-picture is encoded using as a reference picture a VOP displayed directly previously and which belongs to a layer different from the layer of the P-picture, the flag ref_select_code is set to '01'. If the P-picture is encoded using as a reference picture a VOP displayed directly subsequently and which belongs to a different layer, the flag ref_select_code is set to '10'. If the P-picture is encoded using as a reference picture a concurrent or coincident VOP belonging to a different layer, the flag ref_select_code is set to '11'.

As shown in FIG. 26B, on the other hand, if a B-picture of an upper layer, for example, is encoded using a concurrent VOP of a different layer as a reference picture for forward prediction or is encoded using a VOP decoded directly previously and which belongs to the same layer as a reference picture for backward prediction, the flag ref_select_ code is set to '00'. Also, if a B-picture of an upper layer is encoded using a VOP belonging to the same layer as a reference picture for forward prediction or is encoded using a VOP displayed directly previously and which belongs to a different layer as a reference picture for backward prediction, the flag ref_select_code is set to '01'. In addition, if a B-picture of an upper layer is encoded using a VOP decoded directly previously and which belongs to the same layer as a reference picture or is encoded using a VOP displayed directly subsequently and which belongs to a different layer as a reference picture, the flag ref_select_code is set to '10'. Lastly, if a B-picture of an upper layer is encoded using a VOP displayed directly subsequently and which belongs to a different layer as a reference picture for forward prediction or is encoded using a VOP displayed directly subsequently and which belongs to a different layer as a reference picture for backward prediction, the flag ref_select_code is set to '11'.

The methods for predictive coding explained with reference to FIGS. 24A, 24B, 25A, and 25B are merely illustrative and, as is to be appreciated, it may be freely set within a range explained with reference to FIGS. 26A and 26B which VOP of which layer is to be used as a reference picture for forward predictive coding, backward predictive coding or bidirectional predictive coding.

In the above description, the terms 'spatial scalability', 'temporal scalability' and 'SNR scalability' were used for convenience. However, as explained with reference to FIGS. 26A and 26B, if a reference picture used for predictive encoding is set, that is if the syntax as shown in FIGS. 26A and 26B is used, it may be difficult to have a clear distinction of spatial scalability, temporal scalability and SNR scalability with the flag ref_select_code. Stated conversely, the above-mentioned scalability distinction need not be performed by using the flag ref_select_code. However, the scalability and the flag ref_select_code can, for example, be associated with each other as described below:

In the case of a P-picture, the flag ref_select_code of '11' is associated with the use as a reference picture (reference picture for forward prediction) of a concurrent VOP of a layer specified by the flag ref_select_code, wherein the scalability is spatial scalability or SNR scalability. If the flag ref_select_code is other than '11', the scalability is temporal scalability.

In the case of a B-picture, the flag ref_select_code of '00' is associated with the use as a reference picture for forward prediction of a concurrent VOP of a layer specified by the flag ref_select_id, wherein the scalability is spatial scalability or SNR scalability. If the flag ref_select_code is other than '00', the scalability is temporal scalability.

If a concurrent VOP of a different layer, herein a lower layer, is used as a reference picture for predictive coding of the VOP of the upper layer, there is no motion between the two VOPs, so that the motion vector is 0(0,0) at all times.

Returning to FIG. 23, the above-mentioned flags ref_layer_id and ref_select_code may be set in the motion detector 32 of the upper layer encoding unit 23 and supplied to the motion compensator 42 and the VLC unit 36. The motion vector detector 32 detects a motion vector by use not only of the frame memory 31 but also, if needed, a frame memory 52 in accordance with the flags ref_layer_id and ref_select_code. To the frame memory 52, a locally decoded enlarged picture of a lower layer may be supplied from the resolution converter 24 (FIG. 15). That is, the resolution converter 24 may enlarge the locally decoded VOP of the lower layer by, for example, an interpolation filter, so as to generate an enlarged picture corresponding to the VOP which is enlarged by a factor of FR that is an enlarged picture having the same size as the VOP of the upper layer associated with the VOP of the lower layer. The frame memory 52 stores therein the enlarged picture supplied from the resolution converter 24. However, if the multiplying factor is 1, the resolution converter 24 directly supplies the locally decoded VOP from the lower layer encoding unit 25 to the upper layer encoding unit 23 without performing any specified processing thereon.

The motion vector detector 32 receives size data FSZ_B and offset data FPOS_B from the lower layer encoding unit 25, and receives the multiplying factor FR from the delay circuit 22 (FIG. 15). Thus, if the enlarged picture stored in the frame memory 52 is used as a reference picture, that is, if a lower layer VOP concurrent with an upper layer VOP is used as a reference picture for predictive coding of the VOP of the upper layer, the motion vector detector 32 multiplies the size data FSZ_B and the offset data FPOS_B corresponding to the enlarged picture with the multiplying factor FR. In this case, the flag ref_select_code is set to '11' as explained with reference to FIG. 26A and to '00' for the P-picture and for the B-picture as explained with reference to FIG. 26B. The motion vector detector 32 recognizes the position of the enlarged picture in the absolute coordinate system based on the results of multiplication for detecting the motion vector.

The motion vector detector 32 may also receive a prediction mode and a motion vector of the lower layer. These may be used as follows. If the flag ref_select_code for the B-picture of the upper layer is '00', and the multiplying factor FR is 1, that is if the scalability is SNR scalability, in which case an upper layer VOP is used for predictive coding of the upper layer so that the SNR scalability herein differs from that prescribed in MPEG2, the upper layer and the lower layer are of the same picture so that the motion vector and the predictive mode of the concurrent lower layer picture can be used directly for predictive coding of the B-picture of the upper layer. In this case, no motion vector nor prediction mode is outputted or transmitted from the motion vector detector 32 to the VLC unit 36 because the receiving side can recognize the prediction mode and the motion vector of the upper layer from the decoding results of the lower layer.

As described above, the motion vector detector 32 may use not only the VOP of an upper layer but also an enlarged picture as reference pictures for detecting the motion vector. In addition, the motion vector detector 32 may set the prediction mode which minimizes the prediction error or variance as explained with reference to FIG. 1. Furthermore, the motion vector detector 32 may also set and output other information, such as flag ref_select_code and/or ref_layer_id.

As shown in FIGS. 15 and 23, a flag COD specifying whether or not a macro-block constituting an I- or P-picture in the lower layer is a skip macro-block is supplied from the lower layer encoding unit 25 to the motion vector detector 32, VLC unit 36, and the motion compensator 42, as will be explained subsequently.

A macro-block, a motion vector thereof having been detected, may be encoded as described above, whereupon the VOL unit 36 outputs a variable length code as the encoding result. As in the lower layer encoding unit 25, the VLC unit 36 of the upper layer encoding unit 23 may set and output a flag COD specifying whether or not the I- or P-picture macro-block is a skip macro-block as described above and a flag MODB specifying whether the macro-block of the B-picture is a skip macro-block. The VLC unit 36 may also receive the multiplying factor FR, flags ref_secret_code and ref_layer_id, size data FSZ_E, offset data FPOS_E, and an output of the key signal encoding unit 51, in addition to the quantization coefficients, quantization step, motion vector, and the prediction mode. The VLC unit 36 variable-length encodes and outputs all of such data.

Further, the macro-bock, the motion vector of which has been detected, is encoded and locally decoded as described above and stored in the frame memory 41. In the motion compensator 42, motion compensation is carried out for so as to generate a prediction picture using not only the locally decoded VOP of the upper layer stored in the frame memory 41 but also the locally decoded and enlarged VOP of the lower layer stored in the frame memory 52. That is, the motion compensator 42 receives not only the motion vector and the prediction mode but also the flags ref_secret_code and ref_layer_id, decoded key signal, multiplying factor FR, size data FSZ-B and FSZ_E, and offset data FPOS_B and FPOS_E. The motion compensator 42 recognizes a reference picture for motion compensation based on the flags ref_secret_code and ref_layer_id. If a locally decoded VOP of the upper layer or the enlarged picture is used as a reference picture, the motion compensator 42 also recognizes the position and the size of the picture in the absolute coordinate system based on the size data FZS_E and offset data FPOS_E or on the size data FZS_B and offset data FPOS_B for generating a prediction picture and may utilize the multiplying factor FR and the decoded key signal.

The key signal of the VOP of the upper layer is supplied to the key signal encoding unit 51 which encodes the key signal (in a manner similar to the key signal encoding unit 43 of FIG. 22) and supplies the encoded key signal to the VLC unit 36 and the key signal decoding unit 53. The key signal decoding unit 53 decodes the received encoded key signal and supplies the decoded key signal to the motion vector detector 32 and the * motion compensator 42 as described above for use in extracting the VOP of the upper layer.

Figure 27:
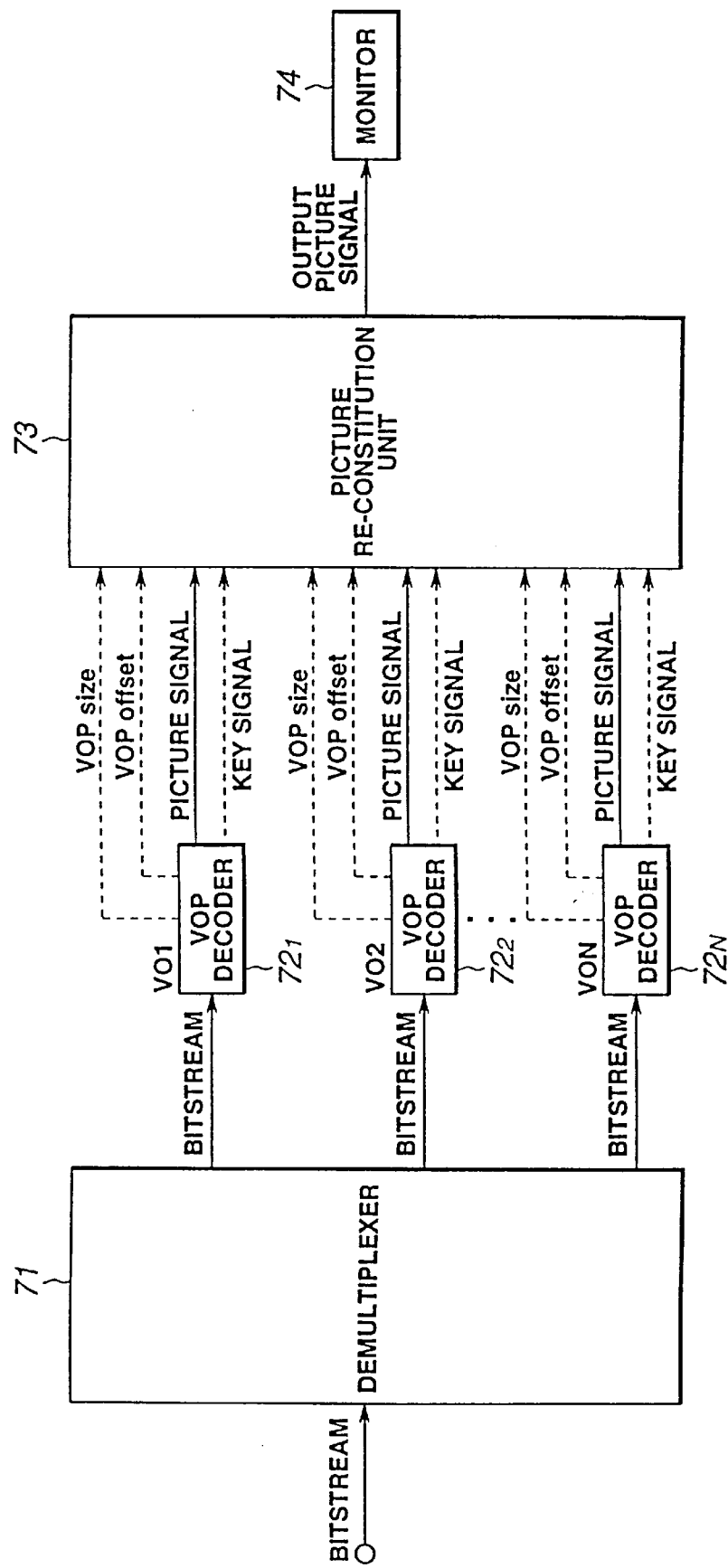
FIG. 27 is a diagram of a decoder according to an embodiment of the present invention.

FIG. 27 illustrates an embodiment of a decoder for decoding a bitstream outputted by the encoder of FIG. 12.

The bitstream outputted by the encoder of FIG. 12 may be transmitted over a transmission path 5 whereupon it is received by a receiving device (not shown) or such outputted bitstream may be recorded on a recording medium 6 whereupon it is reproduced by a reproducing device (not shown). In either event, the received bitstream is supplied to a demultiplexer 71 wherein it is separated into VO-based bitstreams VO1, VO2, . . . , and thence supplied to an associated VOP decoder $72_N$. The VOP decoder $72_n$ decodes a VOP (picture data) constituting a VO, a key signal, size data (VOP size), and offset data (VOP offset) and supplies the decoded data or signal to a picture reconstructing unit 73. Based on outputs of the VOP decoders $72_1$ to $72_n$, the picture reconstructing unit 73 reconstructs an original picture which may be supplied sent to a monitor 74 for display.

Figure 28:
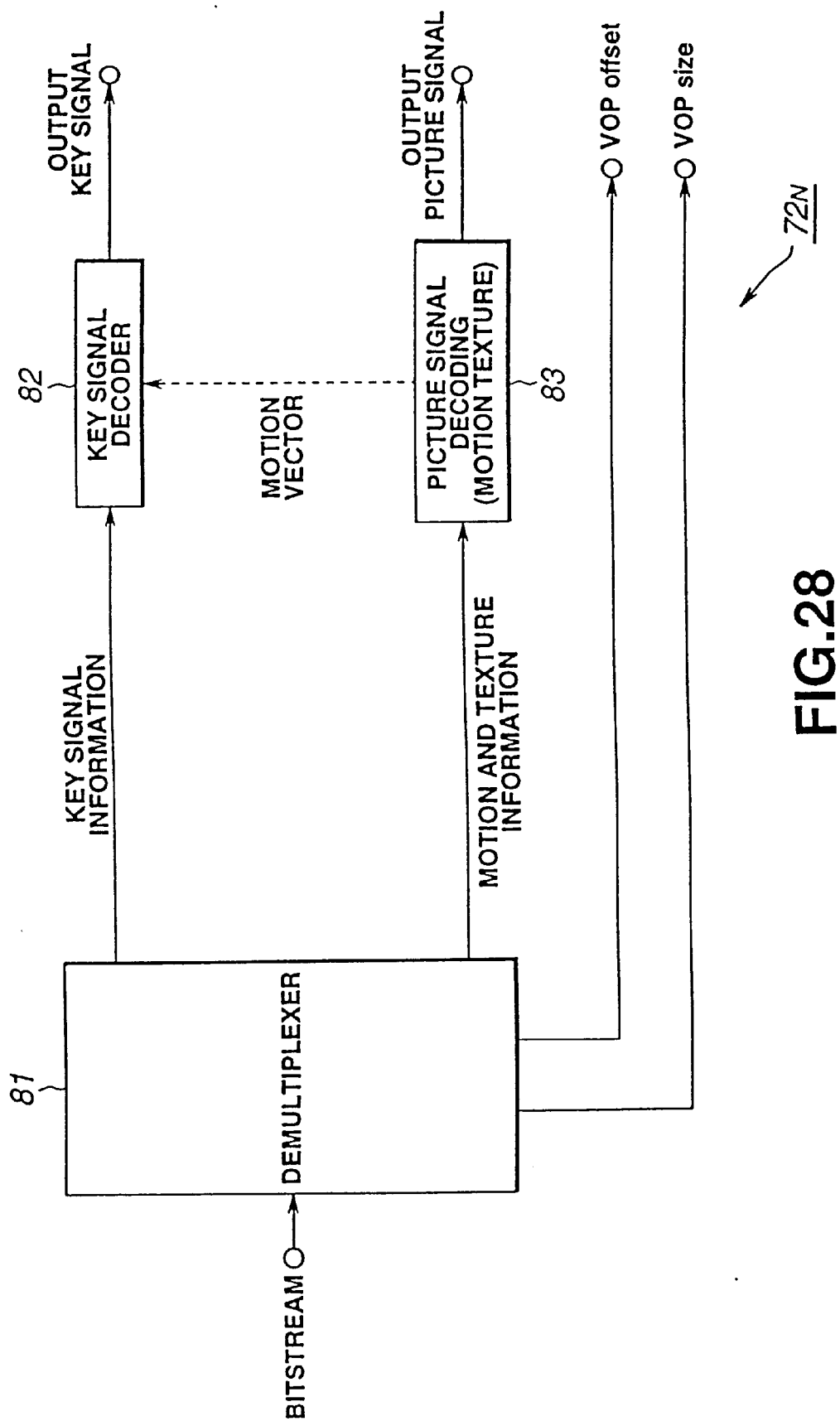
FIG. 28 is a diagram of VOP decoding units 721 to 72N.

FIG. 28 illustrates a basic structure of the VOP decoder 72, of FIG. 27. As showing in FIG. 25, the bitstream from the demultiplexer 71 (FIG. 27) is supplied to a demultiplexer 81 wherein the key signal information and the information on the motion and texture are extracted. The key signal information is sent to a key signal decoding unit 82, and the information on the motion and texture is supplied to a picture signal decoding unit 83. The key signal decoding unit 82 and the picture signal decoding unit 83 respectively decode the key signal information and the information on the motion and texture and supply the resulting key signal and VOP picture data (luminance and chroma signals) to the picture reconstructing unit 73. Further, the size data (VOP size) and the offset data (VOP offset) are also extracted from the input bitstream and supplied to the picture reconstructing unit 73 (FIG. 27).

If the key signal encoding unit 12 (FIG. 14) motion-compensates the key signal in accordance with the motion vector detected in the picture signal encoding unit 11 (FIG. 14) for encoding the key signal, the motion vector used for decoding a picture in a picture signal decoding unit 83 is sent to the key signal decoding unit 82 so as to decode the key signal using the motion vector.

Figure 29:
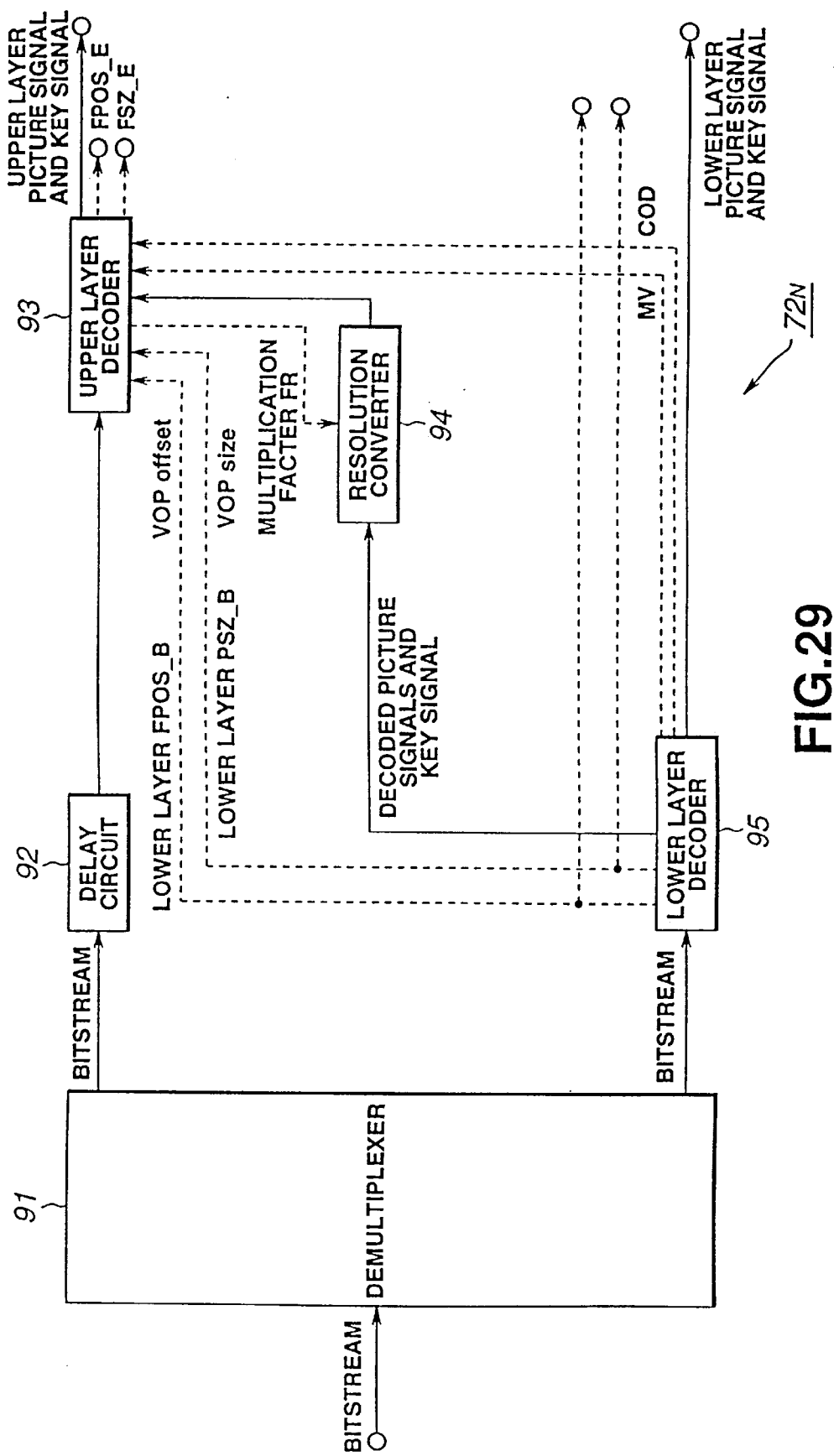
FIG. 29 is a diagram of another illustrative structure of VOP decoding units 721 to 72N.

FIG. 29 illustrates a structure of the VOP decoding unit $72_n$ of FIG. 27 for implementing scalability. As shown in FIG. 29, the bitstream supplied from the demultiplexer 71 (FIG. 27) is supplied to a demultiplexer 91 wherein it is separated into an upper layer VOP bitstream and a lower layer VOP bitstream. The lower layer VOP bitstream is supplied to a lower layer decoding unit 95 which decodes the lower layer bitstream and supplies the resulting decoded picture data of the lower layer and key signal to a resolution converter 94. Additionally, the lower layer decoding unit 95 furnishes information for encoding the upper layer VOP such as the size data FSZ_B, offset data FPOS_B, motion vector MV, prediction mode and/or the flag COD, obtained on decoding the lower layer bitstream, to an upper layer decoding unit 93. The upper layer VOP bitstream from the demulitplexer 91 is delayed in a delay circuit 92 by a delay time corresponding to the processing time in the lower layer decoding unit 95 and then supplied to the upper order decoding unit 93. The upper layer decoding unit 93 decodes the upper layer bitstream furnished via the delay circuit 92 by utilizing the outputs of the lower layer decoding unit 95 and the resolution converter 94, if need be, and outputs the resulting upper layer decoded picture, key signal, size data FSZ-E, and offset data FPOS-E. The upper layer decoding unit 93 may also output the multiplying factor FR (obtained on decoding the bitstream of the upper layer) to the resolution converter 94. By using the received multiplying factor FR, the resolution converter 94 may convert the decoded picture of the lower layer to an enlarged picture, as in the resolution converter 24 (FIG. 15). The enlarged picture from this conversion is sent to the upper layer decoding unit 93 so as to be used for decoding the upper layer bitstream.

Figure 2:
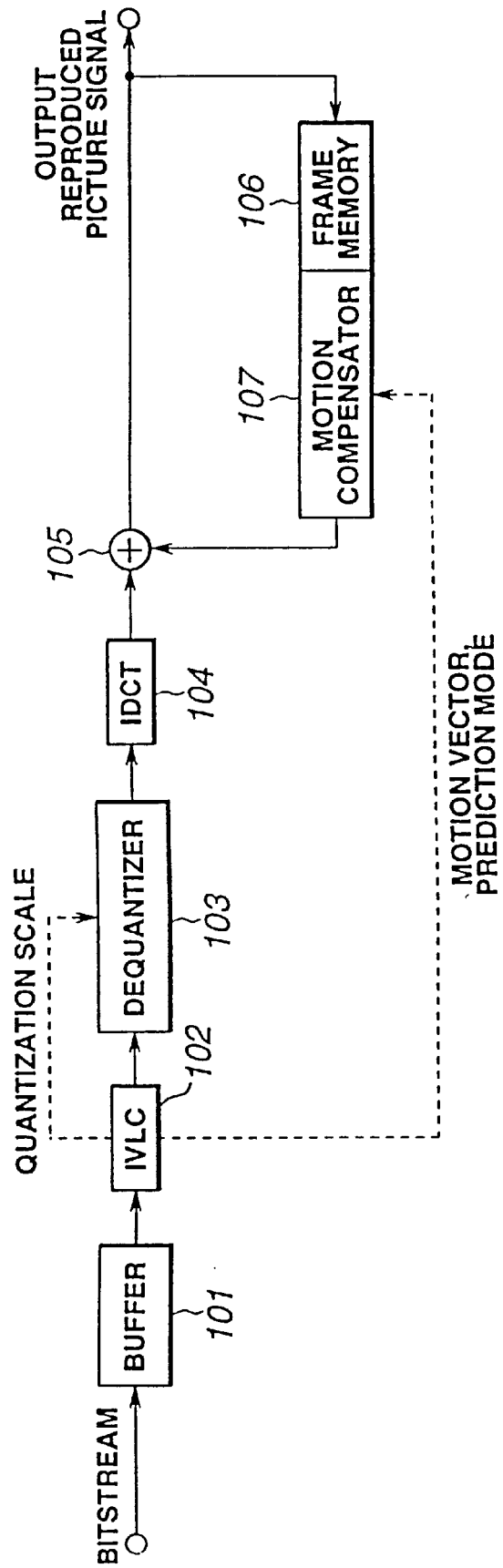
FIG. 2 is a diagram of a conventional decoder.
Figure 3:
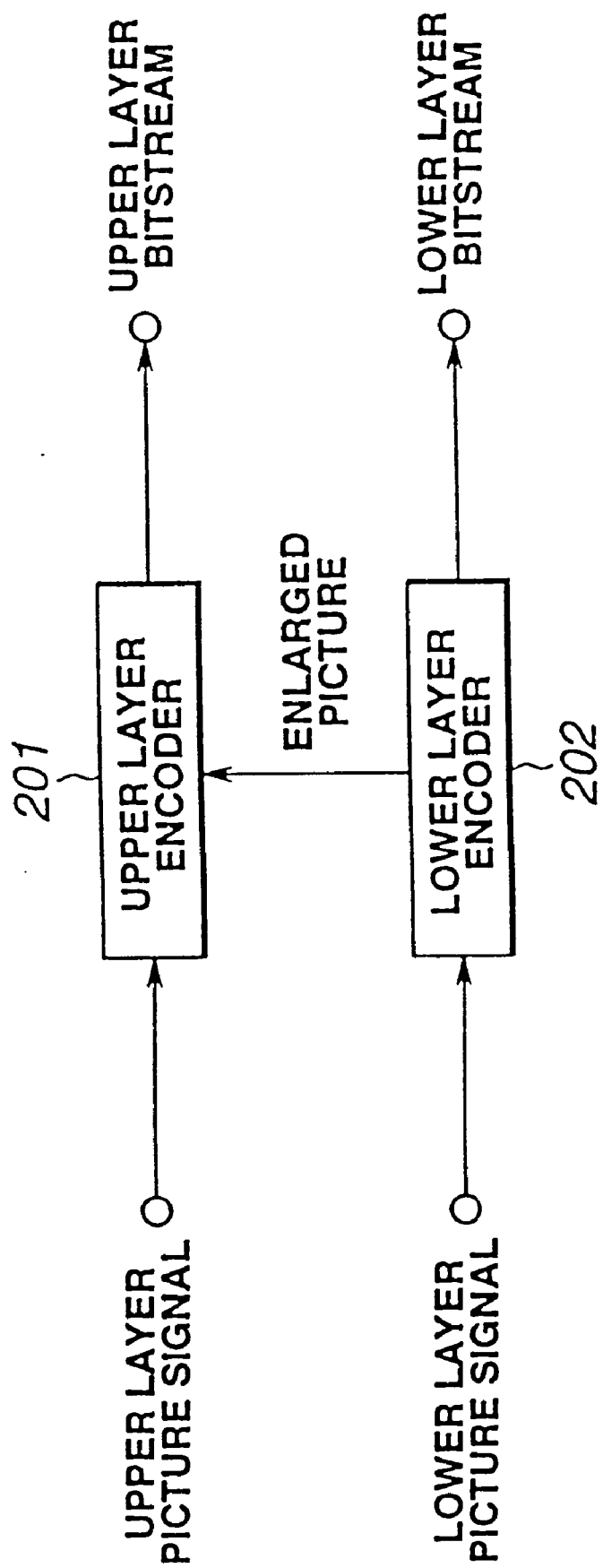
FIG. 3 is a diagram of an example of an encoder for carrying out conventional scalable encoding.
Figure 4:
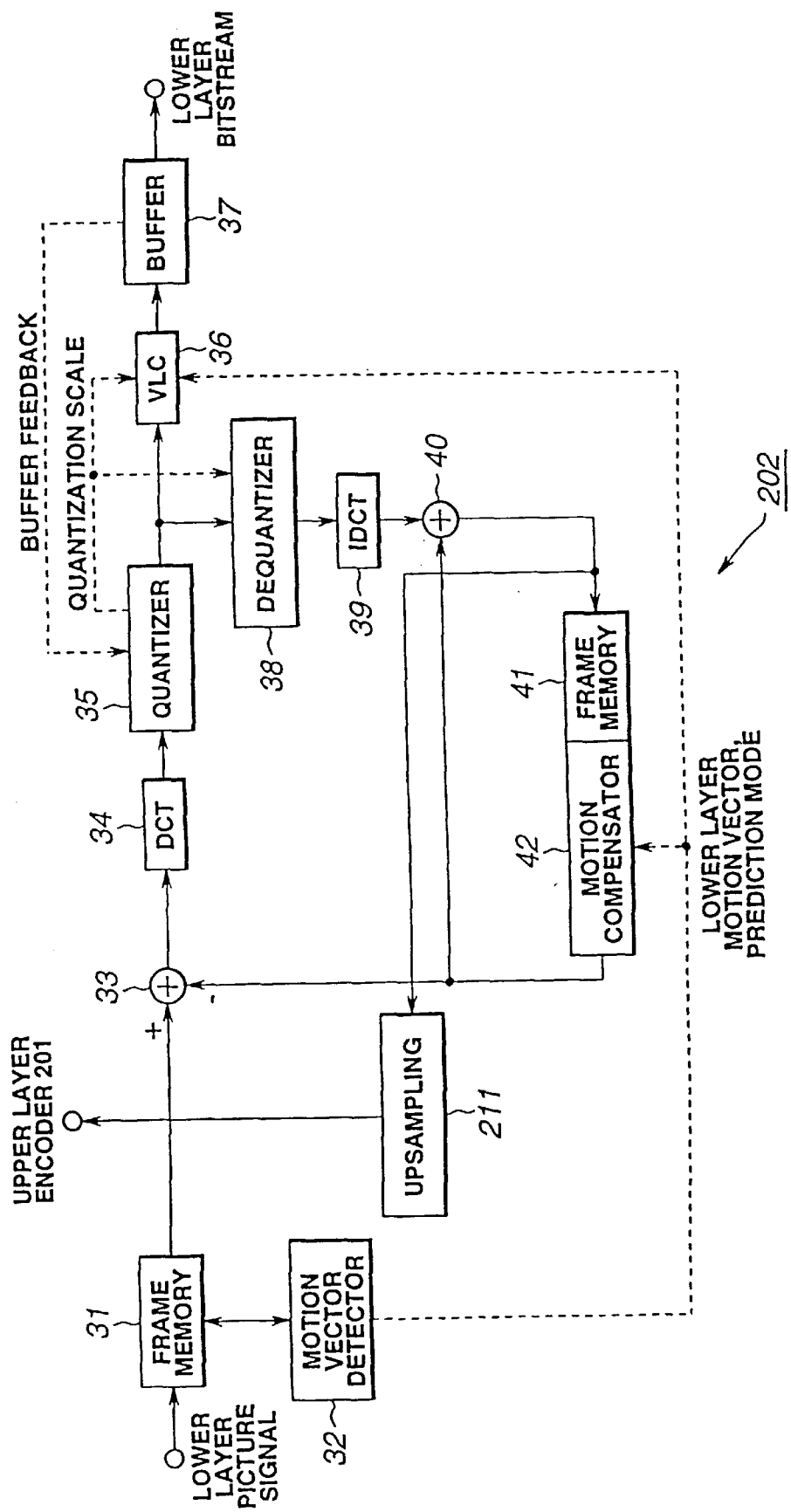
FIG. 4 is a diagram of an illustrative structure of a lower layer encoding unit 202 of FIG. 3.
Figure 5:
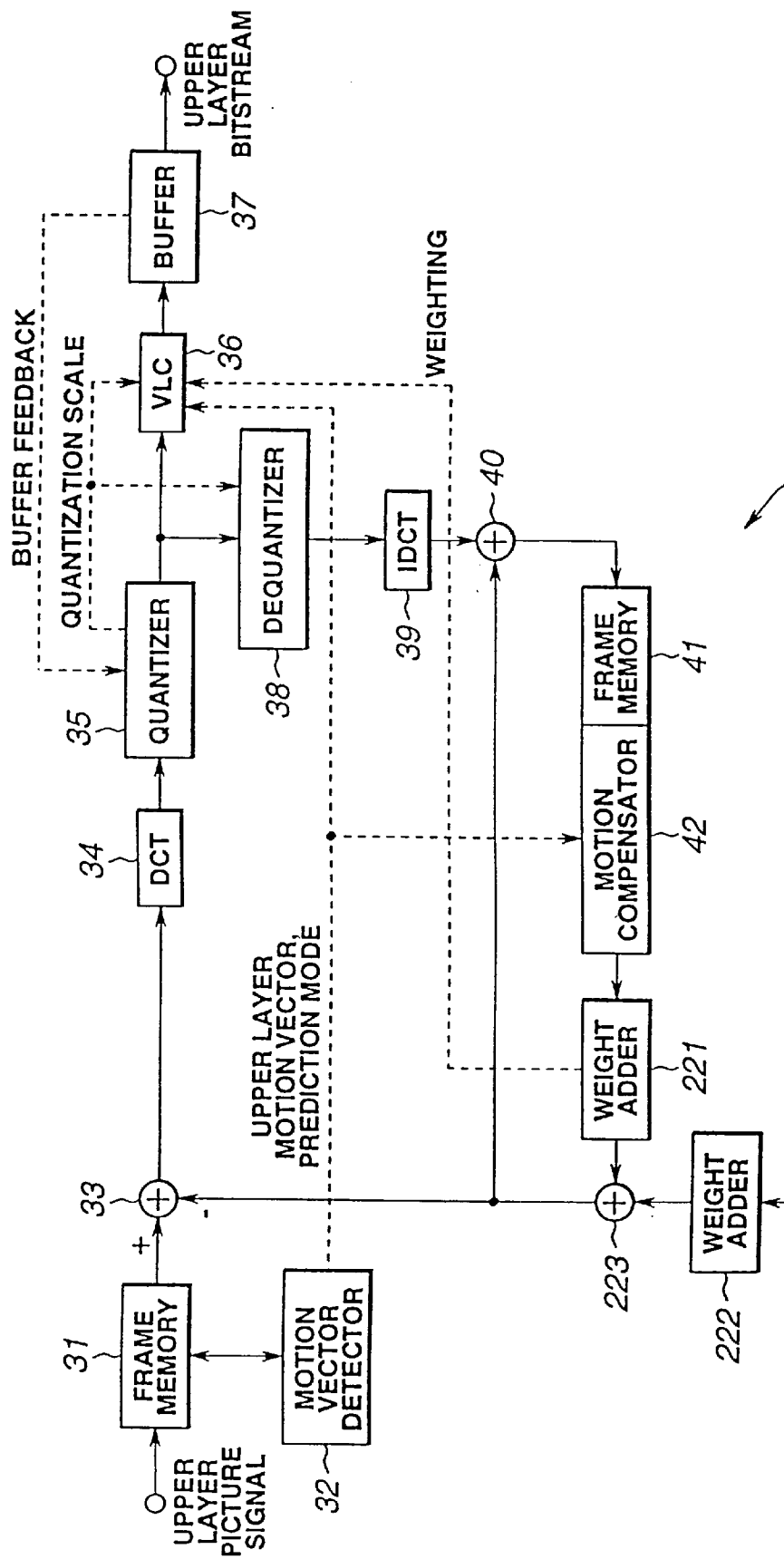
FIG. 5 is a diagram of an illustrative structure of an upper layer encoding unit 202 of FIG. 3.
Figure 6:
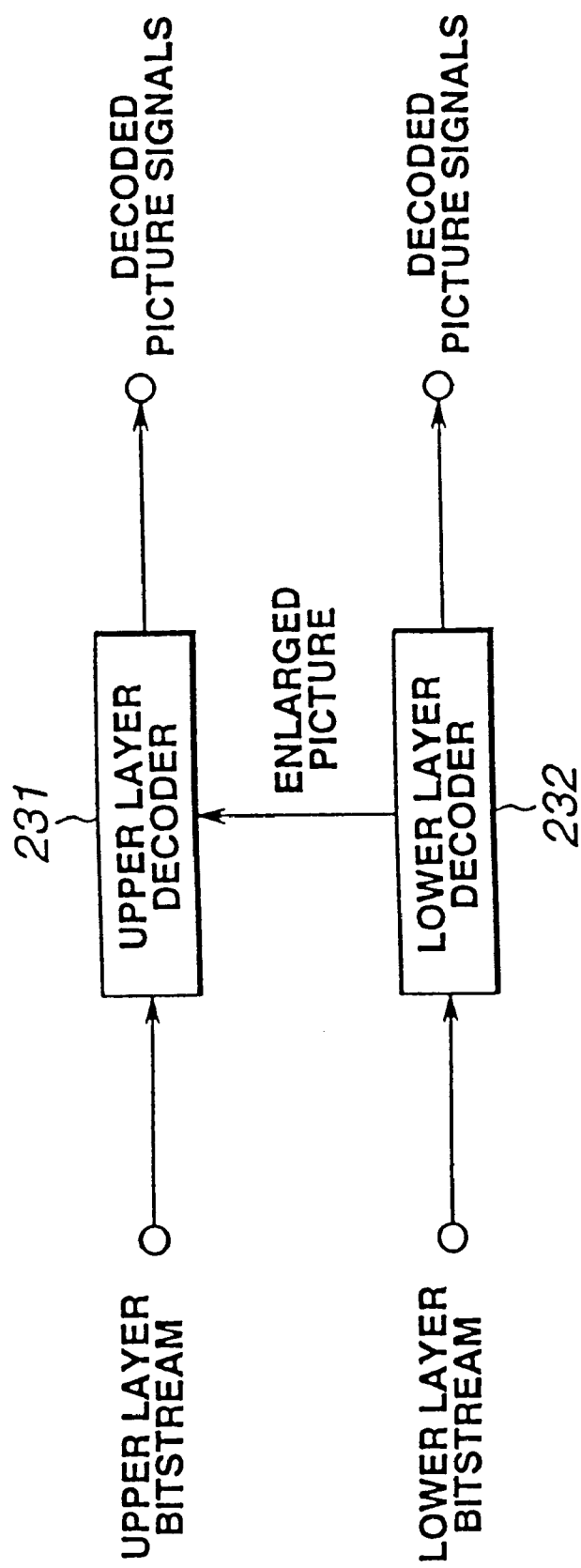
FIG. 6 is a diagram of an example of a decoder for carrying out conventional scalable decoding.
Figure 7:
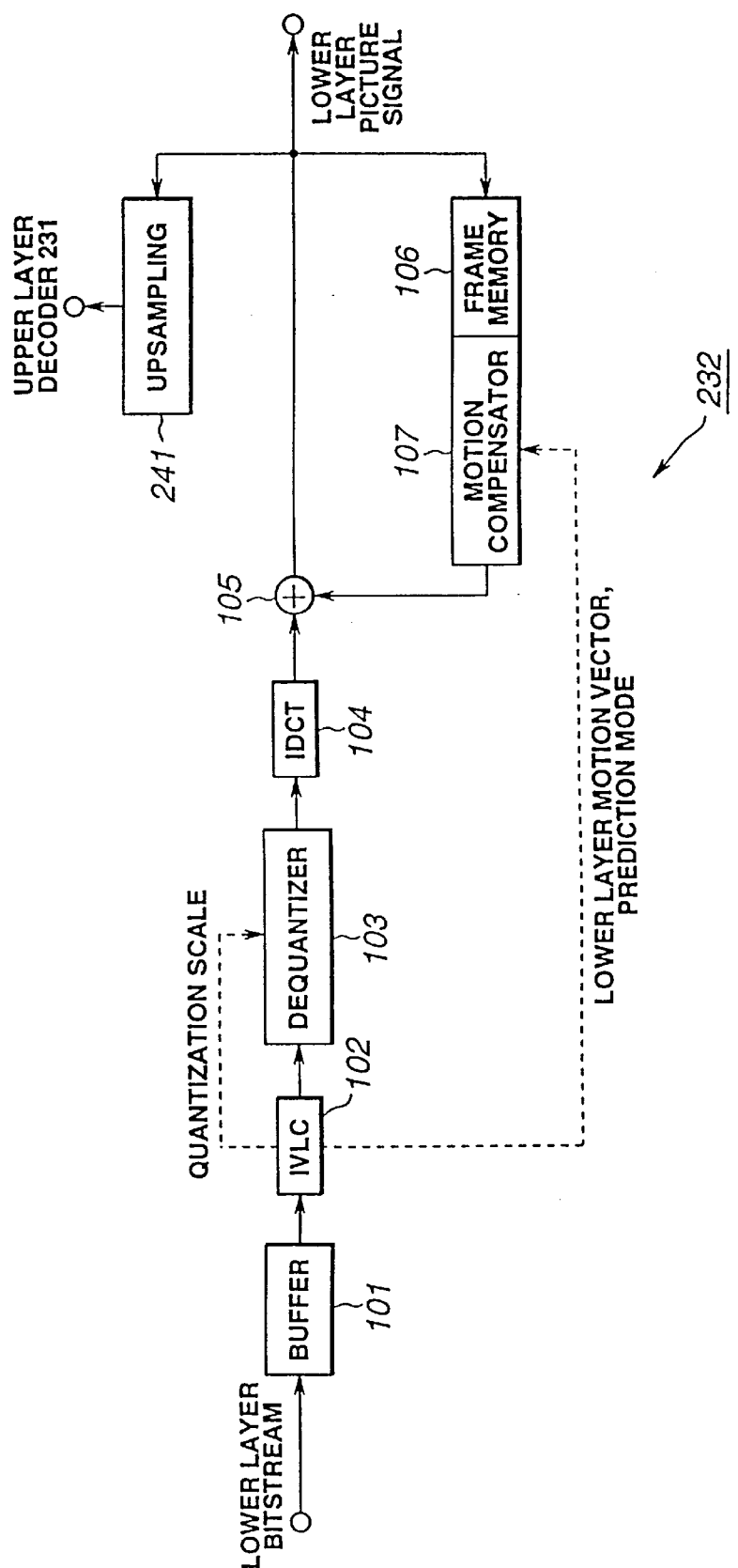
FIG. 7 is a diagram of an illustrative structure of a lower layer decoding unit 232 of FIG. 6.
Figure 8:
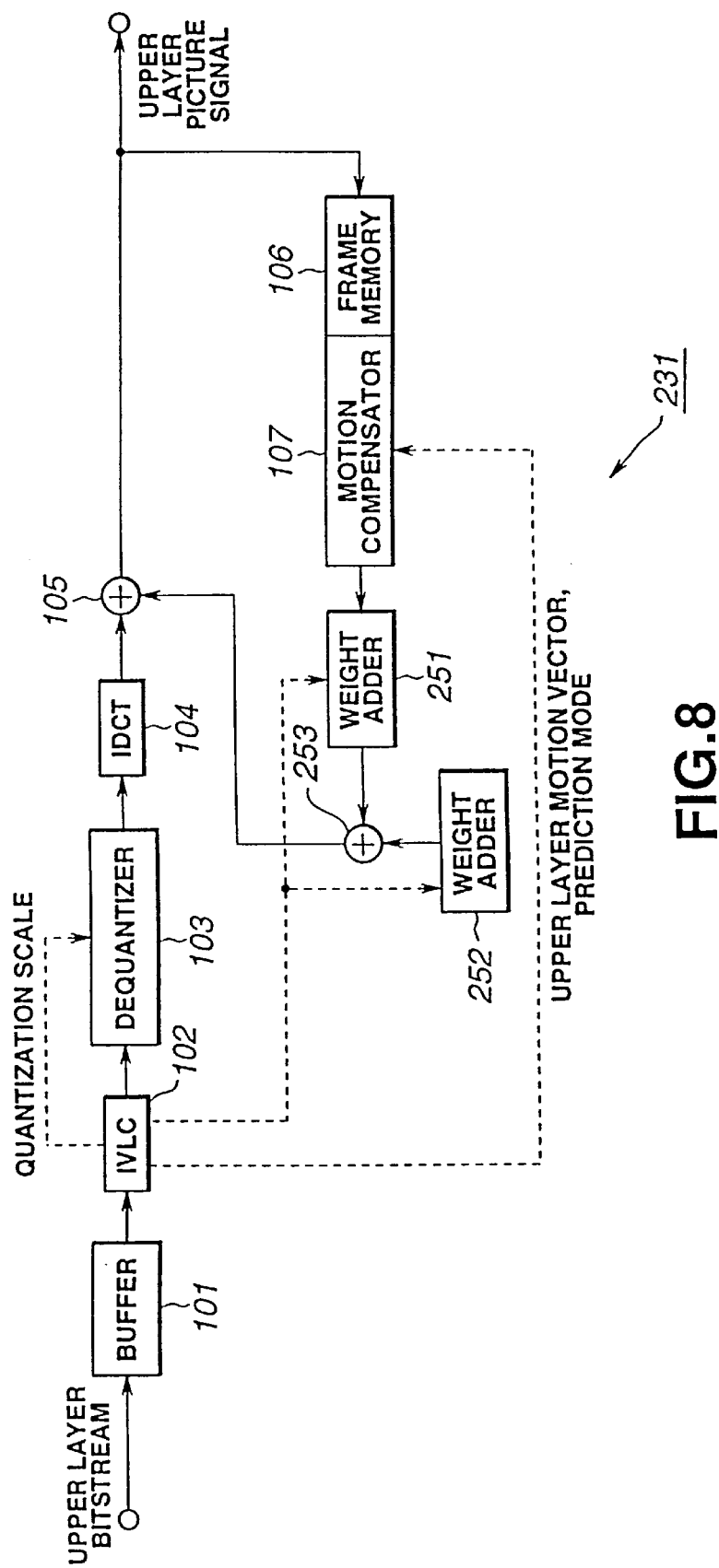
FIG. 8 is a diagram of an illustrative structure of an upper layer decoding unit 231 of FIG. 6.
Figure 9:
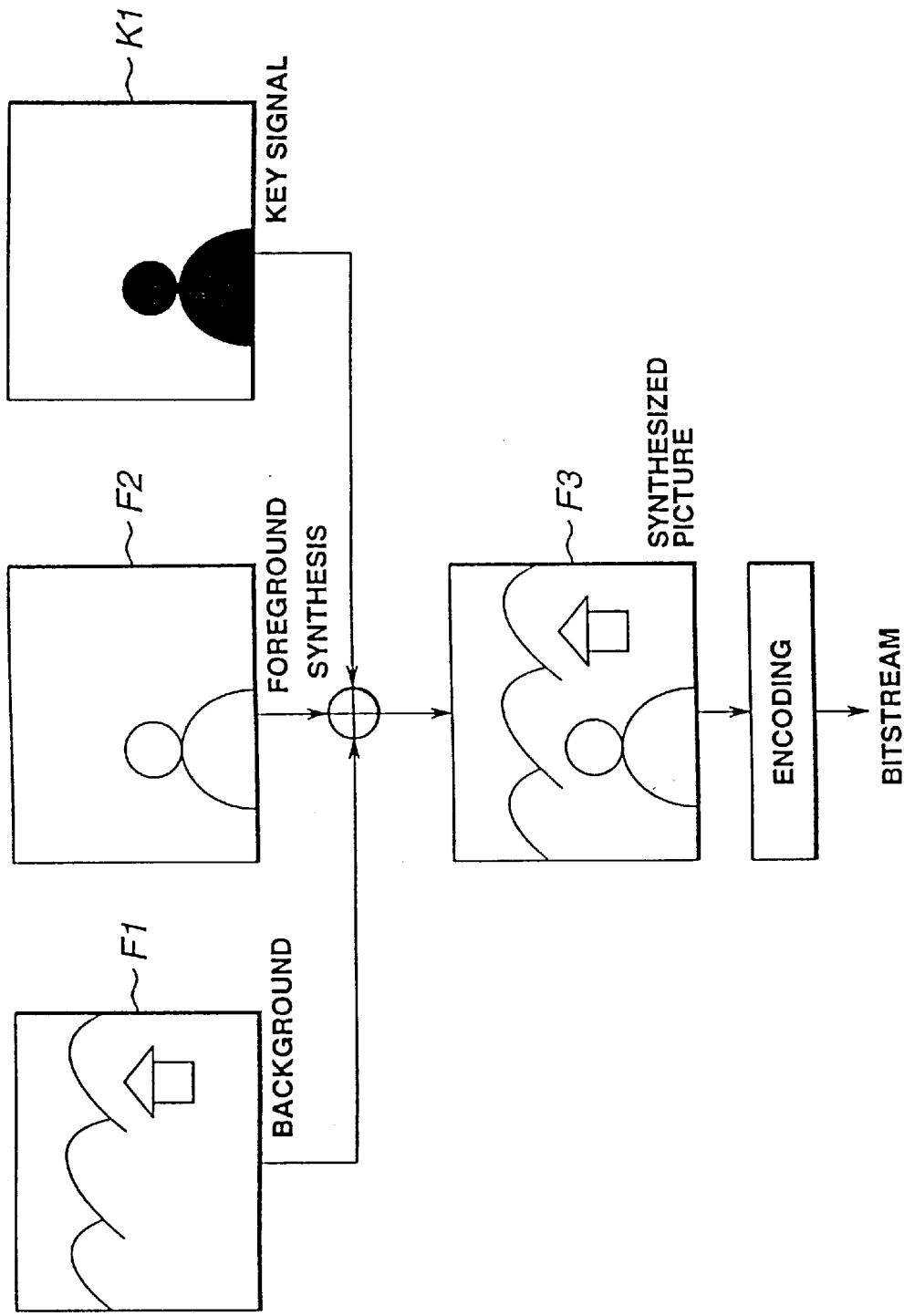
FIG. 9 is a diagram to which reference will be made in explaining a conventional picture synthesis method.
Figure 10:
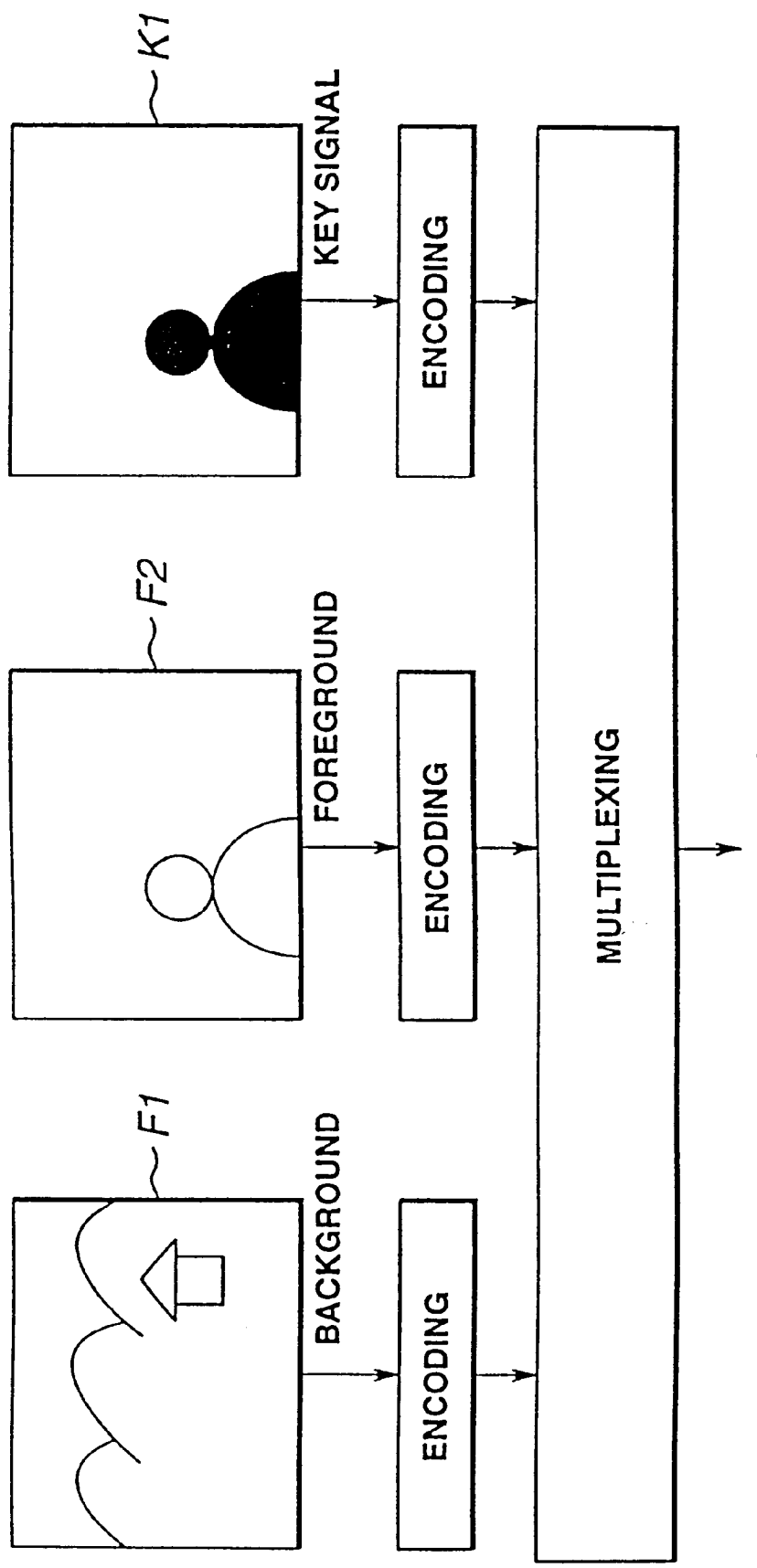
FIG. 10 is a diagram to which reference will be made in explaining an encoding method which enables picture re-editing and re-synthesis.
Figure 11:
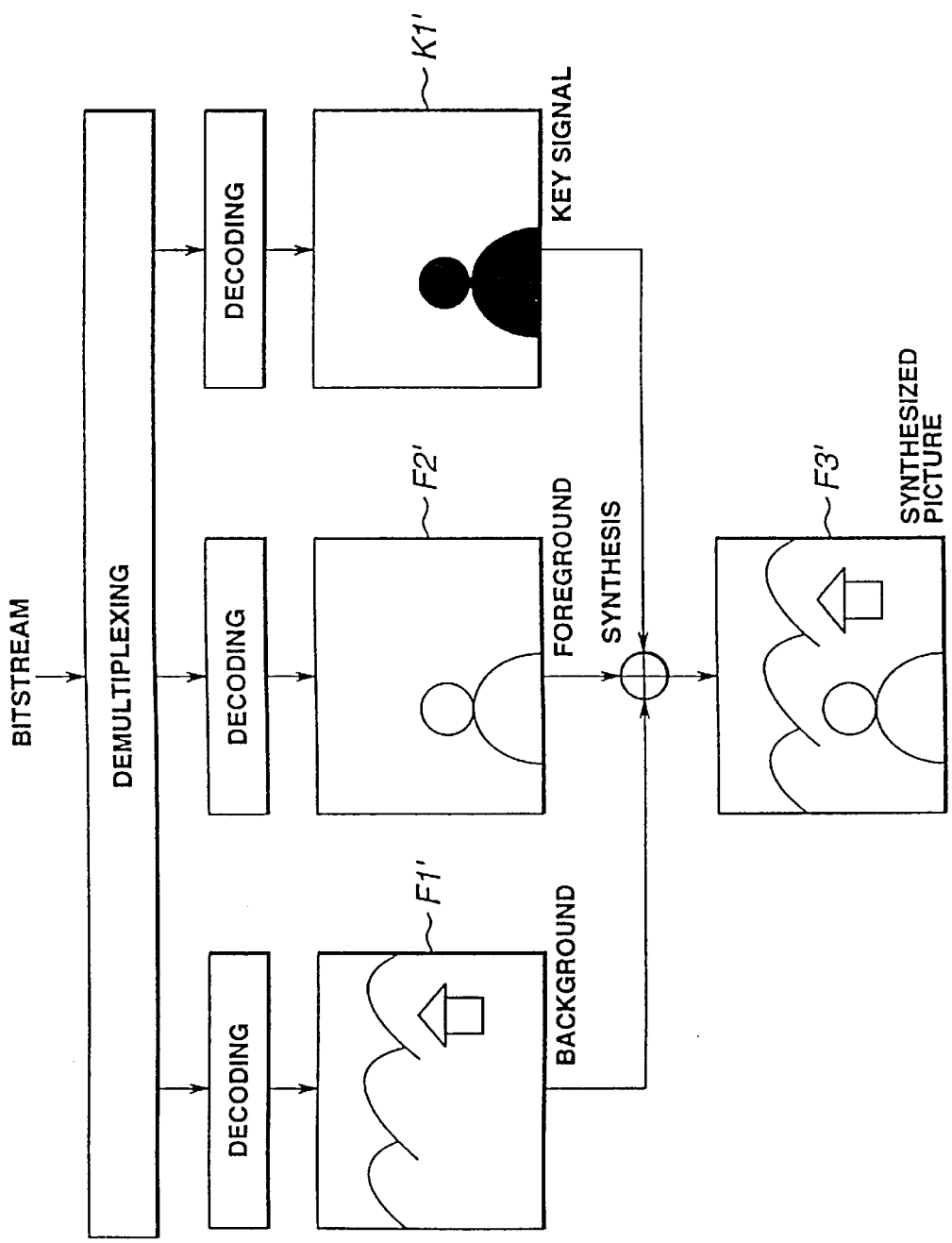
FIG. 11 is a diagram to which reference will be made in explaining a decoding method which enables picture re-editing and re-synthesis.
Figure 30:
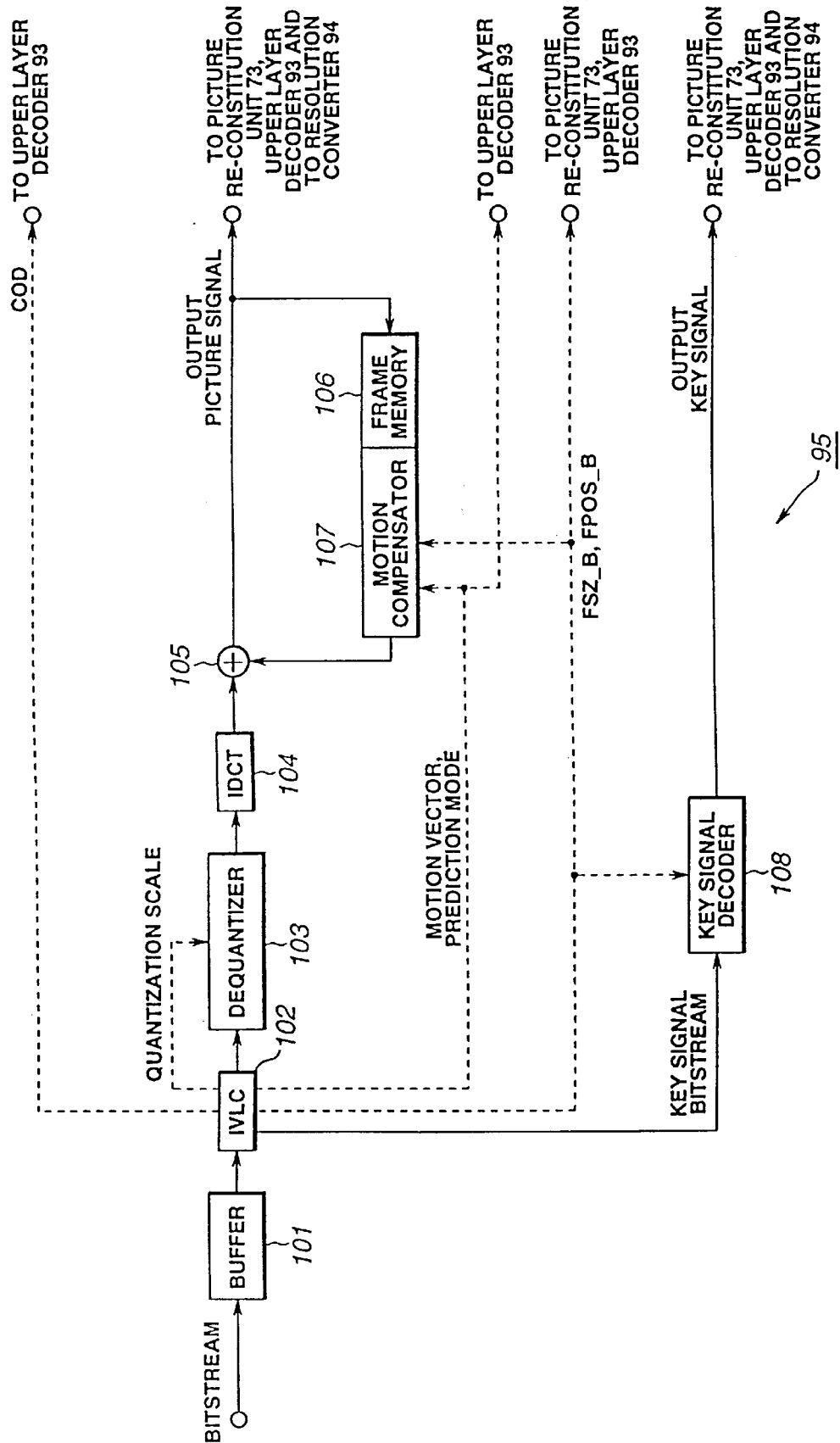
FIG. 30 is a diagram of a lower layer decoding unit 95 of FIG. 29.

FIG. 30 illustrates a structure of the lower layer decoding unit 95 shown in FIG. 29. The lower layer decoding unit 95 is similarly constructed to the decoder of FIG. 2 except for having a key signal decoding unit 108 as a new device. Accordingly, in FIG. 30, parts or components corresponding to those of the decoder of FIG. 2 are depicted by the same reference numerals.

As shown in FIG. 30, the lower layer bitstream from the demultiplexer 91 (FIG. 29) is supplied to a buffer 101 for storage therein. An IVLC unit 102 reads out a bitstream from the buffer 101 and variable length encodes the read-out bitstream for separating the quantization coefficients, motion vector, prediction mode, quantization step, encoded key signals, size data FSZ_B, offset data FPOS_B, and the flags COD. The quantization coefficients and the quantization step are sent to the dequantizer 103; the motion vector and the prediction mode are sent to the motion compensator 107 and the upper layer decoding unit 93 (FIG. 29); the size data FSZ_B and offset data FPOS_B are sent to motion compensator 107, key signal decoding unit 108, picture reconstructing unit 73 (FIG. 27) and to the upper layer decoding unit 93; the flag COD is sent to the upper layer decoding unit 93; and the encoded key signal data is sent to the key signal decoding unit 108.

The dequantizer 103, IDCT unit 104, arithmetic unit 105, frame memory 106, and the motion compensator 107 may preform processing similar to that performed by the dequantizer 38, IDCT unit 37, arithmetic unit 40, frame memory 41, and motion compensator 42 of FIG. 22 to decode the lower layer VOP. The decoded lower layer VOP is sent to the picture reconstructing unit 73 (FIG. 27), the upper layer decoding unit 93 (FIG. 29) and the resolution converter 94 (FIG. 29).

The key signal decoding unit 108 may perform processing similar to that performed by the key signal decoding unit 44 of the lower layer encoding unit 25 of FIG. 22 so as to decode the encoded key signal data. The resulting decoded key signals are sent to the picture reconstructing unit 73, the upper layer decoding unit 93, and the resolution converter 94.

Figure 31:
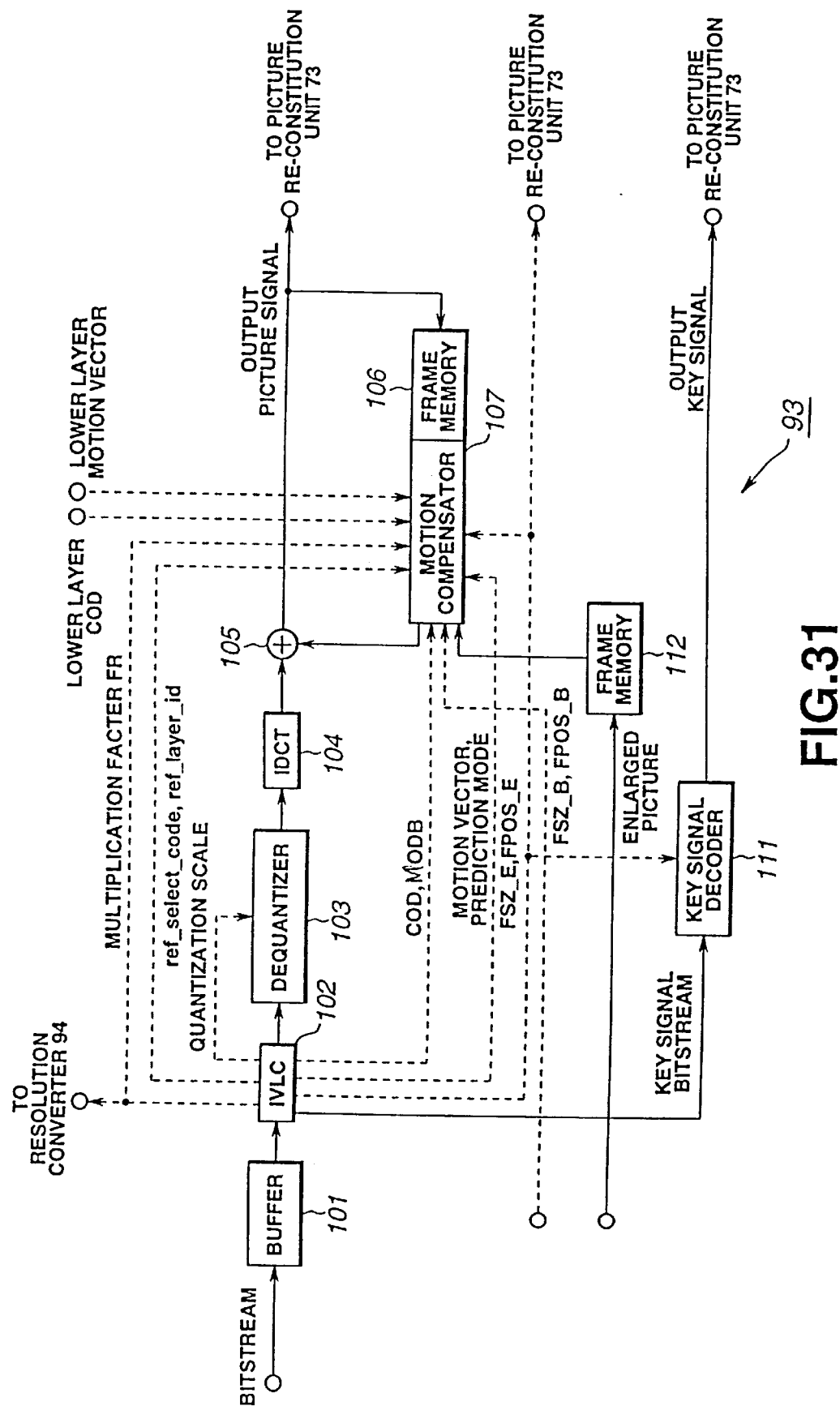
FIG. 31 is a diagram of an upper layer decoding unit 93 of FIG. 29.

FIG. 31 illustrates a structure of the upper layer decoding unit 93 of FIG. 29. Such upper layer decoding unit 93 is similarly constructed to the encoder of FIG. 2. Accordingly, parts or components corresponding to those shown in FIG. 2 are depicted by the same reference numerals.

As shown in FIG. 31, the upper layer bitstream from the demultiplexer 91 and delay circuit 92 (FIG. 29) is sent via a buffer 101 to a IVLC unit 102. The IVLC unit 102 variable length decodes the received bitstream to separate quantization coefficients, a motion vector, a prediction mode, a quantization step, encoded key signal data, size data FSZ__E, offset data FPOS__E, a multiplying factor FR, and flags ref__layer__id, ref__select__code, COD, and MODB. The quantization coefficients and the quantization step are sent to the dequantizer 103, as in FIG. 30; the motion vector and the prediction mode are sent to the motion compensator 107; the size data FSZ__E and the offset data FPOS__E are sent to the motion compensator 107, a key signal decoding unit 111 and the picture reconstructing unit 73 (FIG. 27); the flags COD, MODB, ref__layer__id, and ref__select__code are sent to the motion compensator 107; the encoded key signal data are sent to the key signal decoding unit 111; and the multiplying factor FR is sent to the motion compensator 107 and the resolution converter 94 (FIG. 29).

The motion compensator 107 receives not only the above data but also the motion vector, flag COD, size data FSZ__B, and offset data FPOS__B of the lower layer from the lower layer decoding unit 95 (FIG. 29). The frame memory 112 receives the enlarged picture from the resolution converter 94. The dequantizer 103, IDCT unit 104, arithmetic unit 105, frame memory 106, motion compensator 107 and frame memory 112 may perform processing similar to that performed by the dequantizer 38, IDCT unit 39, arithmetic unit 40, frame memory 41, motion compensator 42, and frame memory 52 of the upper layer encoding unit 23 (FIG. 23) to decode the upper layer VOP. The decoded upper layer VOP is sent to the picture reconstructing unit 73. The key signal decoding unit 111 performs processing similar to that performed by the key signal decoding unit 53 of the upper layer encoding unit 23 (FIG. 23) so as to decode the encoded key signal data. The resulting key signals are sent to the picture reconstructing unit 73.

In the above-described upper layer decoding unit 93 and lower layer decoding unit 95 of the VOP decoding unit $72_n$, the decoded picture, key signal, size data FSZ__E, and offset data FPOS-E, referred to as upper layer data, and the decoded picture, key signal, size data FSZ__B, and offset data FPOS-B, referred to as lower layer data, are produced. The picture reconstructing unit 73 may reconstruct a picture from the upper layer data and/or lower layer data as described hereinbelow.

In the case of using the first spatial scalability shown in FIGS. 16A and 16B, that is if the input VOP in its entirety is the upper layer and the entire VOP contracted or reduced in size is the lower layer, that is if both the lower layer data and the upper layer data are decoded, the picture reconstructing unit 73 extracts the decoded upper layer picture (VOP) of a size corresponding to the size data FSZ__E based only on the upper layer data, by the key signals, if need be, and arranges the extracted picture at a position specified by the offset data FPOS__E. If an error occurs in the lower layer bitstream or only the lower layer data is decoded because the monitor 74 can only operate with a low-resolution picture, the picture reconstructing unit 73 extracts the upper layer decoded picture (VOP) of a size corresponding to the size data FSZ-B based only on the lower layer data by the key signal, if need be, and arranges the extracted picture at a position specified by the offset data FPOS__B.

In the case of using the second spatial scalability shown in FIGS. 17A and 17B, that is if a part of the input VOP is the upper layer and the entire VOP constructed in size is the lower layer, that is if both the lower layer data and the upper layer data are decoded, the picture reconstructing unit 73 enlarges the lower layer decoded picture of a size corresponding to the size data FSZ__B by use of a multiplying factor FR to generate a corresponding enlarged picture. The picture reconstructing unit 73 multiplies the offset data FPOS__B by FR and arranges the enlarged picture at a position corresponding to the resulting value. Additionally, the picture reconstructing unit 73 arranges the upper layer decoded picture having a size corresponding to the size data FSZ-E at a position specified by the offset data FPOS__E. In this case, the upper layer portion of the decoded picture is displayed with a higher resolution than that of the other portions.

In arranging the upper layer decoded picture, the decoded picture is synthesized with an enlarged picture. This synthesis may be carried out using key signals of the upper layer.

The above-mentioned data and the multiplying factor FR may be supplied to the picture reconstructing unit 73 from the upper layer decoding unit 93 (VOP decoding unit $72_n$) Using such data, the picture reconstructing unit 73 generates an enlarged picture.

If, in the case of applying the second spatial scalability, only the lower layer data are decoded, picture reconstruction may be carried out as in the case of applying the above-described spatial scalability.

If, in the case of applying the third spatial scalability (FIGS. 18A, 18B, 19A, 19B), that is if each object constituting an input VOP in its entirety is an upper layer and the entire object as thinned out is a lower layer, a picture may be reconstructed as in the case of applying the above-mentioned second spatial scalability.

With the offset data FPOS__B and FPOS__E, as described above, corresponding pixels of the enlarged lower layer picture and the upper layer picture may be arranged at the same positions in the absolute coordinate system. Additionally, the above-described picture reconstruction leads to a correct picture (that is, a picture substantially devoid of position deviation).

Syntax in scalability will now be explained in conjunction with a MPEG4VM verification method.

Figure 32:
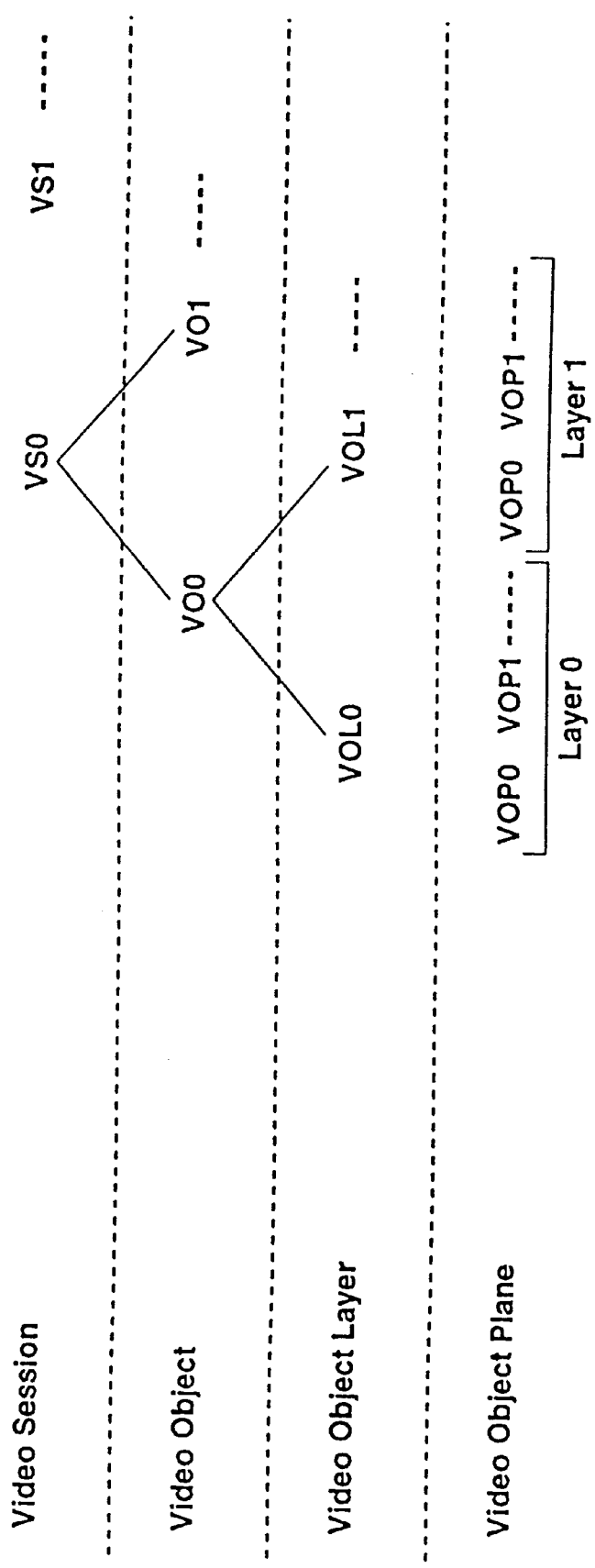
FIG. 32 illustrates syntax of a bitstream obtained on scalable encoding.

FIG. 32 illustrates a bitstream structure obtained on scalability encoding. More specifically, a bitstream is constructed by video session (VS) class as a unit and each VO is made up of one or more video object layer (VOL) class. If a picture is not layered, the VOL may be a sole VOL, whereas, if the picture is layered, it is made up of a number of VOLs equal to the number of layers.

FIGS. 33 and 34 show the syntax for VS and VO, respectively. The VO is a bitstream corresponding to the sequence of the entire picture or part of it (object), so that the VS is constructed by a set of such sequences. As an example, a VS may correspond to a broadcasting program.

FIG. 35 shows a VOL syntax. VOL is a class for scalability and may be identified by a number specified by video_object_layer_id (portion shown by A1 in FIG. 35). That is, video_object_id for the VOL of the lower layer may be 0, while video_object_layer_id for the VOL of the upper layer may be 1. The number of scalable layers is not limited to 2, but may be any optional number equal to or larger than 3. Whether each VOL is the entire picture or part thereof may be discriminated or determined by video_object_layer_shape which specifies the shape of the VOL. Such video_object_layer_shape may be set as follows. If the shape of the VOL is rectangular, video_object_layer_shape may be '00'. If the VOL is of a shape of an area extracted by a hard key (a binary signal of values 0 or 1), video_object_layer_shape may be '01'. If the VOL is of a shape of an area extracted by a hard key (a signal having a continuous value from 0 to 1 (grey scale), that is if the VOL can be synthesized using a soft key, video_object_layer_shape may be '10'

Consider the ease wherein the video_object_layer_shape is '00' when the VOL is rectangular in shape and the position and magnitude of the VOL in the absolute coordinate system is constant or does not change with time. In this case, the magnitude (transverse length and longitudinal length) may be specified by video_object_layer_width and video_object_layer_height (portion shown by A7 in FIG. 35). Both video_object_layer_width and video_object_layer_height may each be a 10-bit fixed-length flag and, if, for example, the video_object_layer_shape is '00', the 10-bit flags may be transmitted at the outset only once because the VOL is of a fixed size in the absolute coordinate system (that is, the video_object_layer_shape is '00').

Further, a one-bit flag scalability (the portion shown by A3 in FIG. 35) specifies which of the lower and upper layers is the VOL. For example, if the VOL is the lower layer, the flag scalability may be set to 0; whereas, if the VOL is the upper layer, the flag scalability may be set to 1.

If a VOL uses a picture in another VOL as a reference picture, the VOL to which the reference picture belongs is represented by ref_layer_id (the portion shown by A4 in FIG. 35) which may be transmitted only for the upper layer.

In FIG. 35, hor_sampling_factor_n and hor_sampling_factor_m shown in A5 in FIG. 35 specify a value corresponding to the horizontal length of the VOP in the lower layer and a value corresponding to the horizontal length of the VOP in the upper layer, respectively. Therefore, the length in the horizontal direction of the upper layer to that of the. lower layer (multiplying factor of the resolution in the horizontal direction) is given by hor_sampling_factor_n/hor_sampling_factor_m. Additionally, ver_sampling_factor_n and ver_sampling_factor_m shown in A6 in FIG. 35 specify a value corresponding to the vertical length of the VOP in the lower layer and a value corresponding to the vertical length of the VOP in the upper layer, respectively. Therefore, the length in the vertical direction of the upper layer to that of the lower layer (multipling factor of the resolution in the vertical direction) is given by ver_sampling_factor_n/ver_sampling_factor_m.

FIG. 36 shows an example of the syntax of the video object plane (VOP) class. The size of the VOP (transverse and longitudinal length) may be represented by VOP_width and VOP_height, each having a 10-bit fixed length, as shown by B1 in FIG. 36. The position in the absolute coordinate system of the VOP may be represented by a 10-bit fixed length VOP_horizontal_spatial_mc_ref (portion B2 shown in FIG. 36) and a VOP_vertical_mc_ref (portion B3 shown in FIG. 36). The above VOP_width and VOP_height represent the length in the horizontal direction and the length in the vertical direction, respectively, corresponding to the above-mentioned size data FSZ_B and FSZ_E. On the other hand, the above VOP_horizontal_spatial_mc_ref and VOP_vertical_mc_ref respectively represent the coordinates in the horizontal direction and vertical direction (x and y coordinates) which correspond to FPOS_B and FPOS_E.

The VOP_width, VOP_height, VOP horizontal_spatial_mc_ref and VOP_vertical_mc_ref may be transmitted only when the video_object_layer_shape is other than '00'. If the video_object_layer_shape is '00', the size and the position of the VOP are both constant, so that it is unnecessary to transmit VOP_width, VOP_height, VOP_horizontal_spatial_mc_ref or VOP_vertical_mc_ref. On the receiving side, the VOP has its upper left apex point arranged in coincidence with the point of origin of the absolute coordinate system, while its size can be recognized from the video_object_layer_width and the video_object_layer_height described with reference to FIG. 35.

A ref_select_code shown at B4 in FIG. 36 represents a picture used as a reference picture as explained with reference to FIGS. 26A and 26B. Such ref_select_code may be prescribed in the VOP syntax as shown in FIG. 36.

FIG. 37 shows another example of the syntax of the video object plane (VOP) class. In the present embodiment, similar to the embodiment of FIG. 36, information on the size and the position of the VOP is transmitted if the video_object_layer_shape is other than '00'. However, if, in the present embodiment, the video_object_layer_shape is other than '10', a 1-bit flag load_VOP_size (portion shown by C1 in FIG. 37) may be transmitted which indicates whether or not the size of the presently transmitted VOP is equal to that of the previously transmitted VOP is transmitted. The load_VOP_size may be set to 0 or 1 if the size of the current VOP is equal to or is not equal to the size of the previously decoded VOP, respectively. If the load_VOP_size is 0, VOP_width or VOP_height (shown by C2 in FIG. 37) is not transmitted, whereas if the load_VOP size is 1 the VOP_width and VOP_height are transmitted. Such VOP_width or VOP_height are similar to that explained with reference to FIG. 36.

In FIGS. 36 and 37, the difference between the transverse length or longitudinal length of the current VOP and the transverse length or longitudinal length of the directly previously decoded VOP (sometimes referred to as size difference) may be used as VOP_width or VOP_height, respectively. In actual pictures, the VOP size may not change frequently, so that redundant bits can be reduced by transmitting VOP_width and VOP_height only when the load_VOP_size is 1. If the size difference is used, the amount of information may be further decreased.

Such size difference may be calculated and variable length encoded by the VLC unit 36 in FIGS. 22 and 23 and outputted therefrom. In the present case, the IVLC unit 102 sums the size difference to the size of the directly previously decoded VOP size for recognizing or determining the size of the currently decoded VOP.

With regard to VOP position information, the difference between the coordinate value in the absolute coordinate system and the coordinate value of the directly previously decoded VOP (previous VOP) (sometimes referred to as position difference) in place of the coordinate value in the absolute coordinate system, is transmitted by diff_VOP_horizontal_ref and diff_VOP_vertical_ref (portion shown by C3 in FIG. 37).

If the x or y coordinate in the absolute coordinate system of the directly previously decoded VOP is represented by VOP_horizontal_mc_spatial_ref_prev or VOP_vertical_mc_spatial_ref_prev, diff-VOP-horizontal_ref or diff_VOP_vertical_ref may be calculated by the VLC unit 36 (FIGS. 22 and 23) in accordance with the following equations:

diff_VOP_horizontal_ref=VOP_horizontal_mc_spatial_ref–VOP_horizontal_mc_spatial_ref_prev diff_VOP_vertical_ref=VOP_vertical_mc_spatial_ref–VOP_vertical_mc_spatial_ref_prev using VOP_horizontal_mc_spatial_ref or VOP_vertical_mc_spatial_ref in FIG. 36. Further, meanwhile, the VLC unit 36 variable-length encodes the calculated diff_VOP_horizontal_ref and diff_VOP_vertical_ref and outputs the same. Specifically, the VLC unit 36 finds diff_size_horizontal or diff_size_vertical at C4 in FIG. 37 in accordance with a table shown in FIG. 38 and in association with diff_VOP_horizontal_ref and diff_VOP_vertical_ref, and variable length encodes the diff_size_horizontal or diff_size_vertical thus found. Also, the VLC unit 36 converts diff_VOP_horizontal ref or diff_VOP_vertical_ref into variable length codes in association with diff_size_horizontal or diff_size_vertical and in accordance with the table shown in FIG. 39. The diff_VOP_horizontal_ref, diff_VOP_vertical_ref, diff_size_horizontal or diff_size_vertical converted into variable length codes may be multiplexed on other data for transmission. In this case, the IVLC unit 102 of FIGS. 30 and 31 recognizes the length of the variable length codes of diff_VOP_horizontal_ref or diff_VOP_vertical_ref from diff_size_horizontal or diff_size_vertical and performs variable length decoding based on the results of such recognition.

If the position difference is transmitted, the information volume can be decreased as compared to the case of FIG. 36.

A ref_select_code shown at C5 in FIG. 37 is substantially similar to that explained with reference to FIG. 36.

FIGS. 40A and 40B show the syntax of a macro-block.

FIG. 40A shows the syntax of a macro-block of an I- or P-picture (VOP). The flag COD, which is arranged next to the leading first_MMR_code, specifies whether or not any data is next to the COD. If the DCT coefficients obtained from a macro-block of an I-picture or a P-picture (result of quantization of the DCT coefficients) are all zero and the motion vector is zero, the VLC unit 36 of the lower layer encoding unit 25 (FIG. 22) and the upper layer encoding unit 23 (FIG. 23) sets the macro-block of the I-picture or the P-picture as a skip macro-block and sets the COD to 1. Therefore, if the COD is 1, there is no data to be transmitted for the macro-block, so that data subsequent to the I-flag is not transmitted. On the other hand, if ac components other than 0 are present in the DCT coefficients of the I- or P-picture, the VLC unit 36 sets the flag COD to 0 and may transmit subsequent data. Further, the MCBPC arranged next to the flag COD specifies the macro-block type and the next following data may be transmitted in accordance with the MCBPC. Furthermore, since an I-picture basically does not become a skip macro-block, the COD for the I-picture is not transmitted or is designed so as not to be transmitted.

The "ECOD" may only be present in VOPs for which VOP_prediction_type indicates P-VOPs and the corresponding macro-block is not transparent. The macro-block layer structure is shown in FIG. 40A. The "COD" may be a one bit flag at the macro-block layer which when set to "0" signals that the macro-block is coded. If set to "1", no further information may be transmitted for this macro-block; in that case, for P-VOP, the decoder may treat the macro-block as a 'P(inter)' macro-block with the motion vector for the whole macro-block equal to zero and with no coefficient data. The macro-block layer structure of B-VOPs(VOP_prediction_type='10') is shown in FIG. 40B. If the COD indicates skipped (COD=='1') for a MB in the most recently decoded I- or P-VOP then colated MB in B-VOP is also skipped. (No information is included in the bitstream). Otherwide, the macro-block layer is as shown in FIG. 40B. However, in the case of the enhancement layer of spatial scalability (ref_select_code=='00'&& scalability=='1'), regardless of COD for a MB in the most recently decoded I- or P-VOP, the macro-block layer is as shown in FIG. 40B.

FIG. 40B shows the syntax of a macro-block of a B-picture (VOP). The flag MODB, arranged next to the leading first_MMR_code, is associated with the flag COD in FIG. 40A, and specifies whether or not any data is arranged next to the MODB (that is, specifies the macro-block type of the B-picture).

The "MODB" flag may be present for every coded (non-skipped) macro-block in B-VOP. It may be a variable length codeword regardless of whether MBTYPE and/or CBPB information is present. In the case in which MBTYPE does not exist, the default may be set to "Direct(H.263B)". In the case of the enhancement layer of spatial scalability (ref_select_code=='00' && scalability=='1'), the default of MBTYPE may be set to "Forward MC" (prediction from the last decoded VOP in the same reference layer). The codewords for MODB are defined in FIGS. 41A and 41B.

The VLC unit 36 (FIGS. 22 and 23) may encode MODB by variable length encoding as shown, for example, in FIGS. 41A and 41B for transmission. That is, in the present embodiment, two sorts of variable length encoding of the MODB are provided as shown in FIGS. 41A and 41B. (The term "variable length table" is used herein for denoting both the table for variable length encoding and the table for variable length decoding.) The variable length table of FIG. 41A (sometimes referred to herein as MODB table A) allocates three variable length codes for MODB, and the variable length table of FIG. 41B (sometimes referred to herein as MODB table B) allocates two variable length codes for MODB. If, with the use of the MODB table A, a macro-block of a B-picture can be decoded using only data (such as quantization coefficients or a motion vector) of a macro-block of another frame decoded before decoding the macro-block of the B-picture, or a macro-block at a corresponding position of a directly previously decoded I- or P-picture (that is, a macro-block of an I- or P-picture at the same position as the macro-block being processed) is a skip macro-block with the COD being zero, the VLC unit 36 (FIGS. 22 and 23) sets the macro-block of the B-picture as the skip macro-block with the MODB being zero. In this case, data subsequent to MODB, such as MBTYPE and CBPB, may not be transmitted.

If, however, the DCT coefficients (quantized DCT coefficients) for a macro-block all have the same value (such as 0) but a motion vector for the macro-block exists, so that is the motion vector should be transmitted, the MODB is set to '10' and the next following MBTYPE is transmitted. On the other hand, if at least one of the DCT coefficients of the macro-block is not zero (that is, if a DCT coefficient exists) and a motion vector for the macro-block exists, the MODB is set to '11' and the next following MBTYPE and CBPB are transmitted.

Figure 42:
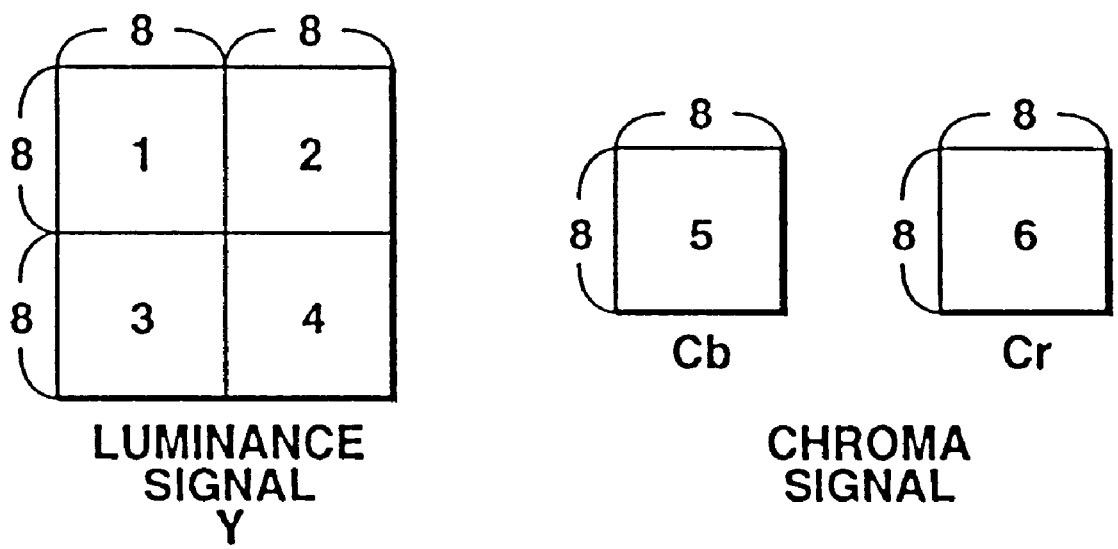
FIG. 42 illustrates a macro-block.

The MBTYPE specifies the predictive mode of the macro-block and data (flag) contained in the macro-block, and the CBPB is a 6-bit flag which specifies the block in the macro-block wherein the DCT coefficients exist. Specifically, each macro-block may include four 8×8 pixel blocks for luminance signals, a 8×8 pixel block for chroma signals Cb, and a 8×8 pixel block for chroma signals Cr, totaling six blocks, as shown in FIG. 42. The DCT unit 34 (FIGS. 22 and 23) may perform DCT processing for each block, and the VLC unit 36 (FIGS. 22 and 23) may set the 6 bits of the CBPB to 0 or 1 depending on whether or not a DCT coefficient is in each of the six blocks. That is, assume that block numbers of 1 to 6 have been set for the six blocks making up a macro-block, as shown in FIG. 42. The VLC unit 36 may set the Nth bit of the CBPB to 1 or 0 if a DCT coefficient is or is not in the block having the block number N, respectively. It is herein assumed that the LSB and MSB are the first bit and the sixth bit, respectively. Therefore, if CBPB is 0 ('000000'), there are no DCT coefficients in the macro-block.

On the other hand, the flag MODB may be set to '0' or '1' if the MODB table B (FIG. 41B) or the MODB table A is used in the VLC unit 36 (FIGS. 22 and 23), respectively. Therefore, if the MODB table B is used, a skip macro-block may not be produced.

Next, the MBTYPE is encoded by variable length encoding by the VLC unit 36 (FIGS. 22 and 23) and transmitted. That is, in the present embodiment, two sorts of variable length encoding of the MBTYPE are provided as shown in FIGS. 43A and 43B. The variable length table of FIG. 43A (sometimes referred to herein as MBTYPE table A) allocates four variable length codes for MBTYPE, and the variable length table of FIG. 43B (sometimes referred to herein as MBTYPE table B) allocates three variable length codes for MBTYPE.

If the MBTYPE table A is used, and if the predictive mode is the bidirectional predictive encoding mode (Interpolate MC+Q), the VLC unit 36 variable length encodes the MBTYPE to '01'. In such case, DQUANT, $MVD_f$, and $MVD_b$ are transmitted, in which DQUANT denotes a quantization step, and $MVD_f$ and $MVD_b$ denote a motion vector used for forward prediction and that used for backward prediction, respectively. Alternatively, instead of the quantization step per se, the difference between the current quantization step and the previous quantization step may be used as DQUANT. If the prediction mode is the backward predictive encoding mode (backward MC+q), MBTYPE is variable length encoded to '001' and DQUANT and $MVD_b$ are transmitted. If the prediction mode is the forward predictive encoding mode (forward MC+q), MBTYPE is variable length encoded to '0001' and DQUANT and $MVD_b$ are transmitted. If the prediction mode is the direct mode prescribed in H.263 (direct coding mode), MBTYPE is set to '1', and MVDB is transmitted.

In a previous case, only three types of interceding modes (that is, forward predictive encoding mode, backward predictive encoding mode, and bidirectionally predictive encoding mode) have been explained. However, MPEG4 provides four types, that is the above three types and a direct mode. Therefore, the motion vector detector 32 of FIGS. 22 and 23 sets, the one of the intra-coding mode (that is, forward predictive encoding mode, backward predictive encoding mode, bidirectionally predictive encoding mode, and the direct mode) as a prediction mode which will minimize prediction error. The direct mode will be further explained herein below.

In the VLC unit 36 (FIGS. 22 and 23) MBTYPE may be '1', '01' or '001' when the MBTYPE table B (FIG. 43B.) is used and may be '1', '01', '001' or '0001' when the MBTYPE table A is used. Therefore, if the MBTYPE table B is used, the direct mode may not be set as the prediction mode.

The direct mode will now be explained with reference to FIG. 44.

Assume that four VOPs exist (namely VOP0, VOP1, VOP2 and VOP3) displayed in this order, with the VOP0 and VOP3 being a P-picture (P-VOP) and the VOP1 and VOP2 being a B-picture (B-VOP). Additionally, assume that the VOP0, VOP1, VOP2 and VOP3 are encoded/decoded in the order of VOP0, VOP3, VOP1 and VOP2.

Under the above-mentioned assumed conditions, predictive coding of VOP1 under the direct mode occurs as follows. That is, if, in the P-picture encoded (decoded) directly before VOP1 (that is, VOP3 in the embodiment of FIG. 44) the motion vector of the macro-block at the same position as the macro-block of VOP1 being encoded (macro-block being encoded) is MV, the motion vector MVF for forward predictive encoding of the macro-block being encoded and the motion vector MVB for backward predictive encoding the macro-block being encoded can be calculated from the motion vector MV and a pre-set vector MVDB in accordance with the following equations:

$$MVF=(TRB \times MV)/TRD+MVDB$$

$$MVB=(TRB-TRD) \times MV/TRD$$

However, the motion vector MVB can be calculated by the above equation when the vector MVDB is 0. If the vector MVDB is not 0, the motion vector MVB is calculated in accordance with the following equation:

$$MVB=MVF-MV.$$

Figure 44:
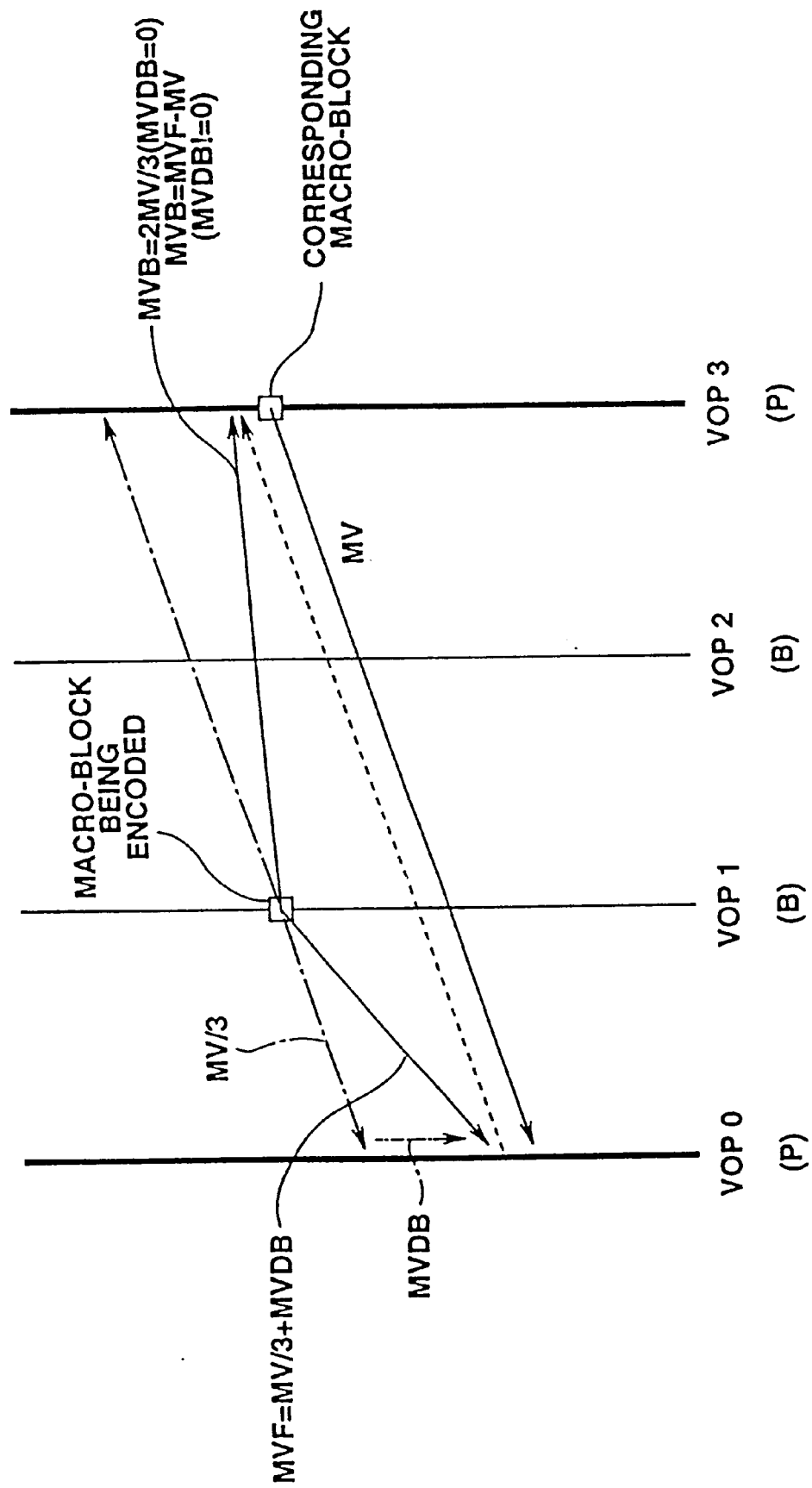
FIG. 44 illustrates predictive coding by a direct mode.

TRB denotes a distance up to a directly previously displayed I- or P-picture (VOP0 in the embodiment of FIG. 44), and TRD denotes the interval between I- or P-pictures positioned directly before and directly after VOP1 in the display sequence (between VOP1 and VOP3 in the embodiment of FIG. 44).

The motion vector detector 32 of FIGS. 22 and 23 may set a direct mode as a prediction mode if, with the vector MVDB of the VOP of a B-picture being changed in value, the prediction error produced on predictive coding using the motion vectors MVF and MVB obtained in accordance with the above equations is smaller than that obtained for the intra-coding mode (forward predictive encoding mode, backward predictive encoding mode or bidirectionally predictive encoding mode). In the above, the vector MVDB may have the same direction as that of the motion vector MV.

In the embodiment of FIG. 44, TRB=1 and TRD=3, so that the motion vector MVF is MV/3+MVDB. On the other hand, the motion vector MVB is 2MV/3 and by −2MV/3+MVDB if MVDB is 0 and not 0, respectively.

If the prediction mode is the direct mode, the motion vector MV of a corresponding macro-block in the nearest P-picture encoded/decoded in the future (VOP3 in the embodiment of FIG. 44) may be used for encoding/decoding of the macro-block being encoded.

As previously described, a VOP may be changed in size or position (if video_object_layer_shape is '10' or '01'). In such a case, the corresponding macro-block may not be available. Therefore, if the direct mode is used in encoding/decoding a VOP changed in size or position, processing may be infeasible. Thus, in the present embodiment, the direct mode is usable only when a VOP having a macro-block being encoded (VOP of B-picture) is of the same size as the VOP of the nearest P-picture decoded in the future. Specifically, the use of the direct mode is allowed only when the VOP size represented by VOP_width and VOP_height as described above is not changed.

Therefore, the MBTYPE table A (FIG. 43A) which includes a variable length code of MBTYPE of a direct mode, is used if the VOP of a B-picture having a macro-block being encoded has the same size as the VOP of the nearest P-picture decoded in the future.

Additionally, the MODB table A (FIG. 41A) is provided in MPEG4, which prescribes that if this MODB table A is used the prediction mode is the direct mode if MODB is '0' and the ref_select_code of FIGS. 26A and 26B is not '00'. Thus, the MODB table A may be used if a VOP of a B-picture having a macro-block being encoded has the same size as the VOP of the nearest P-picture decoded in the future.

Thus, if the MODB table A and the MBTYPE table A are used, and if MODB is '0' or MBTYPE is '1', the prediction mode is the direct mode.

If the video-object-layer-shape is '00', the VOP is not changed in size so that, in this case, the MODB table A and the MBTYPE table A are used.

On the other hand, if the VOP of a B-picture having a macro-block being encoded is different in size from the VOP of the nearest P-picture decoded in the future, the direct mode may not be used. In this case, MBTYPE is variable length encoded/decoded using the MBTYPE table B.

If the VOP of the B-picture having the macro-block being encoded is different in size from the VOP of the nearest P-picture decoded in the future, at least MPTYPE should be transmitted. In other words, in such situation, it may not be necessary to transmit both MBTYPE and CBPB. Thus, MODB may be variable length encoded/decoded using the MODB table B (FIG. 41B) which does not provide the case of not transmitting both MBTYPE and CBPB, without using the MODB table A (FIG. 41A) which provides the case of not transmitting both MBTYPE and CBPB.

By selecting or changing the variable length table used in accordance with changes in VOP size, the volume of data obtained as a result of encoding may be reduced. That is, if only the MODB table A (FIG. 41A) is used, the MODB may be encoded in a 1-bit variable length code or in two 2-bit variable length codes. On the other hand, if the MODB table B (FIG. 41B) is used, the MODB is encoded in a 1-bit variable length code or in a 2-bit variable length code. Therefore, if both the MODB tables A and B are used, the frequency with which the MODB is encoded in two bit variable length codes is decreased and, as a result, the data volume may be reduced.

Similarly, MBTYPE may be encoded in 4 bit variable length codes or less as indicated in the MBTYPE table A (FIG. 43A). However, as indicated in the MBTYPE table B (FIG. 43B), MBTYPE may be encoded in 3 bit variable length codes or less, so that the data volume can be diminished.

Figure 45:
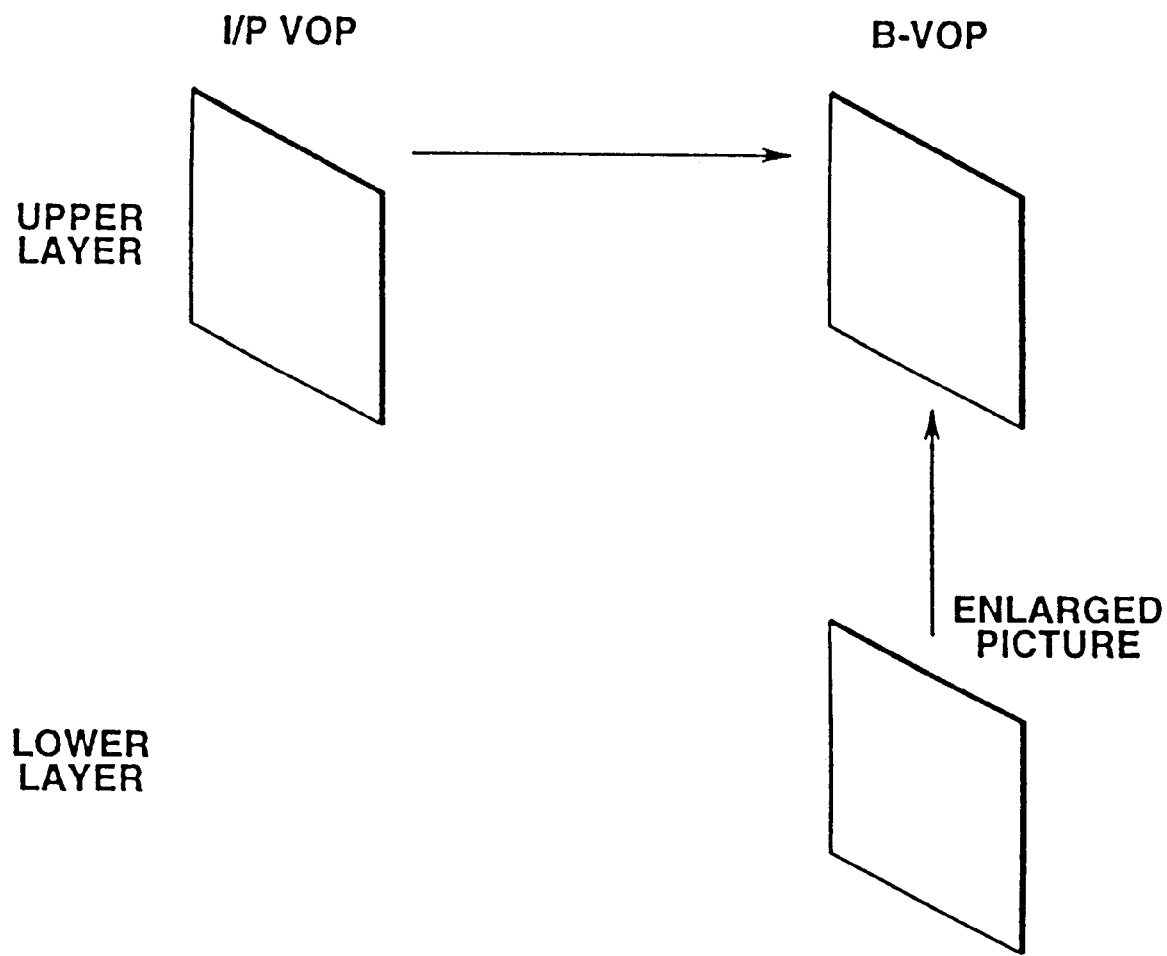
FIG. 45 illustrates predictive coding of a B-PICTURE of an upper layer.
Figure 46A:
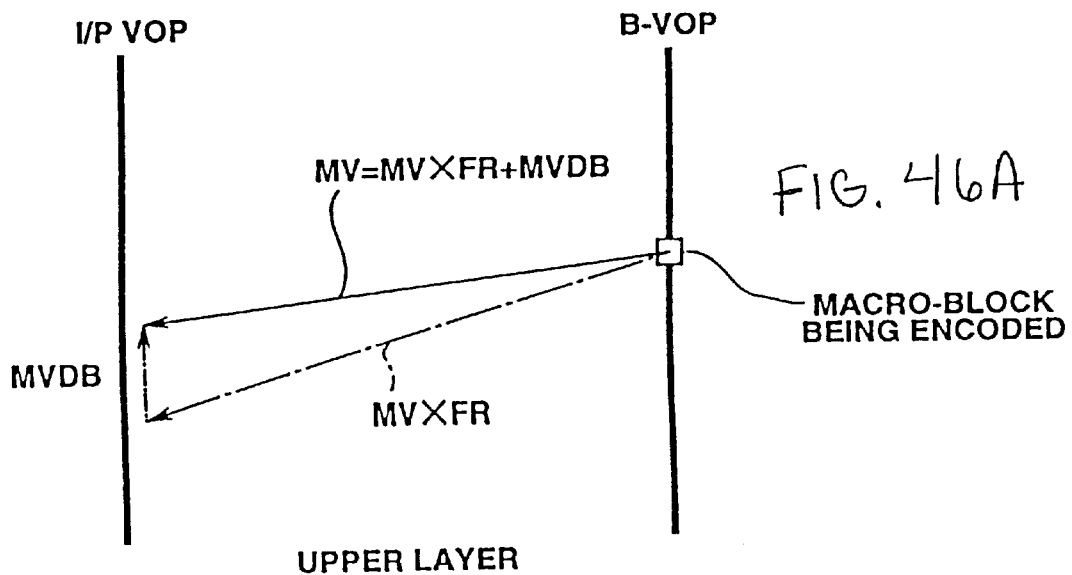
FIGS. 46A and 46B are diagrams to which reference will be made in explaining a quasi-direct mode.
Figure 46B:
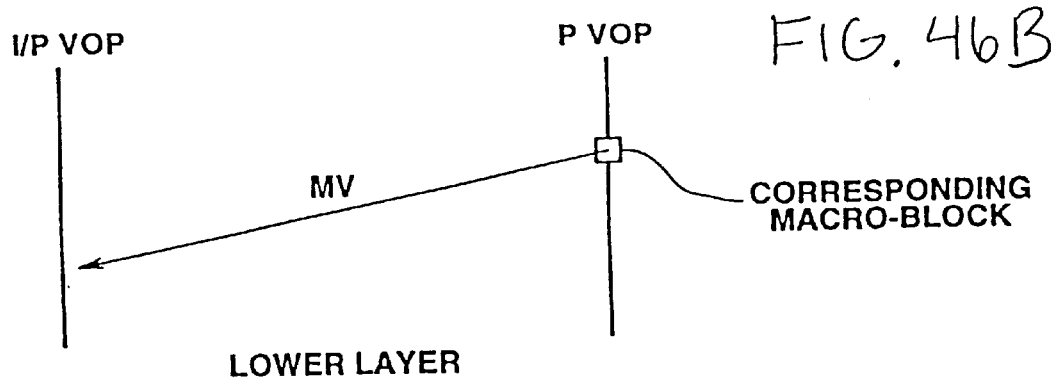

Plural MODB tables and MBTYPE tables may be used, as described above, for the lower layer or the upper layer with ref_select_code other than '00'. However, a problem may occur with regard to the upper layer having a ref_select_code equal to '00'. Specifically, with a flag ref_select_code for a B-picture macro-block being processed of '00', the I- or P-picture of the same layer (herein the upper layer) and a picture in a different layer (herein a lower layer) at the same time point (enlarged picture) as shown in FIG. 45 may be used as a reference picture, as shown in FIGS. 26A and 26B. On the other hand, the direct mode may predictively encode a B-picture between two I- or P-pictures at different time points using a motion vector of a directly previously decoded P-picture. Thus, if the ref_select_code is '00', the direct mode may not be applied. If nevertheless the MBTYPE table A is used, the direct mode may be set as the prediction mode.

In the present embodiment, if the flag ref_select_code for a B-picture macro-block being processed in the upper layer is '00', the MBTYPE may be variable length encoded/decoded by one of the following two methods.

In the first method, if the flag ref_select_code of a B-picture macro-block being processed in the upper layer is '00', the MBTYPE table B is used in place of the MBTYPE table A. Since the direct mode is not defined in the MBTYPE table B, the direct mode may not be set as a prediction mode in the case shown in FIG. 45.

In the second method, a quasi-direct mode may be used as a prediction mode. In such situation, if the flag ref_select_code for the B-picture macro-block being processed in the upper layer is '00' and the MBTYPE table A is used, the quasi-direct mode (instead of the direct mode) has the variable length code '1' for the MBTYPE. In the quasi-direct mode, forward prediction is performed in the case of FIG. 45 using a picture of a lower layer (different layer) enlarged by a multiplying factor FR as a reference picture (reference picture for prediction), and backward prediction is performed using a decoded picture encoded directly previously to the upper layer (same layer) as a reference picture.

If the motion vector for the corresponding macro-block in the enlarged picture used as the reference picture for forward prediction (a macro-block at the same position as the macro-block being encoded) is MV, a motion vector MVB may be used for backward prediction where MVB is defined by the following equation:

$$MVB = MV \times FR + MVDB$$

That is, a vector obtained by multiplying the motion vector MV of the corresponding macro-block of the lower layer by FR and adding a vector MVDB to the resulting product may be used as the motion vector MVB for backward prediction. In this situation, the vector MVDB may not be transmitted because the motion vector MVB can be obtained from the motion vector MV, multiplying factor FR, and MVDB. Thus, if, in the receiving side (decoding side), the flag ref_select_code for the B-picture macro-block being processed in the upper layer is '00' and the MBTYPE table A is used for variable length decoding, the motion vector MVB of the macro-block with MBTYPE of '1' is found from the motion vector MV of the corresponding macro-block of the lower layer, multiplying factor FR, and vector MVDB.

Therefore, the vector MVDB which may be considered redundant data is not transmitted, thus improving the encoding efficiency.

A method for determining the variable length table used in the VLC unit 36 of FIGS. 22 and 23 and in the IVLC unit 102 of FIGS. 30 and 31 (the method for determining which of the MODB tables A or B and which of the MBTYPE A or B is used) will now be explained with reference to the flowcharts of FIGS. 47 and 48.

Figure 47:
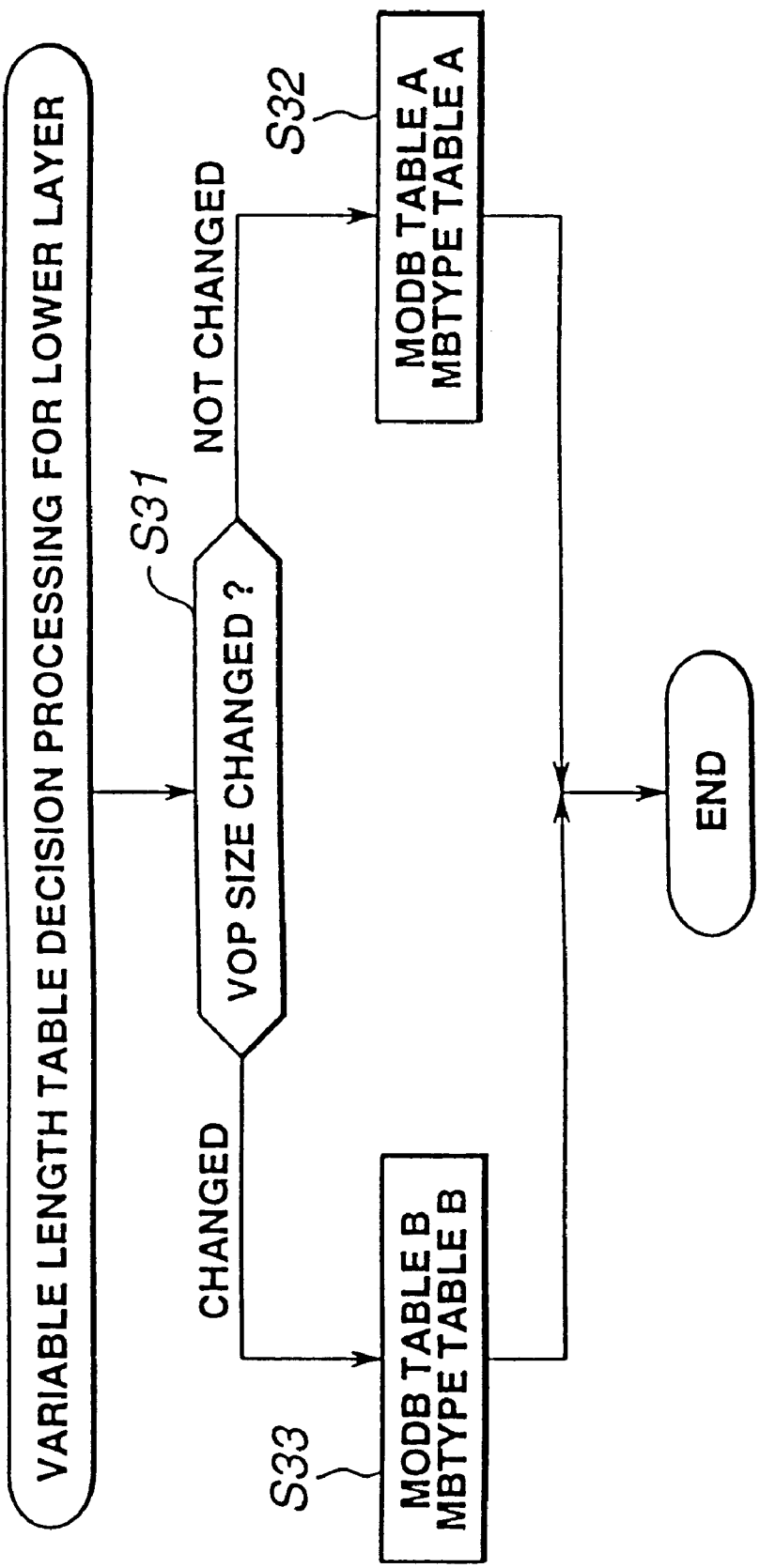
FIG. 47 is a flowchart to which reference will be made in explaining a method for determining a variable length table used for a lower layer.

FIG. 47 shows the method for determining the variable length table used for the lower layer. At step S31, it is judged (by having reference to video_object_layer_shape, VOP_width or VOP_height explained with reference to FIG. 36 or to load_VOP_size explained with reference to FIG. 31) whether or not the VOP size has been changed. If the VOP size has not been changed, processing proceeds to step S32 wherein the MODB table A and the MBTYPE table A are used. Processing may then be terminated. Conversely, if step S31 indicates that the VOP size has changed, processing proceeds to step S33 wherein the MODB table B and the MBTYPE B be used. Processing may then be terminated.

Figure 48:
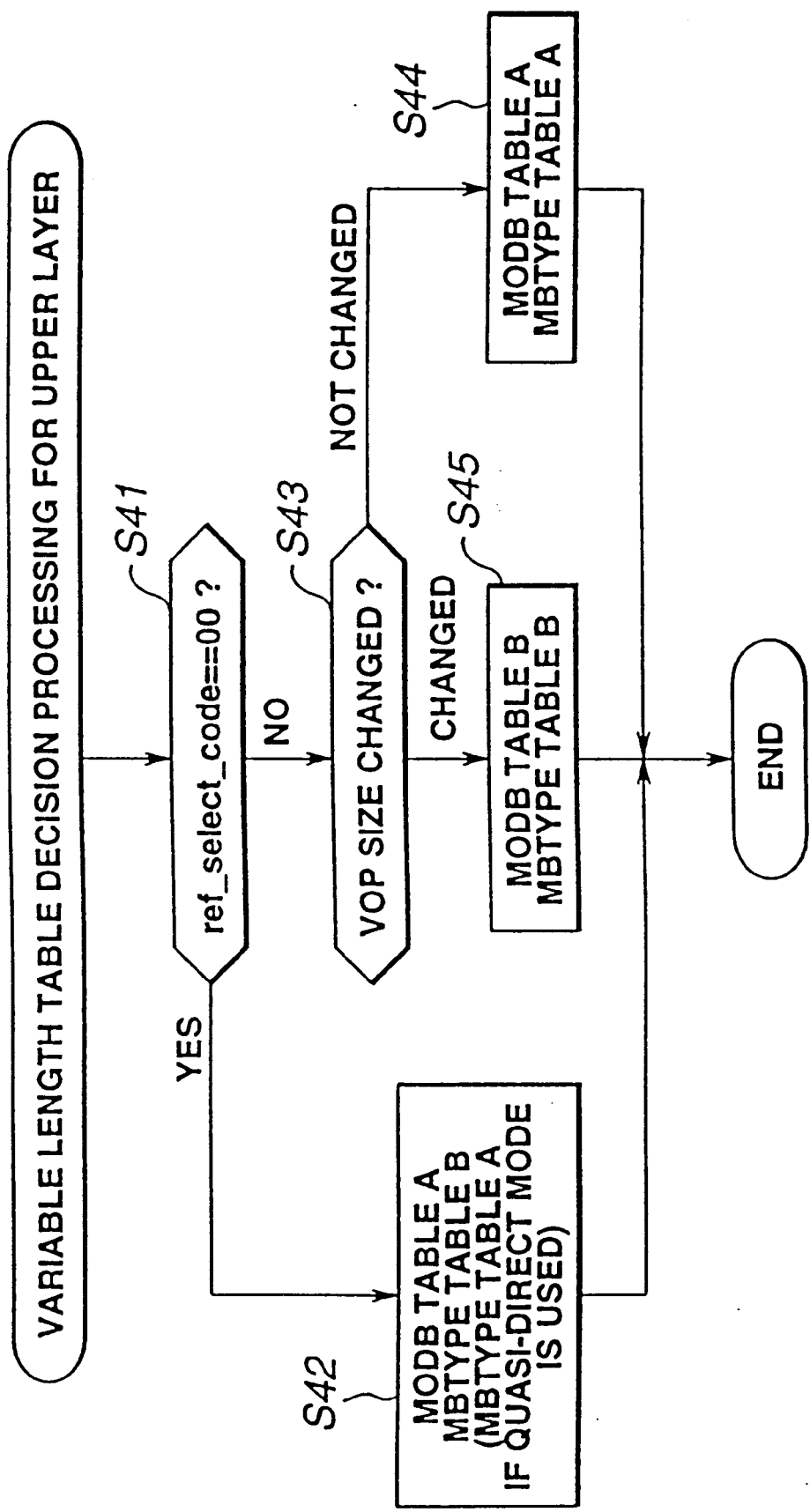
FIG. 48 is a flowchart to which reference will be made in explaining a method for determining a variable length table used for an upper layer.

FIG. 48 shows the method for determining the variable length table used for the upper layer. At step S41, it is determined whether or not ref_select_code is '00'. If the ref_select_code is '00' (that is, if a VOP in the lower layer at the same time point is used as a reference picture for the VOP of the upper layer about to be processed), processing proceeds to step S42 wherein the MODB table A and the MBTYPE table B may be used. If, the quasi-direct mode is used, the MBTYPE table A may be used in place of the MBTYPE table B. That is, at step S42, the MBTYPE table B or the MBTYPE table A is selected depending on whether the first or second method is applied, respectively. Processing may then be terminated. On the other hand, if, at step S41, the ref_select_code is not '00', processing proceeds to step S43. Processing similar to that performed at steps S31 to S33 in FIG. 47 may then be carried out at steps S43 to S45 to decide which MODB table and MBTYPE table are to be used.

Processing of the skip macro-block in the lower layer encoding unit 25 of FIG. 22, the upper layer encoding unit 23 of FIG. 23, the lower layer decoding unit 95 of FIG. 30, and the upper layer decoding unit 93 of FIG. 31 will now be explained with reference to FIGS. 49 to 51A, 51B, and 51C.

Assume that an I-picture macro-block basically does not become a skip macro-block. Based on such assumption, the following description pertains to P- and B-pictures. Further, if the MODB table B is used, a skip macro-block may not be produced, as described above. Therefore, a skip macro-block may be processed only when utilizing the MODB table A.

Figure 49:
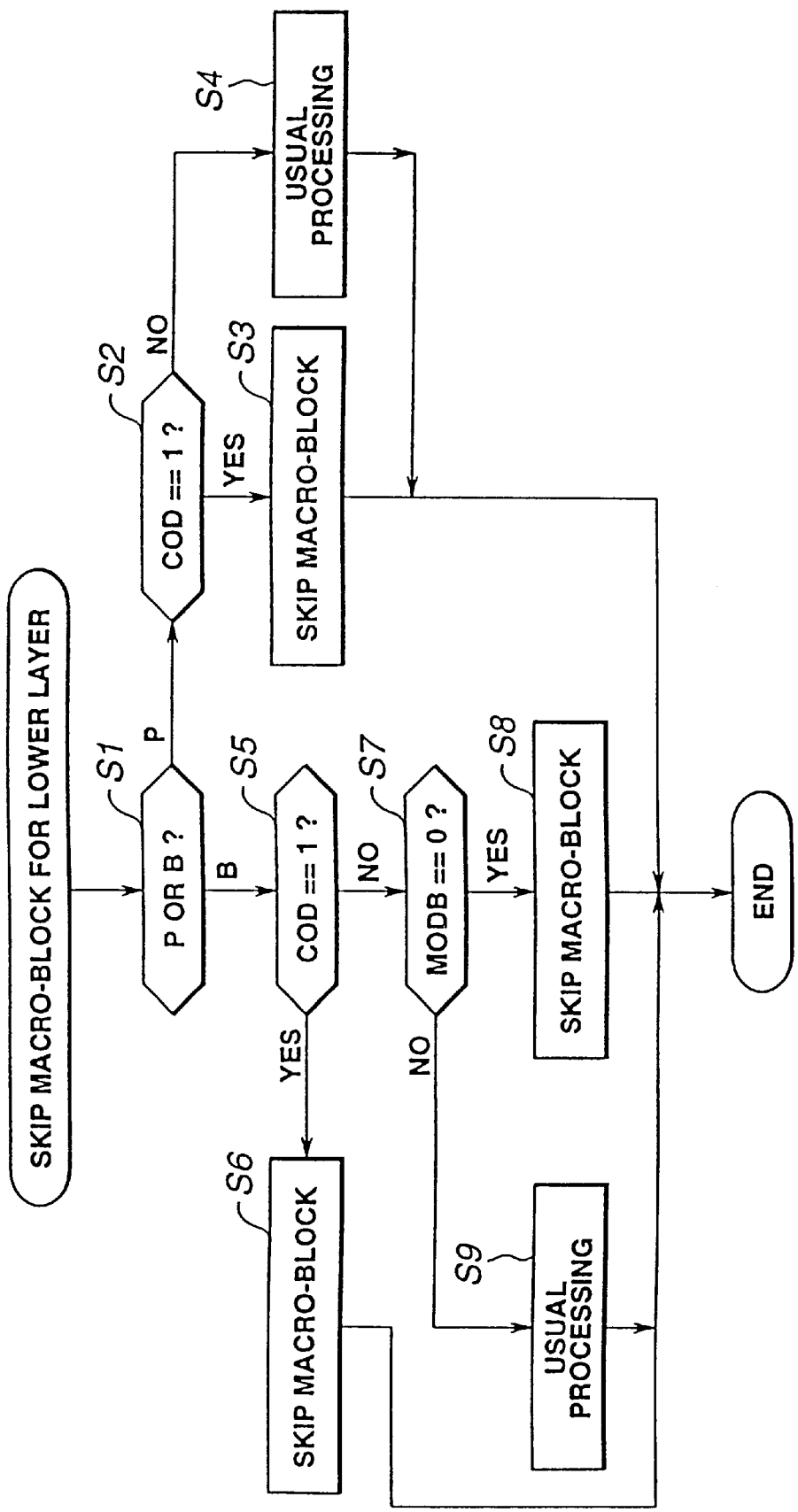
FIG. 49 is a flowchart to which reference will be made in explaining processing for a skip macro-block of a lower layer.

FIG. 49 shows a flowchart for illustrating the processing of a skip macro-block in the lower layer encoding unit 25 of FIG. 22 and in the lower layer decoding unit 95 of FIG. 30.

At step Si, it is judged whether a macro-block being processed is a P-picture or a B-picture. If such macro-block is a P-picture, processing proceeds to step S2 to determine whether or not the COD for the macro-block is 1. If such COD is 1, processing proceeds to step S3 wherein it is determined that the macro-block is a skip macro-block, whereupon the macro-block is processed as such. That is, in this case, the quantization coefficients (DCT coefficients) of the macro-block being processed are assumed to be all zero, and its motion vector is also assumed to be zero.

On other hand, if it is found at step S2 that the COD for the macro-block being processed is not 1, processing proceeds to step S4, whereupon the macro-block is processed in a usual manner. That is, in this case, the macro-block of the P-picture is handled as having DCT coefficients other than 0, or having a motion vector other than 0.

Returning to step Si, if it is determined thereat that the macro-block being processed is a B-picture, processing proceeds to step S5 to determine whether or not the COD of a macro-block at the same position (corresponding macro-block) in the I- or P-picture decoded directly before decoding the macro-block of the B-picture is 1. (Note—The macro-block at the same position is referred to as a corresponding macro-block.) If, at step S5, the COD of the corresponding macro-block for the macro-block being processed is found to be 1, processing proceeds to step S6 wherein it is decided that the macro-block being processed is a skip macro-block, whereupon this macro-block is processed as such.

Figure 51A:
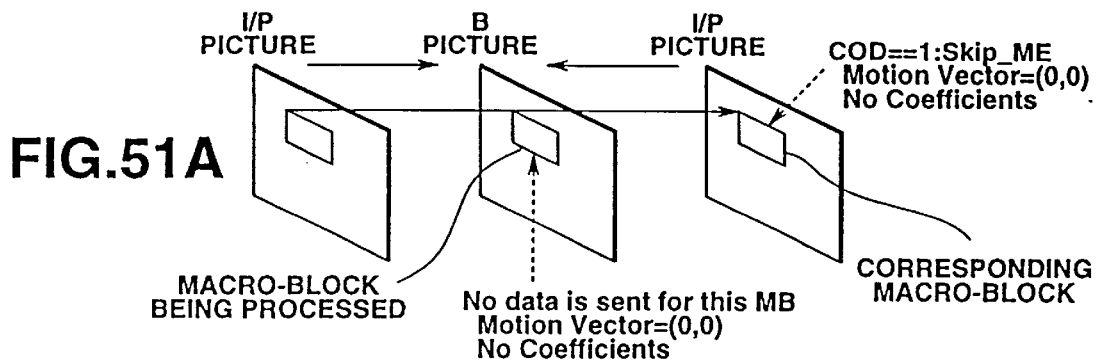
FIGS. 51A to 51C illustrate processing for a skip macro-block.

That is, it is now assumed that pictures for processing (VOPs) are specified by a sequence of I/P, B, I/P (where I/P denotes I- or P-pictures) as shown for example in FIG. 51A and that these pictures are encoded/decoded in the sequence of the leftmost I/P, rightmost I/P, and second B from the left end in FIG. 51A. It is also assumed that the macro-block of the second B-picture from left is being processed. In such situation, the rightmost I/P picture is encoded/decoded using the leftmost I/P picture as a reference picture. If the COD of the corresponding macro-block of the rightmost I/P picture for the macro-block of the B-picture being processed is 1 (that is, if the corresponding macro-block is the skip macro-block) there is no picture change between the leftmost I/P picture to the rightmost I/P picture. Thus, if the macro-block being processed is a B-picture and if the COD of the corresponding macro-block is 1, the macro-block being processed is a skip macro-block. In this case, processing of the B-picture macro-block being processed (predictive coding/decoding) is similarly performed to that of the corresponding macro-block of the rightmost I/P picture so that its motion vector and DCT coefficients are handled as being all zero. The encoder side transmits only the MODB as described above, and the succeeding CBPB or MBTYPE is not transmitted.

Returning to FIG. 49, if the COD of the corresponding macro-block is found at step S5 to be not 1, processing proceeds to step S7 for judging whether or not the MODB of the macro-block of the B-picture being processed is 0. If such MODB is found to be 0, processing proceeds to step S8 wherein it is decided that the macro-block being processed is a skip macro-block, whereupon the macro-block is processed as such.

Figure 51B:
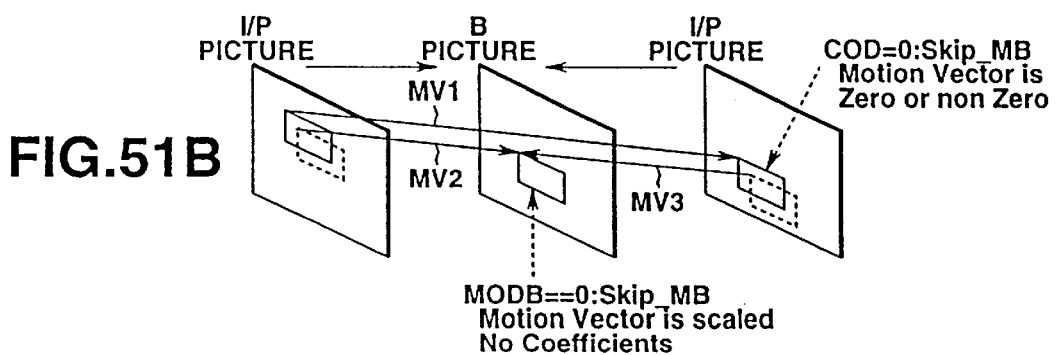

Specifically, it is assumed that, as shown in FIG. 51B, the picture being processed (VOP) is displayed and encoded/decoded in the same sequence as in FIG. 51A, and that the macro-block of the second picture from the left end is being processed. In this case, since the COD of the corresponding macro-block of the rightmost I/P picture for the macro-block of the B-picture being processed is not 1 (that is, the corresponding macro-block is not a skip macro-block) there is a picture change caused between the leftmost I/P picture and the rightmost I/P picture. On the other hand, since the flag MODB of the macro-block of the B-picture being processed is 0, this macro-block can be decoded using only data of the macro-block of other frames decoded before decoding of the macro-block of the B-picture, or the corresponding macro-block in the directly previously decoded I- or P-picture is a skip macro-block (that is, the COD is 1). However, since the COD is not equal to 1, as described above, the macro-block of the B-picture being processed can be decoded using data of the macro-block of other frames decoded before decoding of the macro-block. The data of the macro-block of other frames decoded before decoding of the macro-block may be denoted herein as pre-decoded data.

Such situation (in which a picture change has been caused between the leftmost I/P picture and the rightmost I/P picture, and in which the macro-block of the B-picture being processed can be decoded using only the pre-decoded data) is now considered. This corresponds to a situation in which, if, as shown in FIG. 51B, the leftmost I/P picture or the rightmost I/P picture is motion-compensated using a motion vector MV2 or MV3 to produce a prediction picture (FIG. 51B), a portion thereof shown by a dotted line in FIG. 51B has an average value coincident with the macro-block being processed, no prediction error is produced. The motion vectors MV2 and MV3 are obtained on multiplying a motion vector MV1 by, for example, ½ or 1½. Such motion vector MV1 is used when processing the corresponding macro-block in the rightmost I/P picture (shown by solid line in FIG. 51B) using the leftmost I/P picture as a reference picture.

In view thereof, processing on the macro-block of the B-picture being processed (predictive coding/decoding) at step S8 of FIG. 49 is carried out using the motion vectors MV2 (MVF) and MV3 (MVB) as found from the motion vector MV1 of the corresponding macro-block in the rightmost I/P picture as the motion vectors, and using the above-mentioned average value of the prediction picture as pixel values (pixel data).

In such situation, the prediction mode for the macro-block being processed may be the above-mentioned direct mode. In H.263, the direct mode may be applied only to PB pictures. Thus, in the present embodiment, a B-picture may cover or include a B-picture in MPEG1 and MPEG2 and a PB picture in H.263.

On the other hand, if it is found at step S7 that MODB for the macro-block of the B-picture being processed is not 0, processing proceeds to step S9 where processing occurs in the usual manner as at step S4.

Figure 50:
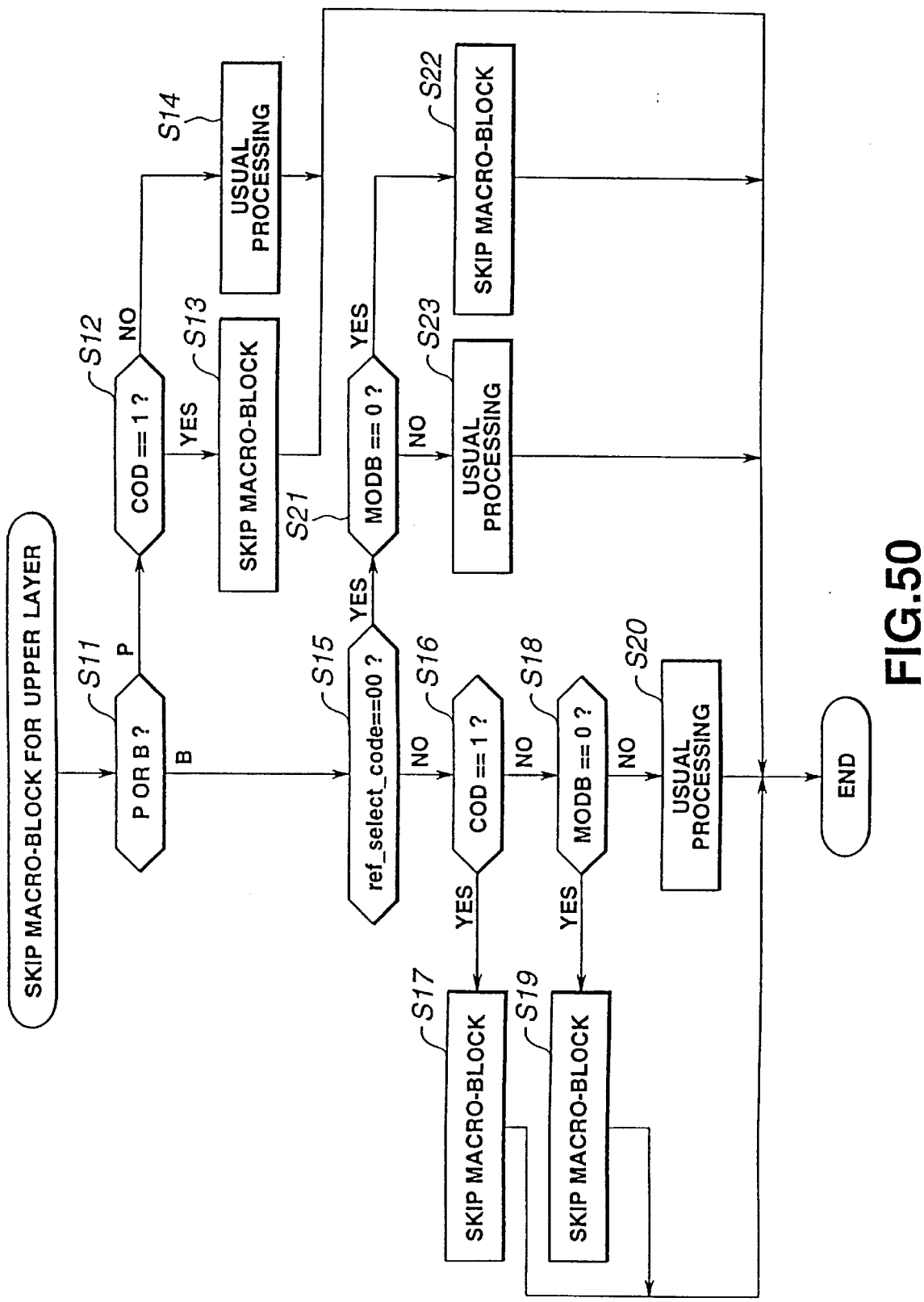
FIG. 50 is a flowchart to which reference will be made in explaining processing for a skip macro-block of an upper layer.

FIG. 50 shows a flowchart which illustrates the processing on a skip macro-block by the upper layer encoding unit 23 of FIG. 23 and the upper layer decoding unit 93 of FIG. 31.

At steps S11 to S14, processing similar to that of steps S1 to S4 in FIG. 49 is performed. In other words, similar processing is performed on both the upper and lower layers of the P-picture.

If, at step S11, the macro-block being processed is found to be a B-picture, processing proceeds to step S15 for judging whether or not the flag ref_select_code of the macro-block being processed is '00'. If such flag ref_select_code of the macro-block is found not to be '00' (that is, if the macro-block of the B-picture is not processed using the picture at the same time point of the lower layer as a reference picture), processing proceeds to steps S16 to S20 wherein processing similar to that of steps S5 to S9 in FIG. 49 may be performed.

If, at step S15, the flag ref_select_code of the macro-block of the B-picture being processed is found to be '00' (that is, if the macro-block of the B-picture is processed using the picture of the lower layer at the same time point as a reference picture), processing proceeds to step S21 to decide whether or not MODB for the macro-block of the B-picture being processed is 0. If such MODB is found to be 0, processing proceeds to step S22 where the macro-block being processed is decided to be a skip macro-block and handled as such. Conversely, if the MODB is found at step S21 to be not 0, processing proceeds to step S23 where processing occurs in the usual manner as in step S3 of FIG. 49.

Figure 51C:
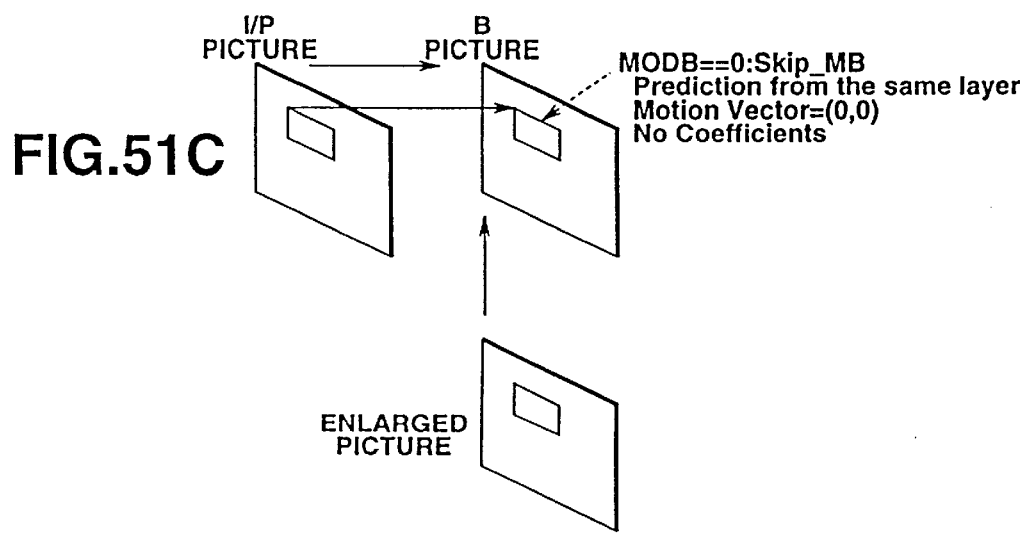

That is, it is now assumed that the picture (VOP) of the upper layer to be processed is that represented by a sequence of I/P, B, B, . . . as shown in FIG. 51C and that the picture of the lower layer is represented by a similar sequence. It is also assumed that pictures of the lower layer and the upper layer are encoded/decoded alternately. If ref_select_code of the B-picture of the upper layer is '00', the above is the same as the picture encoding/decoding sequence.

In such situation, it is assumed that the value of ref_select_code is not judged at step S15 (that is, that processing similar to that explained with reference to FIG. 49 is performed). That is, despite the fact that the macro-block of the B-picture of the upper layer being processed is encoded/decoded using, as a reference picture, the picture of the lower layer at the same time point (enlarged picture) or the directly previous decoded picture of the upper layer (leftmost I/P picture) without referring to the frames subsequent to the B-picture, the value of the COD or MODB of the corresponding macro-block in such subsequent frames governs whether or not the macro-block being processed should be a skip macro-block. However, it may not be desirable to determine whether or not the macro-block being processed should be a skip macro-block based on a frame which is not referred to when encoding/decoding such macro-block.

Therefore, in the embodiment of FIG. 50 if the ref_select_code for the B-picture of the upper layer is '00', (that is, if the macro-block of the B-picture is processed using a picture at the same time point of the lower layer (enlarged picture) or the directly previous decoded picture in the upper layer (leftmost I/P picture) as a reference picture, as shown in FIG. 51C), the macro-block being processed may be determined to be a skip macro-block depending on the MODB concerning the macro-block of the B-picture being processed without depending on the COD or MODB for the corresponding macro-block in the subsequent frames.

If the ref_select_code is '00', the MODB of the macro-block of the B-picture being processed is usually 0 when the reference picture used is the directly previous decoded picture in the upper layer (leftmost I/P picture) and not the picture of the lower layer of the same time point. Therefore, in this situation, processing of such macro-block (predictive coding/decoding) is performed using the directly previous decoded picture as a reference picture with the motion vector being set to zero.

The skip macro-block may be processed as hereinabove described. In such processing, the decision as to whether the macro-block being processed belongs to the upper layer or the lower layer may be based on the scalability flag explained with reference to FIG. 35.

The reason the lower layer COD is supplied to the motion vector detector 32, the VLC unit 36, and the motion compensator 42 of FIG. 23 will now be described. That is, in the case of temporal scalability shown in FIGS. 25A and 25B, a picture of a lower layer is used as a reference picture for prediction of a upper layer, as previously explained. Since the VOP0 of the lower layer, VOP1 of the upper layer, and VOP2 of the lower layer are temporally consecutive pictures, the macro-block of the VOP1 of the upper layer becomes a skip macro-block if these three VOPs (VOP1, VOP2, and VOP3) meet the conditions explained with reference to FIG. 51A. If the macro-block is a skip macro-block, the macro-block need not be specifically processed. On the other hand, the COD of the VOP2 of the lower layer is utilized for providing decision information as to whether or not the condition explained with reference to FIG. 51A is met. Thus, the COD of the lower layer is supplied to the motion vector detector 32, the VLC unit 36, and the motion compensator 42 shown in FIG. 23.

MPEG 4 provides that (except when the prediction mode is the direct mode) DQUANT of the quantization step be transmitted even in cases wherein all DCT coefficients of a macro-block become a pre-set value, such as 0, as a result of quantization (that is, if no DCT coefficients are present). However, it is redundant to transmit DQUANT in the absence of DCT coefficients of the macro-block. Thus, in the VLC unit 36 of FIGS. 22 and 23 and in the IVLC unit 102 of FIGS. 30 and 31, the quantization step DQUANT may be handled as hereinbelow described with reference to FIG. 52.

At step S51, a determination is made as to whether CBPB is 0. If CBPB is found to be 0, no DCT coefficients of the macro-block exist. In this situation, processing proceeds to step S56, where the quantization step is disregarded and the processing is terminated. That is, the encoder side does not transmit the quantization step DQUANT, while the decoder side does not (cannot) extract the quantization step DQUANT from a received bitstream. Thus, processing comes to a close.

There are occasions wherein CBPB is not transmitted, as explained with reference to FIGS. 41A and 41B. In such situations), the processing may skip step S51 and resume at step S52.

If, at step S51, the CBPB is found to be not zero, processing proceeds to step S52 to decide whether or not MODB is zero. If such MODB is judged to be 0, the CBPB is not transmitted (as explained with reference to FIGS. 41A and 41B) so that no DCT coefficients of the macro-block exist. As a result, processing proceeds to step S56 where the quantization step is disregarded and processing is terminated.

If, at step S52, MODB is found to be not '0', processing proceeds to step S53 for determining which of the MODB tables A or B is used for variable length encoding/decoding of the MODB. If, at step S53, it is determined that the MODB table B is to be used, processing skips step S54 and proceeds to step S55. If, at step S53, it is determined that the MODB table A is to be used, processing proceeds to step S54 wherein it is decided whether or not the MODB is '10'.

If, at step S54, MODB is judged to be '10' (that is, if the MODB table A is used and MODB is '10'), CBPB is not transmitted, as explained with reference to FIGS. 41A and 41B. Consequently, no DCT coefficients of the macro-block exist, so that processing proceeds to step S56 where the quantization step is disregarded and the processing is terminated.

On the other hand, if MODB is judged not to be '10' at step S54, processing proceeds to step S55 wherein the quantization step DQUANT is transmitted on the encoder side and the quantization step DQUANT is extracted on the decoder side from the received bitstream. Thereafter, the processing is terminated.

As described above, if there are no DCT coefficients of the macro-block (that is, if MODB is '0', if the MODB table A is used and MODB is '0' or '10' and if MODB is '0' in case the MODB table B is used, and if CBPB is '000000'), the quantization step is disregarded, thus decreasing data redundancy.

Further, in a situation wherein the CBPB is transmitted even though its value is '0', the MODB may be set to '11' or to '10' using the MODB tables A or B. Such situation may not occur because '10' or '0' may be used for MODB. Therefore, although the value of CBPB is judged at the initial step S51 in the embodiment of FIG. 52, this decision processing is preferably performed directly before step S55 in view of processing efficiency.

Figure 52:
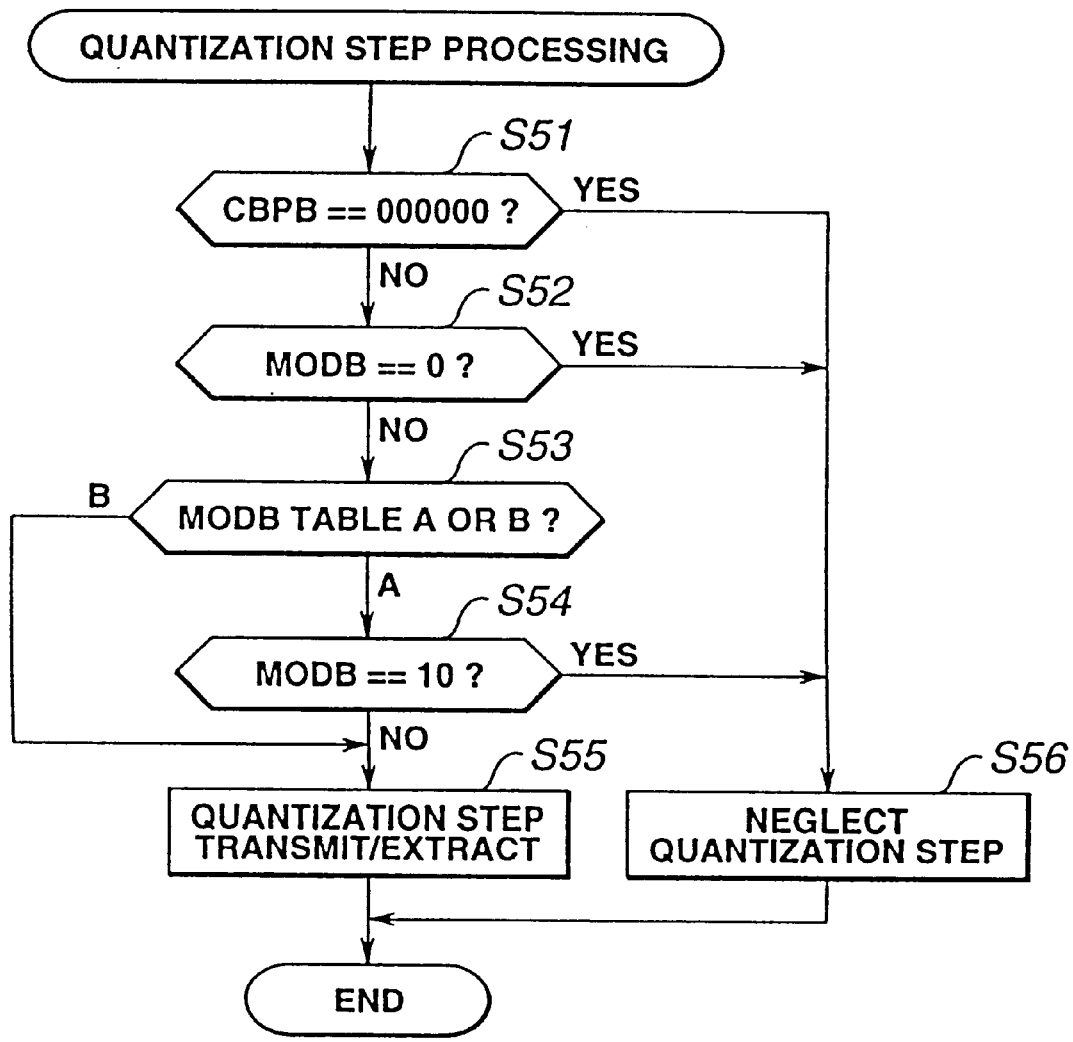
FIG. 52 is a flowchart to which reference will be made in explaining processing for the quantization step DQUANT.

The processing of FIG. 52 may be applied no matter which of the above-mentioned first or second methods are used.

Since the VO changed in position or size is arranged in the absolute coordinate system for processing, Vo based predictive coding/decoding becomes feasible, while scalability directed to a VO also becomes feasible.

Moreover, since processing of a skip macro-block is determined in consideration of the flag ref_select_code which specifies the reference picture used for the skip macro-block, efficient processing becomes feasible.

If the picture of the upper layer is the same as that of the lower layer, and a decoded picture of the lower layer at the same time point is used as a reference picture for predictive coding of the upper layer, only the motion vector for the lower layer is transmitted without transmitting the motion vector for the upper layer, thus reducing the data volume.

Although in the above description processing was explained as being made on a macro-block basis, such processing may also be performed in terms of units other than a macro-block.

Although in the above description two sorts of MODB tables were provided and one of them was used selectively, three or more MODB tables may be utilized. Similarly, in addition to those described herein, other numbers of MBTYPE tables as may be utilized.

With the present picture encoding device or method, a second picture may be enlarged or contracted based on the difference in resolution between the first and second pictures and the first picture is predictively encoded using the enlarged or contracted picture as a reference picture. On the other hand, the positions of the first picture and the second picture in a pre-set absolute coordinate system are set to output the first position information or the second position information on the position of the first or second picture, respectively. In this case, the position of the first picture is recognized based on the first position information, while the second position information is converted in response to an enlarging ratio or a contracting ratio by which the second picture has been enlarged or contracted and the position corresponding to the results of conversion is recognized as the position of the reference picture in order to perform predictive coding. As such, scalability may be achieved for a picture having a position which changes with time.

In the present picture decoding device or method, a decoded second picture is enlarged or contracted based on the difference in resolution between the first and second pictures and the first picture is decoded using the enlarged or contracted second picture as a reference picture. If the encoded data includes the first position information or the second position information on the position of the first picture and on the position of the second picture, respectively, in a pre-set absolute coordinate system, the position of the first picture may be based on the first position information, while the second position information is converted responsive to an enlarging ratio or a contracting ratio by which the second picture has been enlarged or contracted. The position corresponding to the results of conversion is recognized as the position of the reference picture in order to decode the first picture. As a result, scalability may be obtained for a picture having a position which changes with time.

In the present recording medium and recording method, the encoded data at least includes first data obtained on predictive encoding the first picture using, as a reference picture, the enlarged or contracted results obtained on enlarging or contracting the second picture based on the difference in resolution between the first and second pictures, and second data obtained on encoding the second picture and the first position information or the second position information obtained on setting the positions of the first and second pictures in a pre-set absolute coordinate system. The first data recognizes the position of the first picture based on the first position information, and converts the second position information responsive to the enlarging ratio or contracting ratio by which the second picture has been enlarged or contracted, while recognizing the position corresponding to the results of conversion as the position of the reference picture in order to perform predictive coding.

In the present picture encoding device and picture encoding method, the second picture is enlarged or contracted based on the difference in resolution between the first and second pictures and the first picture is decoded using the enlarged or contracted second picture as a reference picture. On the other hand, the positions of the first picture and the second picture in a pre-set absolute coordinate system are set and the first position information or the second position information on the position of the first or second picture, respectively, is outputted. In this case, the positions of the first and second pictures are set so that the position of the reference picture in the pre-set absolute coordinate system will be coincident with a pre-set position. The position of the first picture is set based on the first position information and the pre-set position is recognized as the position of the reference picture in order to perform predictive coding. As a result, scalability may be obtained for a picture having a position which changes with time.

In the present picture decoding device and picture decoding method, the decoded second picture is enlarged or contracted based on the difference in resolution between the first and second pictures and the first picture is decoded using the enlarged or contracted second picture as a reference picture. If the encoded data includes the first position information or the second position information on the position of the first picture or on the position of the second picture, respectively, in a pre-set absolute coordinate system, in which the position of the reference picture in the pre-set absolute coordinate system has been set so as to be coincident with a pre-set position, the position of the first picture is recognized based on the first position information, and the pre-position is recognized as the position of the reference picture in order to decode the first picture. As a result, scalability may be obtained for a picture having a position which changes with time.

In the present recording medium and recording method, the encoded data at least includes first data obtained on predictive encoding the first picture using, as a reference picture, the enlarged or contracted results obtained on enlarging or contracting the second picture based on the difference in resolution between the first and second pictures, second data obtained on encoding the second picture and the first position information or the second position information obtained on setting the positions of the first and second pictures in a pre-set absolute coordinate system. The first position information and the second information have been set so that the position of the reference picture in the pre-set coordinate system will be coincident with a pre-set position.

As a result, scalability may be obtained for a picture having a position which changes with time.

In the present picture encoding device and picture encoding method, a picture is predictively coded and first encoded data is outputted for local decoding. The picture is predictively encoded, using a locally decoded picture as a reference picture, to output second encoded data which are multiplexed with only the motion vector used for producing the first encoded data. As a result, decoding efficiency may be improved or, in other words, the data volume may be reduced.

In the picture decoding device and picture decoding method, first data is decoded, and second data is decoded using the decoded first data as a reference picture. If the encoded data includes only the motion vector used in predictive coding the first data; the second data is decoded in accordance with the motion vector used in predictive coding the first data. This enables a picture to be decoded from data having a small data volume.

In the present recording medium and recording method, the encoded data is obtained on predictive coding the picture for outputting first encoded data, locally decoding the first encoded data, predictive coding the picture using a locally decoded picture obtained as a result of local decoding to output second encoded data and multiplexing the first encoded data and the second encoded data only with the motion vector used for obtaining the first encoded data. This facilitates in the recording of numerous pieces of data.

In the present picture encoding device, picture encoding method, picture decoding device, and picture decoding method, whether or not a macro-block is a skip macro-block is determined based on the reference picture information specifying a reference picture used in encoding a macro-block of the B-picture by one of the forward predictive coding, backward predictive coding or bidirectionally predictive coding. This prevents skip macro-block processing from being performed based on a picture not used as a reference picture.

In the present recording medium and recording method, a macro-block is set as being a skip macro-block based on the reference picture information specifying a reference picture used in encoding a macro-block of the B-picture by one of the forward predictive coding, backward predictive coding or bidirectionally predictive coding. This prevents skip macro-block processing from being performed based on a picture not used as a reference picture.

In the present picture processing device and picture processing method, the pre-set table used for variable length encoding or variable length decoding is modified in keeping with changes in size of the picture. This reduces the data volume of data obtained by variable length encoding while enabling variable length decoding of such data.

In the present picture processing device and picture processing method, a pre-set table used for variable length encoding or variable length decoding is modified according to whether or not a picture of a layer different from and a timing same as a layer of a picture being encoded has been used as a reference picture. This reduces the data volume of data obtained by variable length encoding while enabling variable length decoding of such data.

In the present picture encoding device and picture encoding method, a pre-set quantization step is quantized only if all of the results of quantization of pixel values in the pre-set block of the picture are not all of the same value. This reduces the data volume.

In the present picture decoding device, picture decoding method, picture recording medium, and picture recording method, the encoded data contains a pre-set quantization step only if all of the results of quantization of pixel values in the pre-set block of the picture are not all of the same value. This reduces the data volume.

What is claimed is:

1. A picture encoding device operable in accordance with a modified MPEG 4 standard, comprising:
providing device for providing a plurality of object-based picture sequences which constitute a picture sequence; and
object-based picture encoding device for encoding each object-based picture sequence, wherein said object-based picture encoding device includes a quantization device for dividing a picture in said object-based picture sequence into a plurality of blocks having a number of pixels and quantizing the pixels in a macro-block comprising two or more blocks using a pre-set quantization step, and a multiplexing device for multiplexing said quantized pixels in a macro block and said quantization step, wherein, for a B-VOP (video object plane), said multiplexing device does not multiplex said quantization step if all of said quantized pixels in a macro-block of said B-VOP equal zero.

2. A picture decoding device operable in accordance with a modified MPEG 4 standard for decoding an encoded picture sequence comprising a plurality of object-based picture sequences obtained -by quantizing pixels in a macro-block of a picture in said object-based picture sequence using a pre-set quantization step and multiplexing the quantized pixels in said macro-block and said pre-set quantization step, wherein said encoded picture sequence does not include the pre-set quantization step for a macro-block of a B-VOP (video object plane) if all of said quantized pixels in said macro-block of said B-VOP equal zero.

3. A picture decoding method operable in accordance with a modified MPEG 4 standard for decoding an encoded picture sequence comprising a plurality of object-based picture sequences obtained by quantizing pixels in a macro-block of a picture in said object-based picture sequence using a pre-set quantization step and multiplexing the quantized pixels in said macro-block and said pre-set quantization step, wherein said encoded picture sequence does not include the pre-set quantization step for a macro-block of a B-VOP (video object plane) if all of said quantized pixels in said macro-block of said B-VOP equal zero.

4. A recording medium having recorded thereon an encoded picture sequence encoded in accordance with a modified MPEG 4 standard, comprising a plurality of object-based picture sequences obtained by quantizing pixels in a macro-block of a picture in said object-based picture sequence using a pre-set quantization step and multiplexing the quantized pixels in said macro-block and said pre-set quantization step, wherein said encoded picture sequence does not include the pre-set quantization step for a macro-block of a B-VOP (video object plane) if all of said quantized pixels in said macro-block of said B-VOP equal zero.

5. A recording method for recording an encoded picture sequence encoded in accordance with a modified MPEG 4 standard, comprising a plurality of object-based picture sequences obtained by quantizing pixels in a macro-block of a picture in said object-based picture sequence using a pre-set quantization step and multiplexing the quantized pixels in said macro-block and said pre-set quantization step, wherein said encoded picture sequence does not include the pre-set quantization step for a macro-block of a B-VOP (video object plane) if all of said quantized pixels in said macro-block of said B-VOP equal zero.

\* \* \* \* \*